(12) United States Patent
Gray et al.

(10) Patent No.: US 11,325,286 B2
(45) Date of Patent: May 10, 2022

(54) MIXING MACHINE FOR PRODUCING FOAM WITHIN A BAG

(71) Applicant: Sealed Air Corporation (US), Charlotte, NC (US)

(72) Inventors: William M. Gray, West Redding, CT (US); Mark Garceau, Bethlehem, CT (US); John J. Corrigan, Washington, CT (US); Laurence B. Sperry, Newton, MA (US)

(73) Assignee: Sealed Air Corporation (US), Charlotte, NC (US)

(*) Notice: Subject to any disclaimer, the term of this patent is extended or adjusted under 35 U.S.C. 154(b) by 1073 days.

(21) Appl. No.: 15/593,695

(22) Filed: May 12, 2017

(65) Prior Publication Data

US 2018/0326626 A1 Nov. 15, 2018
US 2019/0061210 A9 Feb. 28, 2019

Related U.S. Application Data

(63) Continuation-in-part of application No. 13/497,152, filed as application No. PCT/US2010/050177 on Sep. 24, 2010, now abandoned.
(Continued)

(51) Int. Cl.
*B29C 44/18* (2006.01)
*B01F 11/00* (2006.01)
(Continued)

(52) U.S. Cl.
CPC ........ *B29C 44/182* (2013.01); *B01F 3/04446* (2013.01); *B01F 11/0065* (2013.01);
(Continued)

(58) Field of Classification Search
CPC .............. B01F 11/0065; B01F 3/04446; B01F 2215/0039; B01F 2215/0049;
(Continued)

(56) References Cited

U.S. PATENT DOCUMENTS 3,332,670 A * 7/1967 Swartz .................. B01F 13/002
  416/67
3,361,414 A * 1/1968 Via, Jr. ................ A61C 9/0026
  366/200
(Continued)

FOREIGN PATENT DOCUMENTS

CN 1226214 A 8/1999
EP 1022104 A1 7/2000
(Continued)

*Primary Examiner* — Charles Cooley
(74) *Attorney, Agent, or Firm* — Jon M. Isaacson

(57) ABSTRACT

A machine produces foam-in-bag from foam precursors mixed within the bag. The machine comprises a base and a shell. The base and shell are moveable relative each other between a base/shell disengaged position and a base/shell engaged position. In the base/shell engaged position, the base and shell divide the bag so that a mixing chamber is isolated from the remainder portion of the bag. First and second nozzles inject foam precursors into the mixing chamber. A mixer engages the mixing chamber to provide mixing energy to facilitate the foam reaction.

20 Claims, 43 Drawing Sheets

Related U.S. Application Data

(60) Provisional application No. 61/277,411, filed on Sep. 24, 2009.

(51) Int. Cl.
   *B29C 44/34* (2006.01)
   *B31D 5/00* (2017.01)
   *B01F 3/04* (2006.01)
   *B29K 75/00* (2006.01)
   *B29C 44/58* (2006.01)
   *B29L 31/00* (2006.01)
   *B29K 105/00* (2006.01)
   *B65D 81/05* (2006.01)
   *B29K 105/04* (2006.01)

(52) U.S. Cl.
   CPC ........ B29C 44/3442 (2013.01); B31D 5/0078 (2013.01); *B01F 2215/0039* (2013.01); *B01F 2215/0049* (2013.01); *B29C 44/588* (2013.01); *B29K 2075/00* (2013.01); *B29K 2105/0085* (2013.01); *B29K 2105/04* (2013.01); *B29K 2823/0608* (2013.01); *B29K 2823/083* (2013.01); *B29L 2031/7128* (2013.01); *B65D 81/051* (2013.01)

(58) Field of Classification Search
   CPC . B29C 44/3442; B29C 44/182; B29C 44/588; B31D 5/0078; B31D 2205/0023; B29K 2075/00; B29K 2823/0608; B29K 2823/083; B29K 2105/0085; B29K 2105/04; B29L 2031/7128; B65D 81/051
   See application file for complete search history.

(56) References Cited

U.S. PATENT DOCUMENTS

| | | | |
|---|---|---|---|
| 3,419,134 A | 12/1968 | Fitts | |
| 3,543,966 A * | 12/1970 | Shapero | B01F 11/0065 222/94 |
| 3,771,773 A * | 11/1973 | Schriever | B01F 11/0065 366/69 |
| 3,819,158 A * | 6/1974 | Sharpe | B01F 11/0065 366/349 |
| 3,830,475 A * | 8/1974 | Inoue | A61C 5/68 366/145 |
| 4,049,242 A * | 9/1977 | Porter | B01F 11/0065 366/204 |
| 4,232,788 A | 11/1980 | Roth | |
| 4,375,275 A | 3/1983 | Argazzi | |
| 4,390,337 A | 6/1983 | Gately | |
| 4,426,023 A | 1/1984 | Sperry et al. | |
| 4,469,251 A | 9/1984 | Sperry et al. | |
| 4,550,654 A * | 11/1985 | Hedenberg | A21B 7/005 206/219 |
| 4,590,850 A * | 5/1986 | Hedenberg | A21B 7/005 99/348 |
| 4,674,268 A | 6/1987 | Gavronsky et al. | |
| 4,800,708 A | 1/1989 | Sperry | |
| 4,854,109 A | 8/1989 | Pinarer et al. | |
| 4,886,674 A | 12/1989 | Seward et al. | |
| 4,898,327 A | 2/1990 | Sperry et al. | |
| 4,917,646 A | 4/1990 | Kieves | |
| 4,938,007 A * | 7/1990 | Sperry | B29C 44/182 53/449 |
| 4,966,197 A | 10/1990 | Jaron et al. | |
| 4,999,975 A * | 3/1991 | Willden | B29C 66/832 53/451 |
| 5,027,583 A | 7/1991 | Chelak | |
| 5,139,151 A | 8/1992 | Chelak | |
| 5,146,840 A * | 9/1992 | Hedenberg | A21B 7/005 206/219 |
| 5,186,905 A | 2/1993 | Bertram et al. | |
| 5,255,847 A | 10/1993 | Sperry et al. | |
| 5,348,157 A | 9/1994 | Pozzo | |
| 5,376,219 A | 12/1994 | Sperry et al. | |
| 5,494,190 A * | 2/1996 | Boettcher | B01F 11/0065 206/219 |
| 5,575,435 A | 11/1996 | Sperry et al. | |
| 5,588,533 A | 12/1996 | Farison et al. | |
| 5,590,816 A | 1/1997 | Bertram et al. | |
| 5,620,096 A | 4/1997 | Pozzo | |
| 5,679,208 A | 10/1997 | Sperry et al. | |
| 5,699,902 A | 12/1997 | Sperry et al. | |
| 5,709,317 A | 1/1998 | Bertram et al. | |
| 5,727,370 A | 3/1998 | Sperry | |
| 5,762,197 A | 6/1998 | Farison | |
| 5,765,688 A | 6/1998 | Bertram et al. | |
| 5,803,263 A | 9/1998 | Pozzo | |
| 5,829,492 A | 11/1998 | Gavronsky et al. | |
| 5,830,780 A | 11/1998 | Dennison et al. | |
| 5,862,914 A | 1/1999 | Farison et al. | |
| 5,873,221 A | 2/1999 | Sperry et al. | |
| 5,899,325 A | 5/1999 | Bertram et al. | |
| 5,913,603 A | 6/1999 | Sperry et al. | |
| 5,986,239 A | 11/1999 | Corrigan, III et al. | |
| 5,996,782 A | 12/1999 | Sperry et al. | |
| 6,003,288 A | 12/1999 | Sperry et al. | |
| 6,034,197 A | 3/2000 | Mahon et al. | |
| 6,065,636 A | 5/2000 | Sperry et al. | |
| 6,076,677 A | 6/2000 | Pozzo | |
| 6,131,375 A | 10/2000 | Sperry | |
| 6,142,661 A * | 11/2000 | Lafond | B01F 11/0065 366/197 |
| 6,267,498 B1 * | 7/2001 | Lafond | B01F 11/0065 366/197 |
| 6,272,813 B1 | 8/2001 | Sperry et al. | |
| 6,273,600 B1 * | 8/2001 | Sharpe | B01F 11/0065 366/117 |
| 6,289,649 B1 | 9/2001 | Cherfane | |
| 6,369,394 B1 * | 4/2002 | Lee | A61L 2/0011 250/455.11 |
| 6,386,850 B1 | 5/2002 | Salerno et al. | |
| 6,439,759 B1 * | 8/2002 | Ray | B01F 11/0065 366/197 |
| 6,550,229 B2 | 4/2003 | Sperry et al. | |
| 6,586,074 B1 | 7/2003 | Lee et al. | |
| 6,629,599 B2 | 10/2003 | Sperry et al. | |
| 6,634,783 B2 * | 10/2003 | Baron | B01F 11/0045 366/204 |
| 6,675,557 B2 | 1/2004 | Sperry et al. | |
| 6,712,201 B1 | 3/2004 | Bertram et al. | |
| 6,811,059 B2 | 11/2004 | Piucci, Jr. et al. | |
| 6,827,482 B2 * | 12/2004 | Lafond | B01F 15/0085 366/197 |
| 6,845,706 B2 * | 1/2005 | Kim | A21B 7/005 366/240 |
| 6,862,868 B2 | 3/2005 | Sperry et al. | |
| 6,929,193 B2 | 8/2005 | Ruddy | |
| 6,974,025 B2 | 12/2005 | Bertram et al. | |
| 6,983,839 B2 | 1/2006 | Bertram et al. | |
| 6,996,956 B2 | 2/2006 | Sperry et al. | |
| 7,066,638 B1 * | 6/2006 | Heidler | B01F 11/0065 366/129 |
| 7,077,559 B2 * | 7/2006 | Hlavinka | A61L 2/0011 366/197 |
| 7,789,551 B2 * | 9/2010 | Ray | B01F 15/0085 366/108 |
| 8,177,415 B1 * | 5/2012 | White | B01F 11/0065 366/197 |
| 8,197,117 B2 * | 6/2012 | White | B01F 13/0013 366/197 |
| 8,511,047 B2 * | 8/2013 | Mahon | B29B 7/806 53/553 |
| 10,946,563 B2 * | 3/2021 | Vilag | B29C 44/60 |
| 10,967,342 B2 * | 4/2021 | Tourel | B01F 15/0215 |
| 2002/0092278 A1 | 7/2002 | Sperry et al. | |
| 2003/0031085 A1 * | 2/2003 | Baron | B01F 15/00467 366/144 |
| 2003/0031088 A1 * | 2/2003 | Baron | B01F 11/0045 366/204 |

(56) References Cited

U.S. PATENT DOCUMENTS

| | | | |
|---|---|---|---|
| 2003/0196557 A1* | 10/2003 | Kim | G06K 7/14 99/348 |
| 2005/0063250 A1* | 3/2005 | Hubbard | B01F 11/0042 366/275 |
| 2006/0176767 A1* | 8/2006 | Hlavinka | B01F 5/0688 366/197 |
| 2007/0140047 A1* | 6/2007 | Ray | B01F 15/0085 366/197 |
| 2007/0252298 A1 | 11/2007 | Sperry et al. | |
| 2008/0186802 A1* | 8/2008 | Bungay | B01F 15/00214 366/142 |
| 2009/0038270 A1* | 2/2009 | Mahon | B29B 7/7689 53/469 |
| 2011/0080800 A1* | 4/2011 | White | B01F 11/0065 366/207 |
| 2012/0261028 A1* | 10/2012 | Gray | B01F 11/0065 141/9 |
| 2014/0092702 A1* | 4/2014 | Ray | B01F 11/0065 366/96 |
| 2017/0304789 A1* | 10/2017 | Tourel | B01F 11/0065 |
| 2018/0326626 A1* | 11/2018 | Gray | B31D 5/0078 |
| 2020/0330938 A1* | 10/2020 | Singh | B01F 11/0065 |

FOREIGN PATENT DOCUMENTS

| | | | | |
|---|---|---|---|---|
| EP | 1512458 A1 | * | 3/2005 | B01F 11/00 |
| EP | 2712670 A2 | * | 4/2014 | |
| FR | 2781695 A1 | * | 2/2000 | B01F 15/06 |
| FR | 2903326 A1 | * | 1/2008 | |
| FR | 3012979 A1 | * | 5/2015 | |
| FR | 3013036 A1 | * | 5/2015 | |
| GB | 1402538 A | * | 8/1975 | |
| GB | 2506432 A | * | 4/2014 | |
| SU | 1681937 A1 | | 10/1991 | |
| SU | 1681937 A1 | * | 10/1991 | |
| SU | 1699575 A1 | | 12/1991 | |
| SU | 1699575 A1 | * | 12/1991 | |
| WO | 9748606 A1 | | 12/1997 | |
| WO | 1998/046497 A1 | | 10/1998 | |
| WO | 1998/046498 A1 | | 10/1998 | |
| WO | 2000/009580 A1 | | 2/2000 | |
| WO | 2008003696 A1 | | 1/2008 | |
| WO | 2018/215743 A1 | * | 11/2018 | |

\* cited by examiner

FIG. 13
FIG. 14
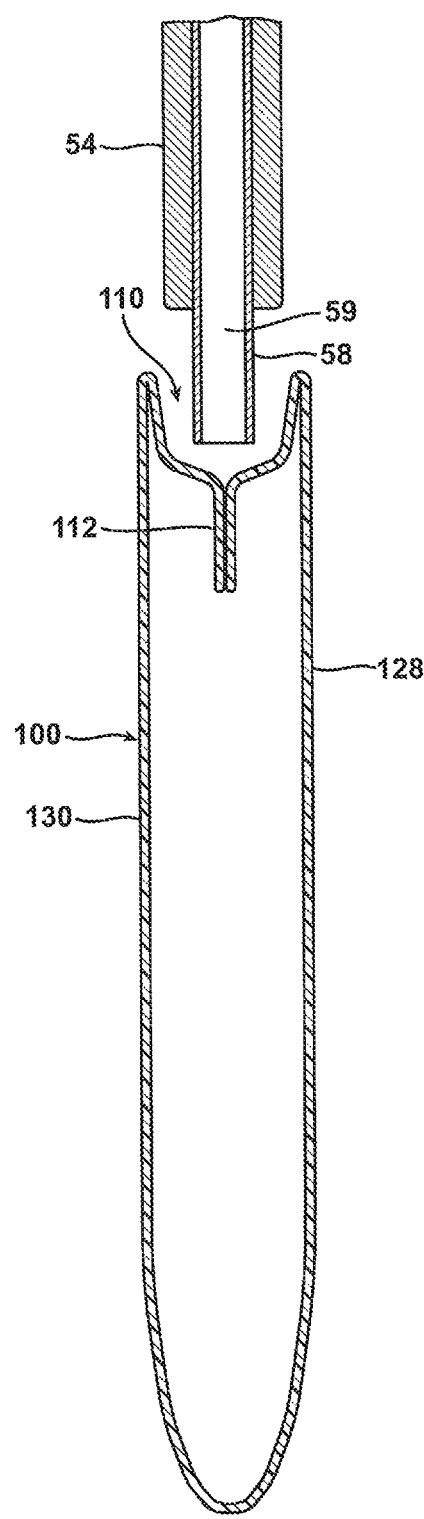
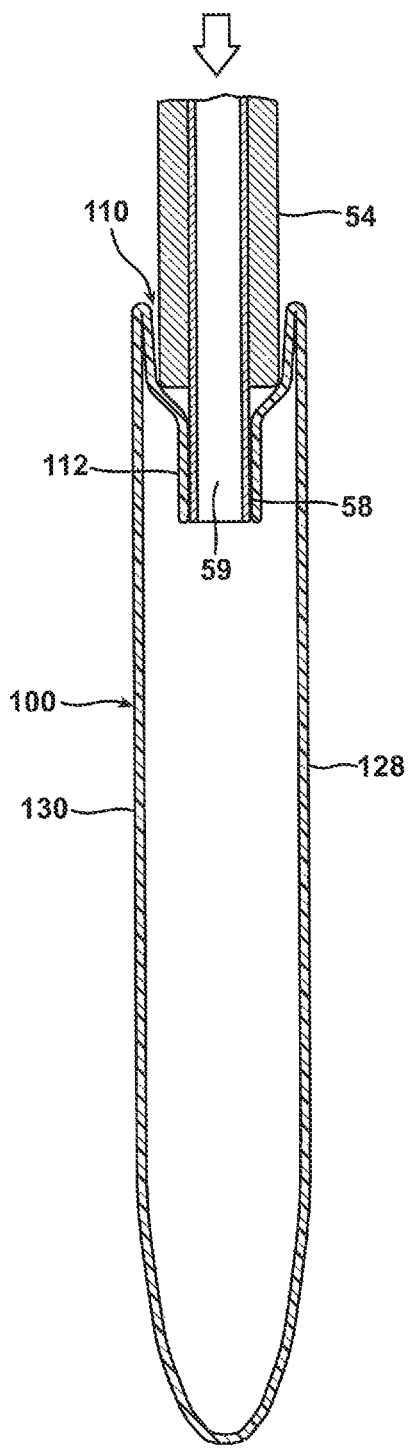

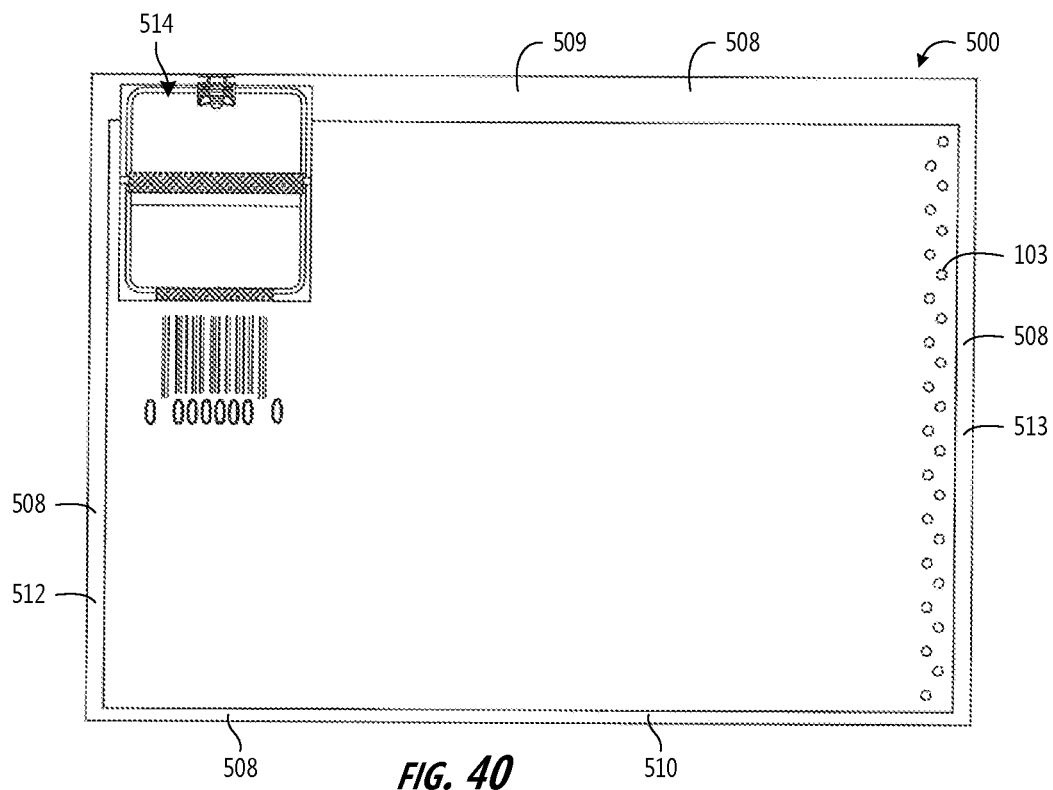
FIG. 40
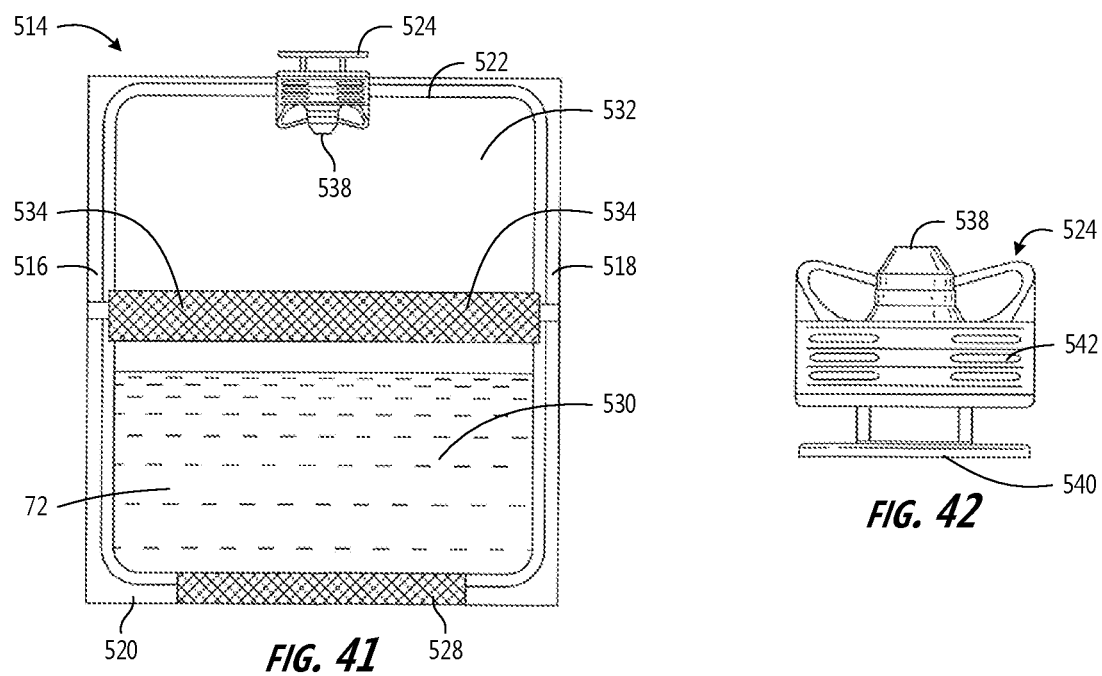
FIG. 41
FIG. 42

MIXING MACHINE FOR PRODUCING FOAM WITHIN A BAG

This continuation-in-part application claims the benefit of U.S. patent application Ser. No. 13/497,152 filed Jun. 18, 2012, which is the National Stage (35 U.S.C. § 371) of International Application No. PCT/US2010/050177 filed Sep. 24, 2010, which claims the benefit of U.S. Provisional Patent Application Ser. No. 61/277,411 filed Sep. 24, 2009, each of which is incorporated herein in its entirety by reference.

The following names are parties to a joint research agreement: Sealed Air Corporation, Sperry Product Innovation, Inc., and Laurence B. Sperry.

The presently disclosed subject matter relates to a machine for producing foam in a bag.

BACKGROUND

Polyurethane foam may be formed by mixing an isocyanate compound with a hydroxyl-containing material, such as a polyol (i.e., a compound that contains multiple hydroxyl groups), typically in the presence of water and a catalyst. As the isocyanate and polyol foam precursors react in the presence of the catalyst to form polyurethane, the water reacts with isocyanate to produce carbon dioxide gas, which acts as a blowing or foaming agent to expand the polyurethane into a foamed cellular structure (i.e., a polyurethane foam).

With foam-in-bag packaging, the foam precursors may be mixed and dispensed into flexible plastic bags, for example, as the bags are formed from plastic film. As the precursors react to form expanding foam within the bag, the bag may be sealed closed. The bag may then be placed into a box holding an object to be cushioned. The foam tends to expand within the bag into the available space inside the box to form a custom foam cushions around the packaged object. Machines for producing foam-in-bag cushions are described, for example, in U.S. Pat. Nos. 4,800,708; 4,854,109; 5,376,219; 5,727,370; 6,003,288; 6,550,229; and 6,675,557; each of which is incorporated herein in its entirety by reference; and such machines are available, for example, from Sealed Air Corporation under the Instapak®, SpeedyPacker Insight®, and Instapacker® trademarks.

Machines that produce foam-in-bag packaging may use a dispenser in which foam precursors enter the dispenser to mix with one another in an internal mixing chamber of the dispenser to form a foamable composition. The resultant foamable composition then exits the dispenser via a discharge outlet. See for example, U.S. Pat. Nos. 4,898,327 and 5,255,847, each of which is incorporated herein in its entirety by reference.

Polyurethane foam tends to stick to objects as it hardens into foam. This tendency may be problematic inside the dispenser from which the mixed foam precursors are ejected. Therefore, the polyol and isocyanate foam precursors may be withheld from mixing with one another until just before injection from the dispenser. Nevertheless, over time the foamable composition may build up in the internal mixing chamber and the discharge outlet of the dispenser, harden into foam, and disrupt the desired operation. Foam build-up may also form on the end of the nozzle and protrude below the nozzle.

As a result, the mixing chamber and discharge outlet of an injector may require frequent cleaning. The dispenser may be cleaned by a solvent capable of dissolving both the foam precursors and the foamable composition before its fully cured state. To avoid frequent disassembly and manual cleaning of the dispenser, the solvent may be supplied to the discharge end of the dispenser to clean the dispenser on an on-going basis. See, for example, U.S. Pat. Nos. 6,811,059; 6,929,193; and 6,996,956; and U.S. Patent Application Publications 2009/0038270 A1 and 2002/0092278 A1, each of which is incorporated herein in its entirety by reference.

There are challenges presented by the use of a solvent in this manner. The supplying of the solvent to the dispenser adds to the operational expense and complexity of foam-in-bag packaging systems. Further, excess solvent that may flow from the dispenser into the next cushion to be formed may also leak through incomplete seals or vent holes in the bag or film containing the foam. Such solvent leakage may be detrimental to the surface appearance of certain types of packaged items, for example, comprising wood.

SUMMARY

The presently disclosed subject matter may address one or more of the aforementioned problems.

An embodiment is directed to a machine useful for mixing first and second foam precursors to produce foam within a bag comprises a base and a shell. The base and shell are moveable relative each other between a base/shell disengaged position and a base/shell engaged position. In the base/shell disengaged position, the base and shell are spaced apart to permit insertion of the bag between the base and shell. In the base/shell engaged position, the shell and base press together to hold the bag between the base and shell and to divide the bag into (1) a mixing chamber and (2) a remainder portion so that the mixing chamber is isolated from the remainder portion of the bag. A first nozzle is adapted to inject the first foam precursor into the mixing chamber within the bag. A second nozzle adapted to inject the second foam precursor into the mixing chamber within the bag. A mixer is adapted to engage the mixing chamber of the bag to provide mixing energy to the first and second foam precursors within the mixing chamber of the bag when the base and shell are in the base/shell engaged position, thereby facilitating the foam reaction between the first and second foam precursors.

One or more embodiments of the machine may operate to create foam in bags with reduced disruption of nozzle operation caused by clogging or foam build-up, and therefore reduce the need and frequency of nozzle cleaning. Some embodiments of the machine may be devoid of structure to heat the foam precursors; and/or the machine may be used to create foam in a bag where without heating the foam precursors.

These and other objects, advantages, and features of the presently disclosed subject matter will be more readily understood and appreciated by reference to the detailed description and the drawings.

BRIEF DESCRIPTION OF THE DRAWINGS

FIG. 13 is a representative sectional side view of the bag and the injector assembly in the retracted position;

FIG. 14 is a representative sectional side view of the bag and the injector assembly in the engaged position;

FIG. 40 is a representative top down plan view of pouch 514 within mother bag 500;

FIG. 41 is a representative top down plan view of the pouch 514 of FIG. 40;

FIG. 42 is a representative detail side elevation view of the inlet fitment 524 of FIG. 41;

Various aspects of the subject matter disclosed herein are described with reference to the drawings. For purposes of simplicity, like numerals may be used to refer to like, similar, or corresponding elements of the various drawings. The drawings and detailed description are not intended to limit the claimed subject matter to the particular form disclosed. Rather, the intention is to cover all modifications, equivalents, and alternatives falling within the spirit and scope of the claimed subject matter.

DETAILED DESCRIPTION

Various embodiments of the machines of the presently disclosed subject matter, for example, machine 10 (FIG. 1), machine 11 (FIG. 29), and machine 300 (FIG. 33) may be used to produce foam within a bag, for example, bag 100.

Bag

Figure 12:
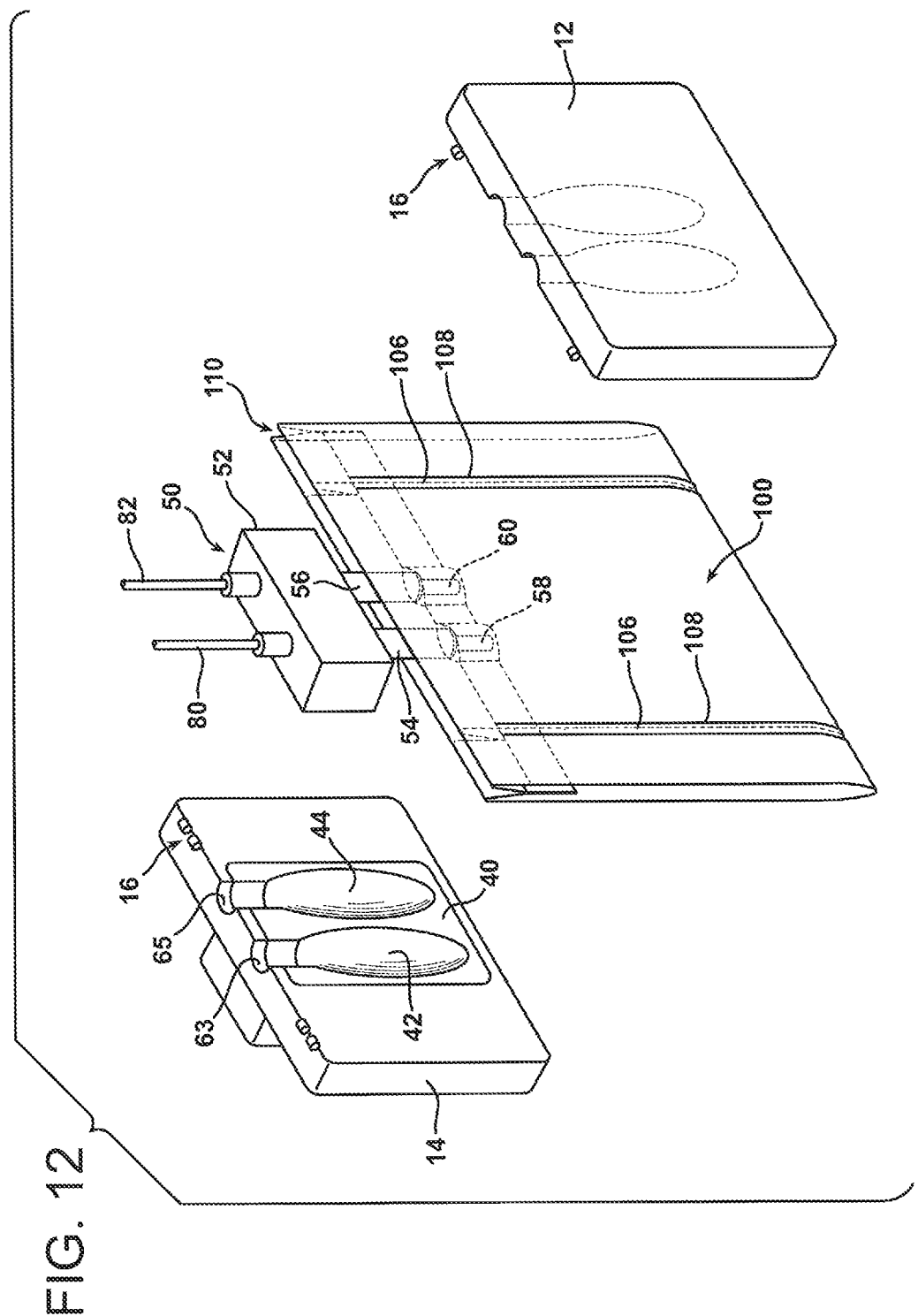
FIG. 12 is a representative exploded view of the base, shell, and injector assembly having bag 100 in the fill position.

Bag 100 may comprise front and rear sheets 128, 130 sealed together in selected areas. (FIGS. 12-14.) For example, bag 100 may comprise seals 108 attaching the front and rear sheets together in selected areas to form and define one or more edge boundaries of the interior of the bag. (FIGS. 15-20, 22-25.) Seals 108 may be formed by heat sealing the sheets together or by applying an adhesive to hold the sheets together in the desired regions. One edge of the bag may be formed by folding a sheet over upon itself (e.g., center fold) such that a seal is not required to form the corresponding edge that in essence forms a demarcation between the front and rear sheets. (FIGS. 13-14.)

Bag 100 may comprise trough 110, for example, forming the top edge of the bag. Trough 110 may be formed, for example, by attaching the front and rear sheets 128, 130 to each other, for example by a fin seal to create fin seal region 132. The trough 110 may also be formed without a seal in fin seal region 132 but having end seals 108 extending to the top of the trough at each end to "close" the trough at each end.

The bag 100 may comprise first one-way valve 112 and second one-way valve 113, for example positioned in the fin seal region 132. Suitable one-way valves (also described in the art as self-closing valves and self-sealing valves) are known in the art; for example, as described by one or more of U.S. Pat. Nos. 4,966,197; 4,917,646; 5,348,157; 5,803,263; 5,830,780; each of which is incorporated herein in its entirety by reference.

By way of example, the one-way valves 112, 113 may each comprise a first sheet of thermoplastic material and a second sheet of thermoplastic material in face-to-face relationship with each other. To form the one-way valve, the sheets of thermoplastic material may be secured together along a portion of their longitudinal edges such that the sheets define a passageway therebetween. The passageway defines an inlet end and an outlet end. The longitudinal edges are secured through the portion of the edges nearest the inlet end with the remainder toward the outlet end being opened at each longitudinal edge.

Figure 1:
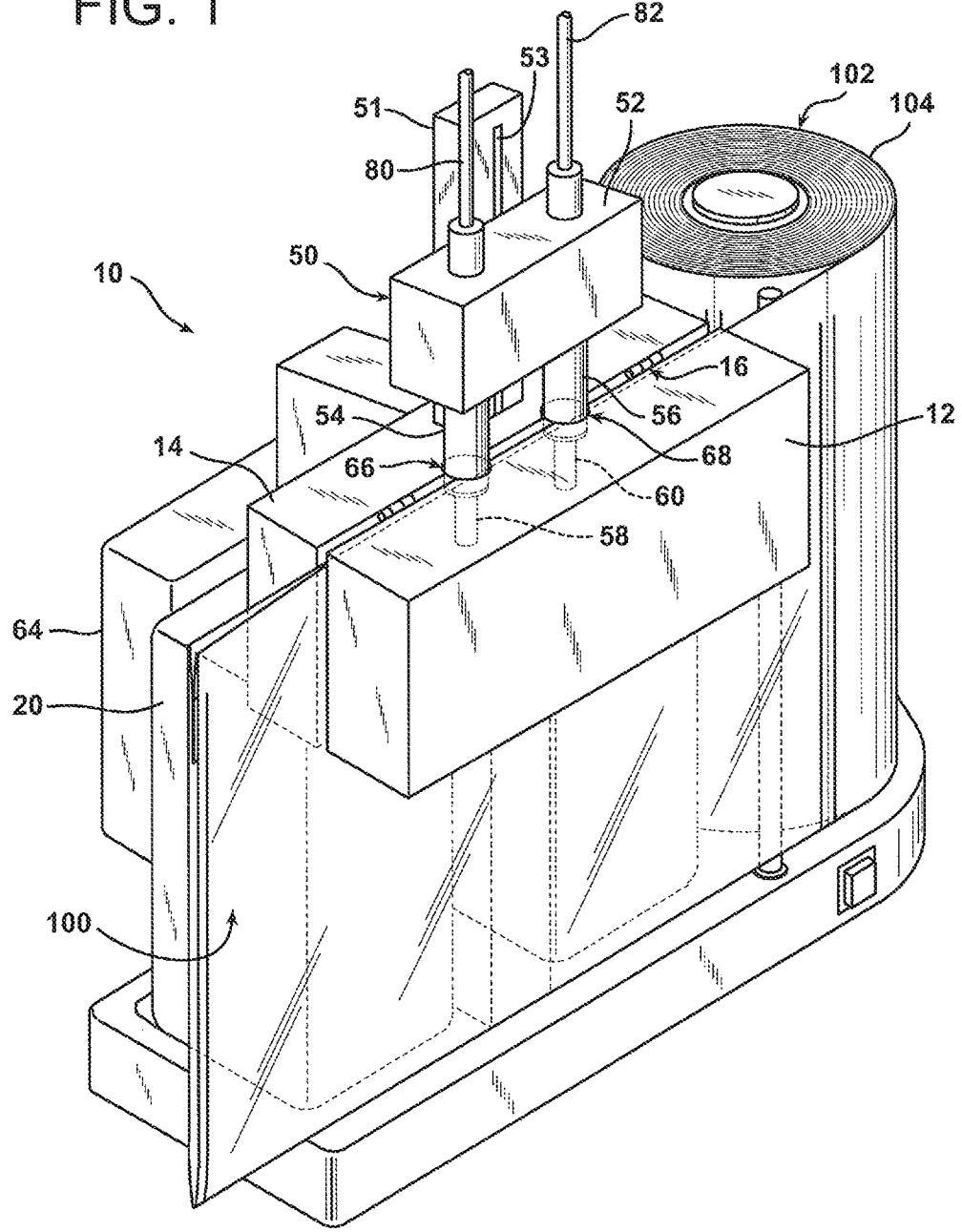
FIG. 1 is a representative perspective view of an embodiment machine 10 having a roll 104 of series of bags 102 installed.

A plurality of bags 100 may be provided as series of bags 102 configured as roll 104. (FIG. 1.) Each of the adjoining bags 100 may be separated form the adjoining bag by seal 108. A line of weakening 106 may be formed between adjoining bags 100, for example, formed within seal 108, to facilitate detachment of adjoining bags. For example, line of weakening 106 may comprise a plurality of perforations formed in seal 108 (or between adjacent seals). Additionally, the plurality of bags may be supplied in a fan-fold stacked arrangement, or may be supplied as independent singular bags Bag 100 may comprise one or more vents, for example, vent 103. (FIGS. 15-25.) A suitable vent is designed and/or positioned to provide gas or vapor communication between the interior of the bag and the outside of the bag, while minimizing the communication of foam (and/or reacting, expanding foam) between the interior of the bag and the exterior of the bag. The vent, or one or more vents, may be positioned in bag 100 to facilitate the flow of by-product gas from the interior of the bag, while minimizing the flow of foam or reacting or expanding foam from the bag 100 through the one or more vents. For example, the vent 103 may be located or positioned at a portion of the bag that is outside of the mixing chamber 120 of the bag, discussed herein.

Vent 103 may comprise one or more, for example, a plurality of, perforations or slits in the sheet. Vent 103 may be formed in either the front sheet 128 or the rear sheet 130 or both of bag 100. Such vent is described, for example, in U.S. Pat. Nos. 5,899,325 and 6,712,201, each of which is incorporated herein in its entirety by reference. Another embodiment of the vent comprises a relatively small opening or gap in an edge seal of the bag, for example as disclosed in U.S. Pat. No. 6,550,229, previously incorporated by reference. Further, such opening or gap may be surrounded by a pattern of partial seals forming a tortuous path through which gasses may pass, but through which the flow of foam and liquid is impeded, as set forth for example, in U.S. Pat. Nos. 5,376,219 and 5,699,902, each of which is incorporated herein in its entirety by reference. In another embodiment of the vent, the vent may comprise a gas-permeable material such as nonwoven bonded polyolefin fibers, microporous polytetrafluoroethylene (PTFE), textile fabrics such as woven polyolefins, porous papers, such as surgical grade kraft paper, spunbonded polypropylene, and microporous membranes. The amount and type of the gas-permeable material is sufficient to allow the gas from the interior of the bag to escape while impeding the escape of expanding foam or liquids from the interior of the bag. Such vent is described in WO 1998/046498, which is incorporated herein in its entirety by reference.

The sheets 128, 130 may comprise materials useful for formation into bag 100, such as polymeric films or fibrous sheets comprising for example paper. Useful polymeric films may comprise one or more thermoplastic materials selected from polyolefins, for example, polyethylene homopolymers, such as low density polyethylene (LDPE) and high density polyethylene (HDPE), polyethylene copolymers, such as, ionomer, ethylene/vinyl acetate copolymer (EVA), ethylene/(meth)acrylate copolymer (EMA), heterogeneous (e.g., Zeigler-Natta catalyzed) ethylene/alpha-olefin copolymers, homogeneous (e.g., metallocene, single-cite catalyzed) ethylene/alpha-olefin copolymers (e.g., linear low density polyethylene (LLDPE), linear medium density polyethylene (LMDPE), very low density polyethylene (VLDPE), and ultra-low density polyethylene (ULDPE)), polypropylene homopolymer, polypropylene copolymer (e.g., propylene/ethylene copolymer); and polyesters, polystyrenes, polyamides, and polycarbonates. The polymeric film may be monolayer or multilayer, for example, a three-layer film having a sealant layer, a core layer, and an outer abuse layer. The film may be made by film-forming methods known in the art, such as coextrusion and lamination. Useful sheet material is available, for example, from Sealed Air Corporation in a centerfolded roll configuration under the SpeedyPacker® silver SP19 and SP30 trademarks. Sheet material available as a roll of converted three-sided bags—having the transverse sides formed by heat seals with perforations through the seals, one longitudinal side formed by a centerfold, and the other longitudinal side open—is available for example from Sealed Air Corporation under the Instapacker® Tabletop white IP16 and IP24 trademarks.

Foam Precursor Supply System

Figure 6:
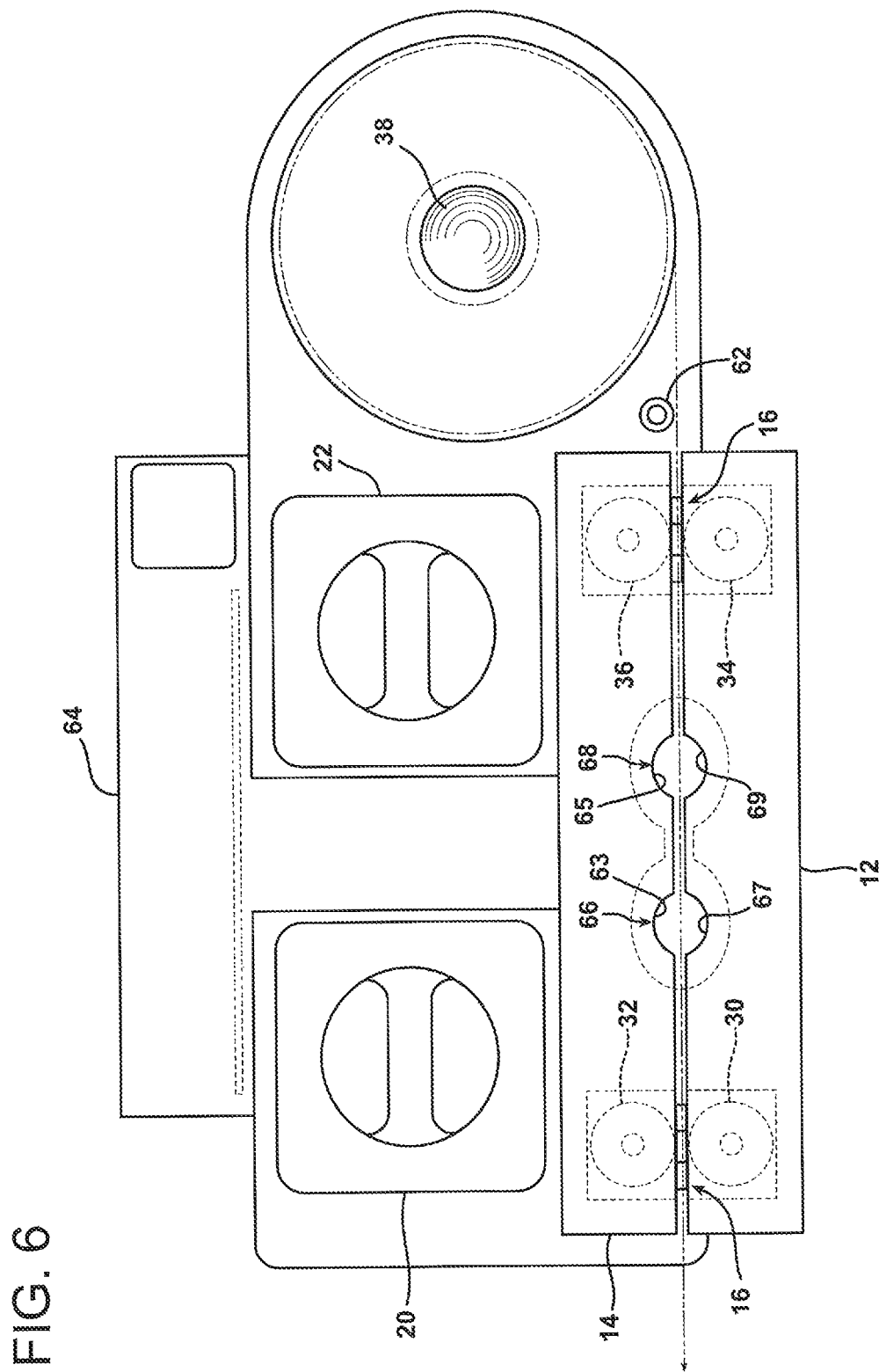
FIG. 6 is a top view of the machine of FIG. 3.
Figure 21:
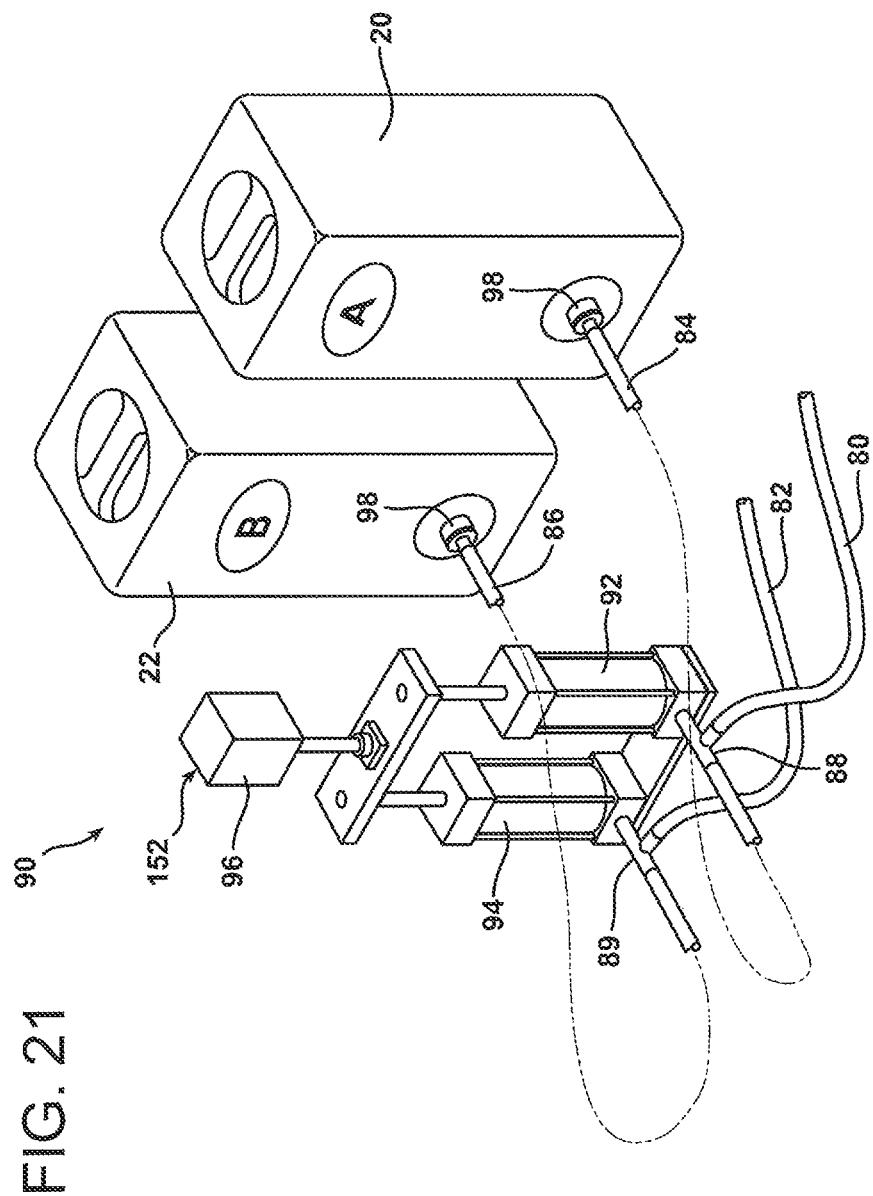
FIG. 21 is a representative view of the foam precursor supply system.
Figure 22:
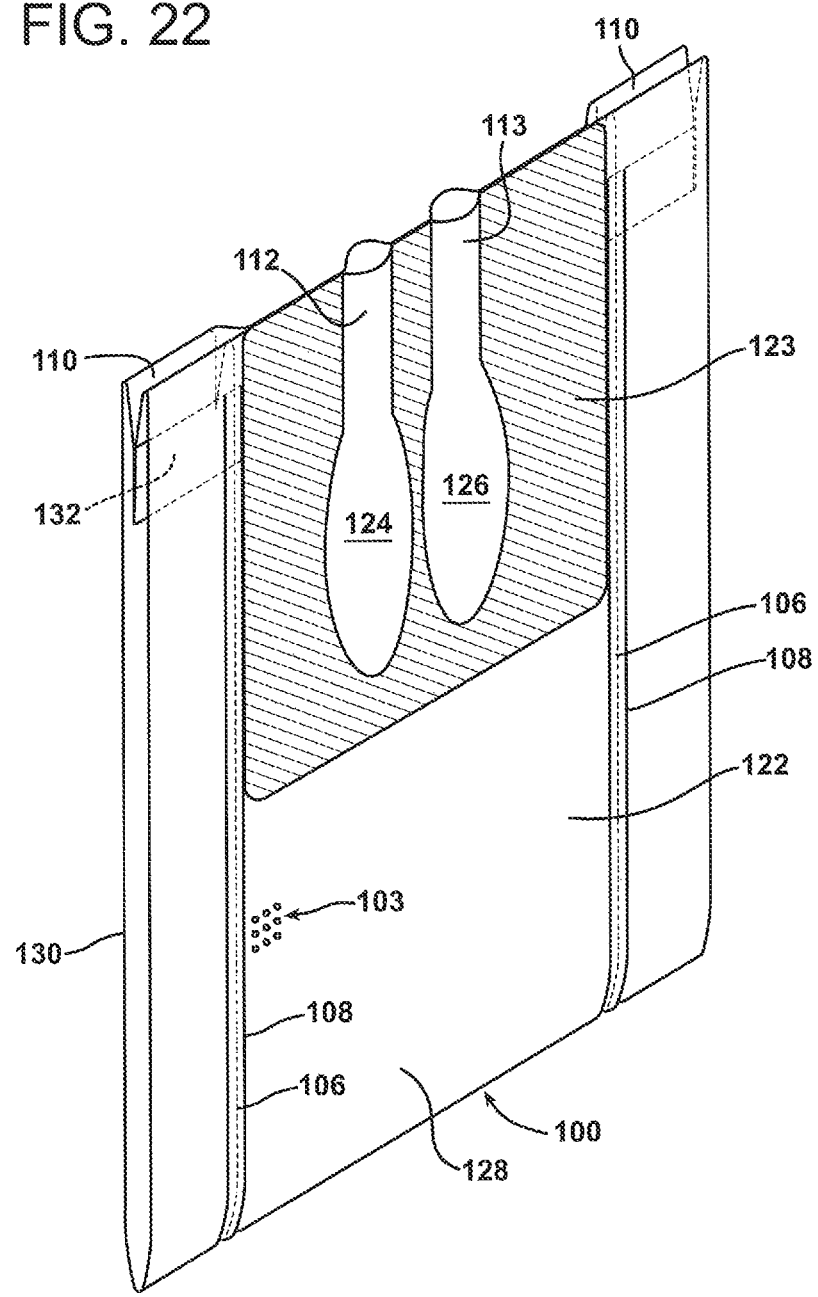
FIG. 22 is a representative view showing the effect on the bag held between the base and shell of the machine when in the base/shell engaged position and the divider engaged position, where the machine is not shown.

Machine 10 comprises foam precursor supply system 90. (FIG. 21.) The supply system comprises first foam precursor supply tank 20 and second foam precursor supply tank 22, which are containers suitable for holding a reservoir of first and second foam precursors 72, 74, respectively. (FIGS. 6 and 21.) Supply tanks 20, 22 may be a bag-in-box container, where the foam precursor is stored within and supplied from a bag housed within a supporting box.

The first foam precursor source tube or hose 84 may be attached to the first supply tank 20 by a hose quick-connect system 98. Such hose quick-connect systems may include a male end attached to the hose 84 and a female end attached to the container 20. The male end of the hose may facilitate puncturing a seal on the container having the female end of the connect. Similarly, second foam precursor source tube or hose 86 may be attached to the second supply tank 22 by a hose quick-connect system 98.

The hose 84 may also be attached to the inlet end of the corresponding three-way shuttle valve 88, having the inlet/outlet end of the three-way shuttle valve attached to first piston 92 and the outlet end of the three-way shuttle valve attached to first foam precursor supply tube or hose 80. Similarly, the hose 86 may also be attached to the inlet end of corresponding three-way shuttle valve 89, having the inlet/outlet end of the three-way shuttle valve attached to second piston 94 and the outlet end of the three-way shuttle valve attached to second foam precursor supply tube or hose 82. The first and second foam precursor supply hoses 80, 82 feed the first and second foam precursors to the injector assembly 50.

Figure 32:
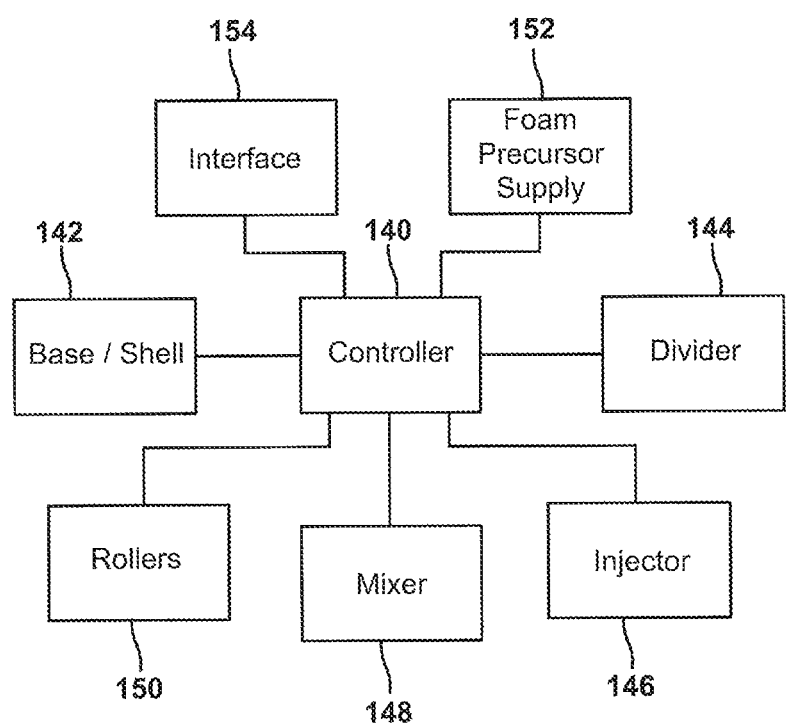
FIG. 32 is a representative schematic drawing of the control system.

The first and second pistons 92, 94 are driven by drive mechanism 152 associated with the foam precursor supply system 90, for example, motor 96, such as a linear stepper motor. (FIGS. 21, 32.) Controller 140 may direct the movement of the pistons 92, 94 by signaling the drive mechanism 152.

Alternative to a piston-based pump system, the foam precursor supply system may comprise other types of pumps, such as one or more diaphragm pumps or bellows pumps, for example, in-line one or more of the supply hoses. The bellows type pump may be housed within the box Any of the pumps, for example, the bellows pump, may be adapted to be manually driven, or alternatively, may be driven by a motor controlled by controller 140.

By way of example, the first foam precursor 72 may comprise one or more: (i) hydroxyl-containing materials, such as polyols (i.e., compounds that contain multiple hydroxyl groups), (ii) water, and optionally (iii) one or more catalysts, foam stabilizers or surfactants, compatibilizers, or other additives (e.g., fragrances, flame retardants, colorants, and viscosity-control agents); and the second foam precursor 74 may comprise one or more isocyanates, such as toluene diisocyanate (TDI) and methylene diphenylisocyanate (MDI), all as conventionally used in foam-in-place/foam-in-bag packaging. Such first and second foam precurors are described, for example, in U.S. Pat. No. 6,034,197, which is incorporated herein in its entirety by reference. Useful polyols include, for example, polyether polyols, diols, such as aliphatic diols, and triols. It is useful to provide the first and second foam precursors 72, 74 as a "two-component" system having the first foam precursor 72 comprising the one or more polyols and water, and the second foam precursor 74 comprising the one or more isocyanates. It may also be useful for the first foam precusor 72 to further comprise the one or more suitable catalysts, surfactants, and any other additives, although one or more of these could be provided as part of the second foam precursor 74, provided there are no significant stability issues.

Useful foam precursors are available having the first foam precursor and the second foam precursor provided in separate containers, for example, from Sealed Air Corporation under the Ultralite®, Instafill®, Instapak®-40W, Instapak®-50W, Instapak®-75W, Instapak®-Molding Foam, Instapak® FlowRite™, GFlex®, GFlex® QS, Instaflex™, Instapak® Rigid, and Instapak® F9401 trademarks.

Injector Assembly

Figure 2:
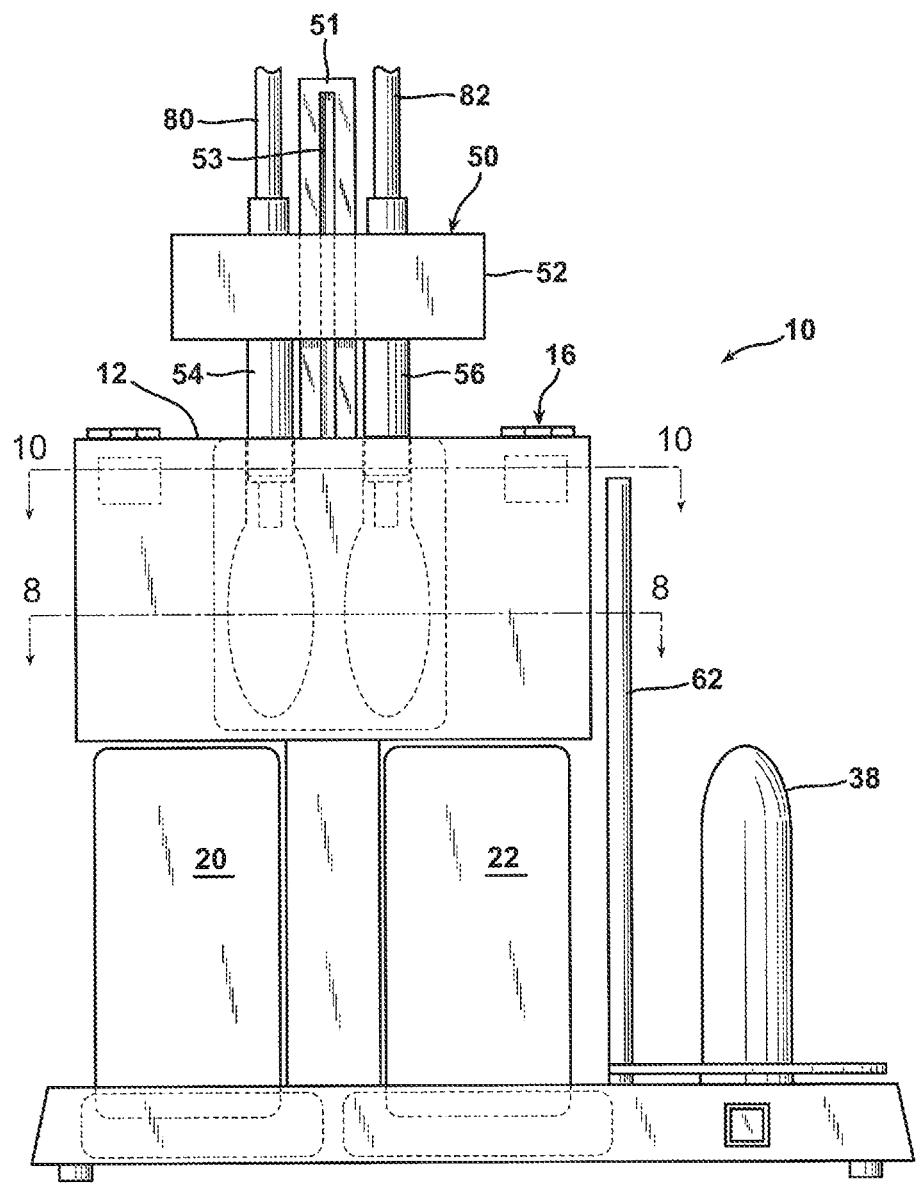
FIG. 2 is a front elevation view of the machine of FIG. 1, but without the installed bags.

Machine 10 comprises injector assembly 50. (FIGS. 1-2.) Injector 50 comprises injector block 52 movably supported by lift 51. For example, the injector block 52 may be slidably attached to the lift 51 along lift guide channel 53, and may driven up and down, for example, by a drive mechanism 146, such as a powered screw drive (not visible) enclosed within lift 51. The drive mechanism 146, such as a powered lift drive, may be directed by controller 140. (FIG. 32.) The injector may be moveable between an injector engaged position (FIGS. 1-2, 11, 14, and 16-17) and an injector retracted position (FIGS. 13, 15, 18-20).

First nozzle block 54 extends from the injector block 52 and supports first nozzle 58, which defines lumen 59. Second nozzle block 56 extends from the injector block 52 and supports second nozzle 60, which defines lumen 61. The injector 50 is adapted to receive the first and second foam precursors 72, 74 from the first and second foam precursor supply hoses 80, 82, respectively, of the foam precursor supply system 90, and deliver these precursors through the lumens 59, 61 respectively of the first and second nozzles 58, 60.

Base and Shell

Figure 3:
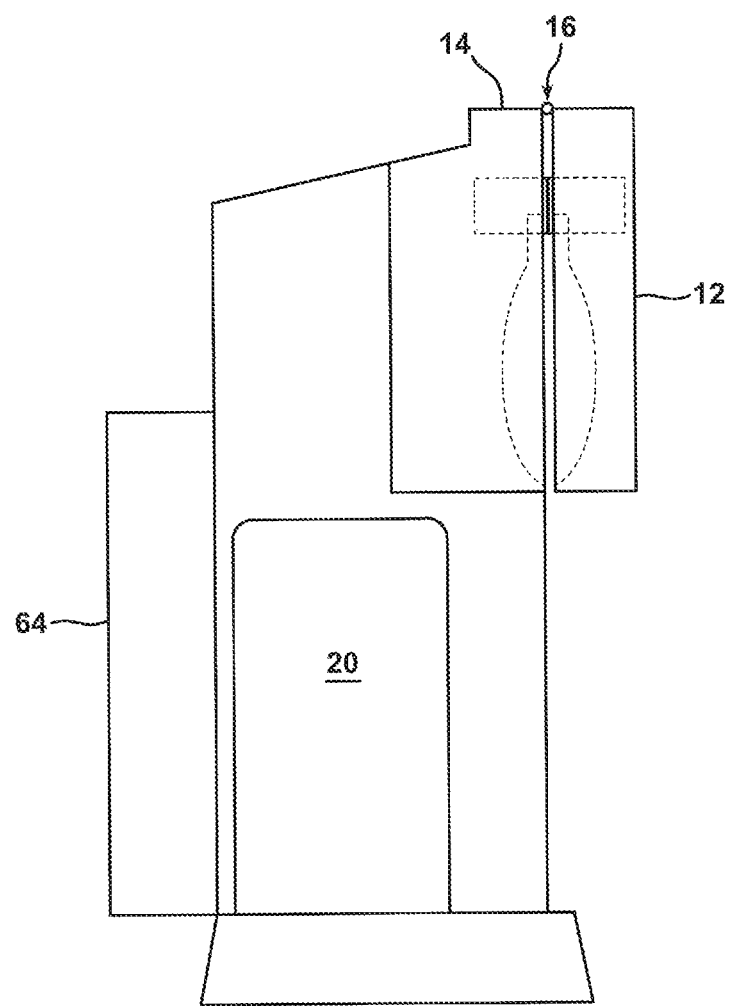
FIG. 3 is a right side elevation view of the machine of FIG. 2, but without illustrating the injector assembly 50 and lift 51.
Figure 4:
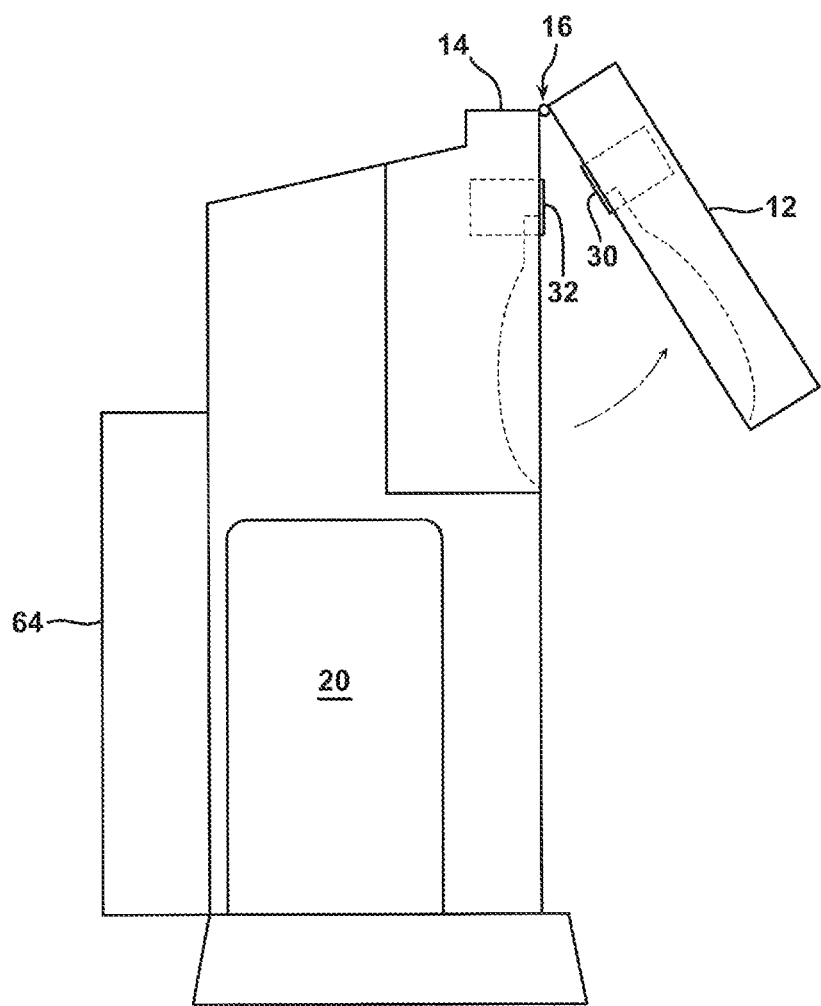
FIG. 4 is a right side elevation view of the machine of FIG. 3, but with the base and shell in the base/shell disengaged position.

Machine 10 comprises base 14 and shell 12 movable relative to each other between a base/shell engaged position (e.g., FIGS. 1 and 3) and a base/shell disengaged position (e.g., FIG. 4). The base and shell are moveable relative each other, for example, by pivoting about hinge 16. The base and shell may be configured such that they are biased to return to a position selected from the base/shell engaged position and the base/shell disengaged position. For example, the hinge 16 may comprise a spring (e.g., may be spring loaded) to provide a bias to maintain the base and shell in either of these positions, for example, may be biased to maintain the base and shell normally in the base/shell engaged position. The base and shell may be movable relative to each other, for example, powered by drive mechanism 142, such as any of a motor, actuator, piston, and solenoid, which may be directed by controller 140. (FIG. 32.)

Figure 5:
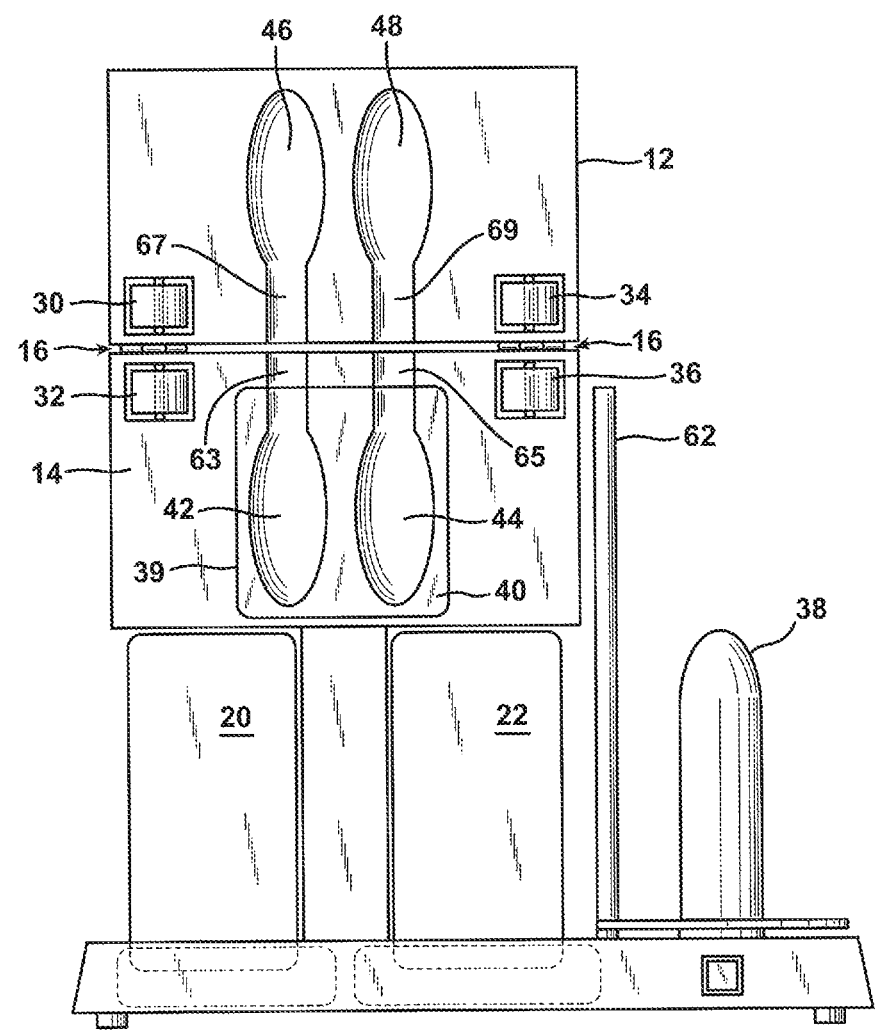
FIG. 5 is a front elevation view of the machine of FIG. 4, but having the shell further opened for illustration purposes.
Figure 9:
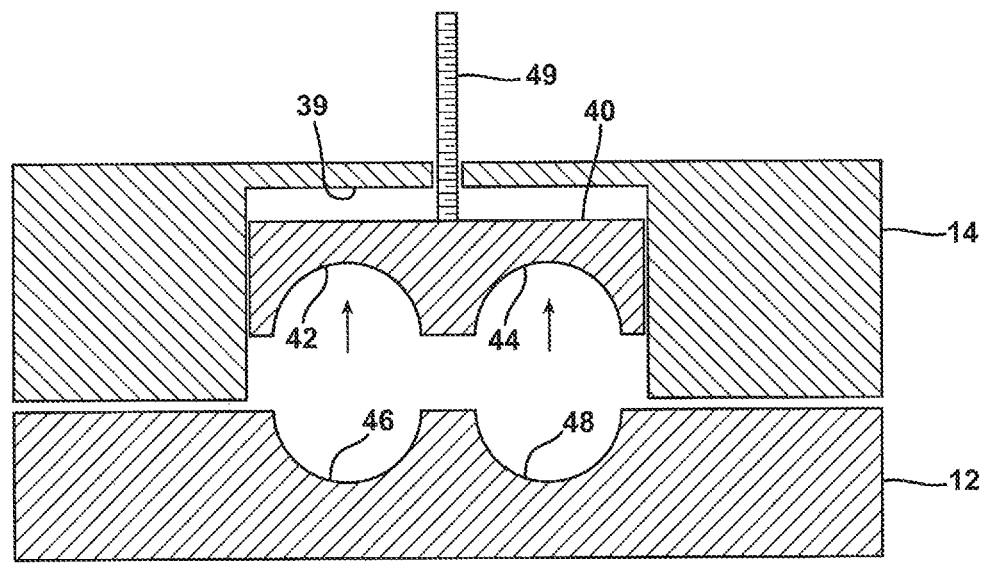
FIG. 9 is a representative partial cross-sectional view similar to FIG. 8, but with the divider 40 in the disengaged position.

Base 14 defines cavity 39. (FIG. 9.) Base 14 may define first channel 63 and second channel 65 extending from the base cavity 39 to the top of the base. (FIG. 5.)

Figure 27:
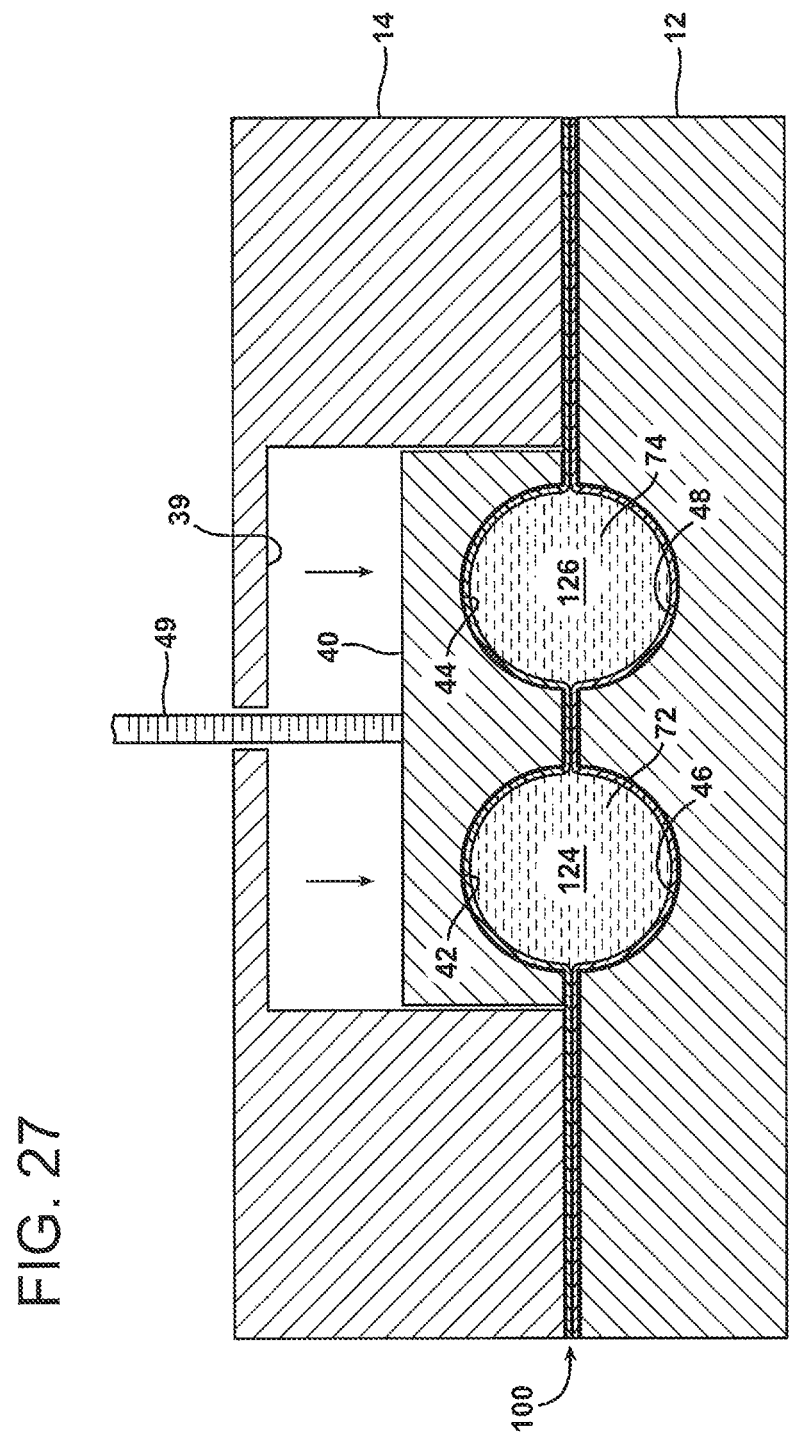
FIG. 27 is a representative partial cross-section view similar to FIG. 26, but showing the first and second foam precursors in the first and second compartments of the bag.
Figure 28:
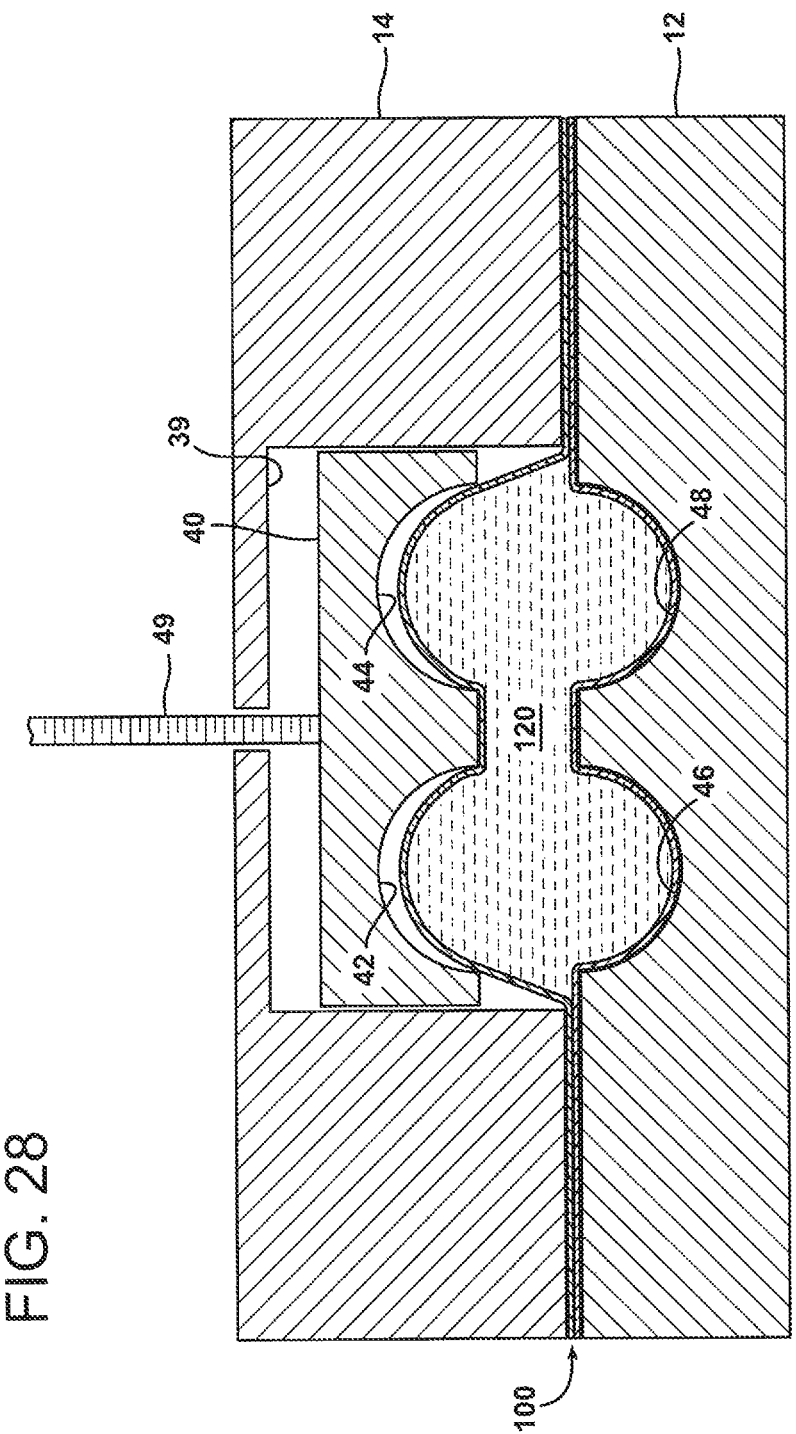
FIG. 28 is a representative partial cross-section view similar to FIG. 8, but showing the machine with the base and shell in the base/shell engaged position and the divider in the divider disengaged position.

Base 14 may moveably support divider 40 within cavity 39. (FIGS. 5, 7-9, 26-28.) Divider 40 may define first concave section 42 and second concave section 44. The divider 40 is movable relative to the base and shell between a divider engaged position (FIGS. 8 and 26-27) and a divider disengaged position (FIGS. 9 and 28). Divider 40 may be moved by drive mechanism 144 associated with the divider, for example, one or more of a motor, actuator, piston, and solenoid. For example, divider 40 may comprise rod 49 slidably received by base 14. Rod 49 may be selectively driven forward and backward within base cavity 39 by any of the drive mechanisms 144. The drive mechanism 144 may be directed by controller 140. (FIG. 32.)

Figure 10:
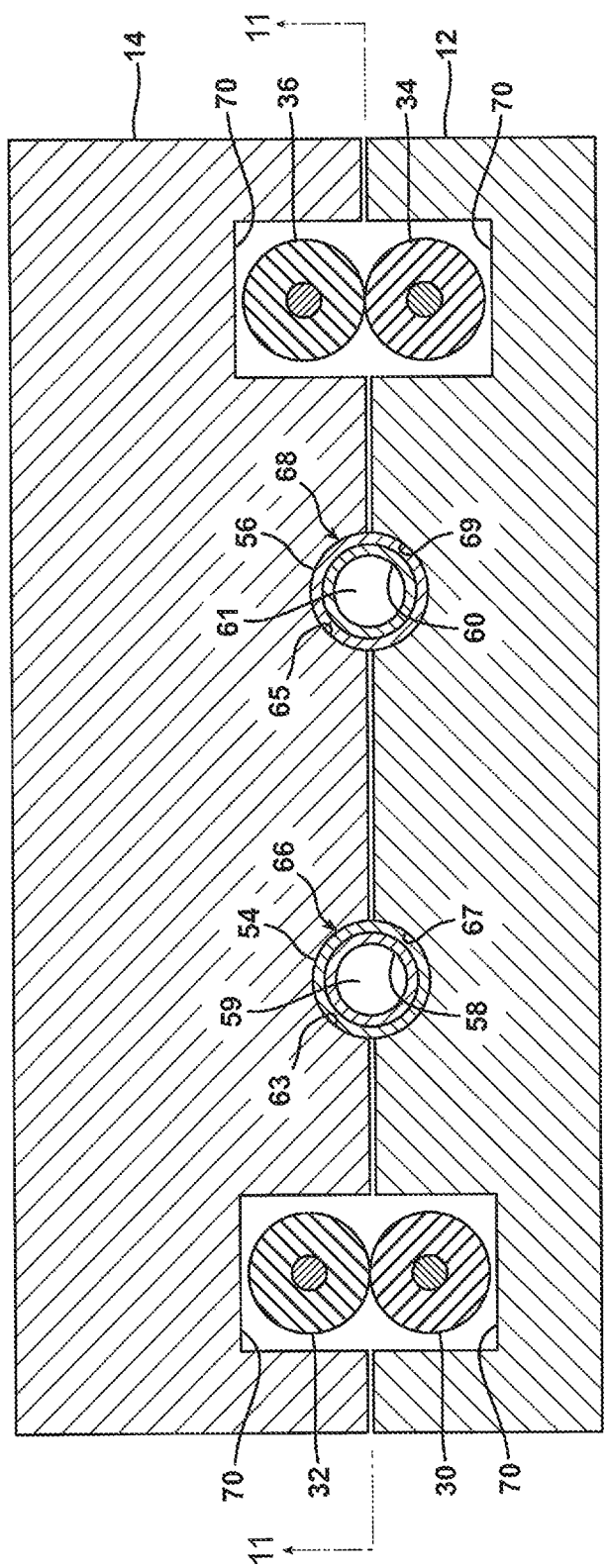
FIG. 10 is a representative partial cross-section view taken along line 10-10 of FIG. 2.
Figure 11:
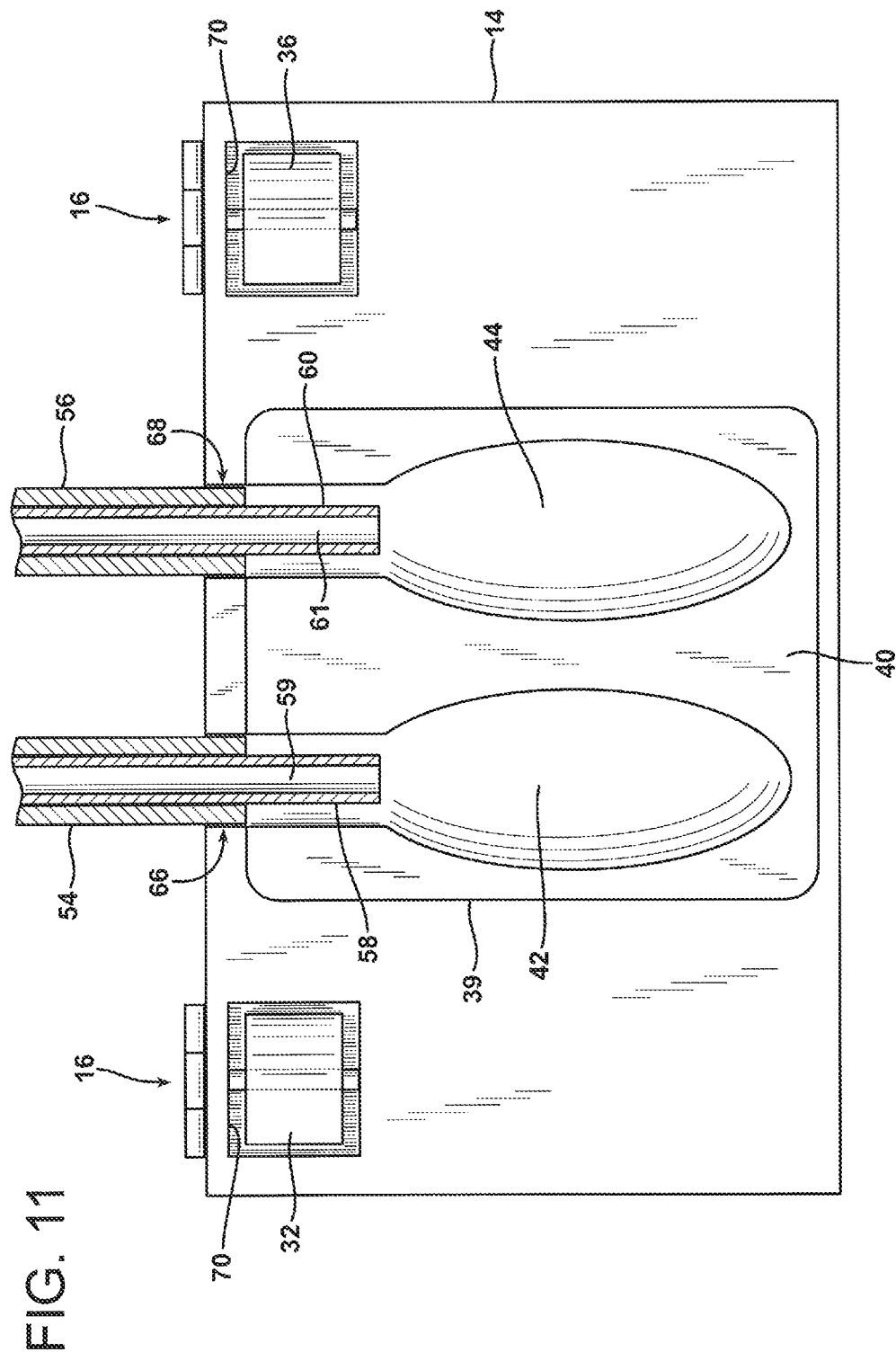
FIG. 11 is a representative partial cross-section view taken along line 11-11 of FIG. 10.

Base 14 may support rear right roller 32 and rear left roller 36 rotatably mounted at least partially within associated roller recesses 70 defined within base 14. (FIG. 10.) One or more of the rollers 30, 32, 34, 36 may be selectively driven by a drive mechanism 150, such as a motor, directed by controller 140. (FIG. 32.)

Shell 12 may define first concave section 46 and second concave section 48. The first concave section 46 of the shell may correspond to and be aligned with the first concave section 42 of divider 40 when the base and shell are in the base/shell engaged position. The second concave section 48 of the shell may correspond to and be aligned with the second concave section 44 of divider 40 when the base and shell are in the base/shell engaged position. Shell 12 may support front right roller 30 and front left roller 34 rotatably mounted at least partially within associated roller recesses 70 defined within shell 12. (FIG. 10.)

Figure 7:
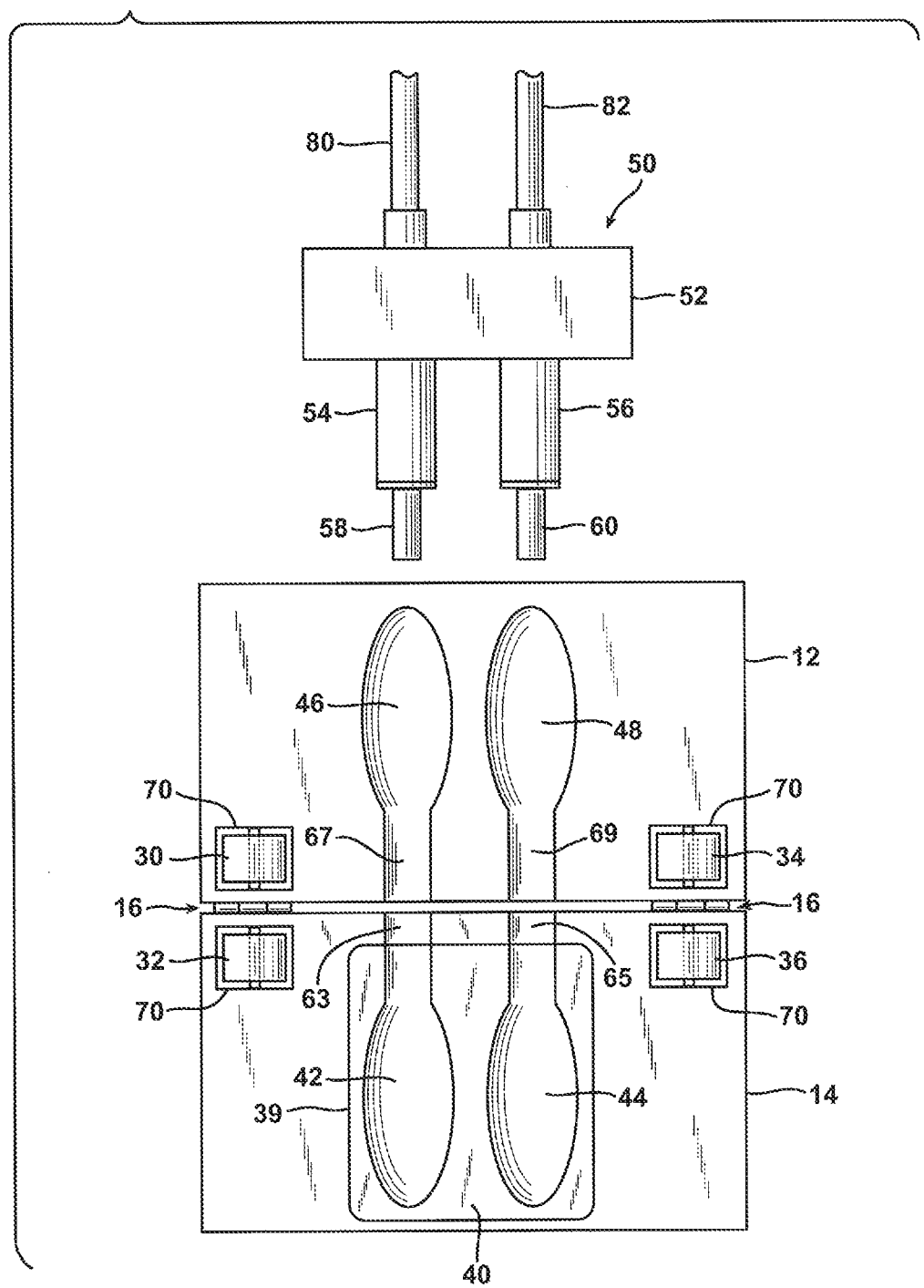
FIG. 7 is a representative front view of the base 14 and shell 12 in the base/shell disengaged position and the injector assembly in the retracted mode.
Figure 8:
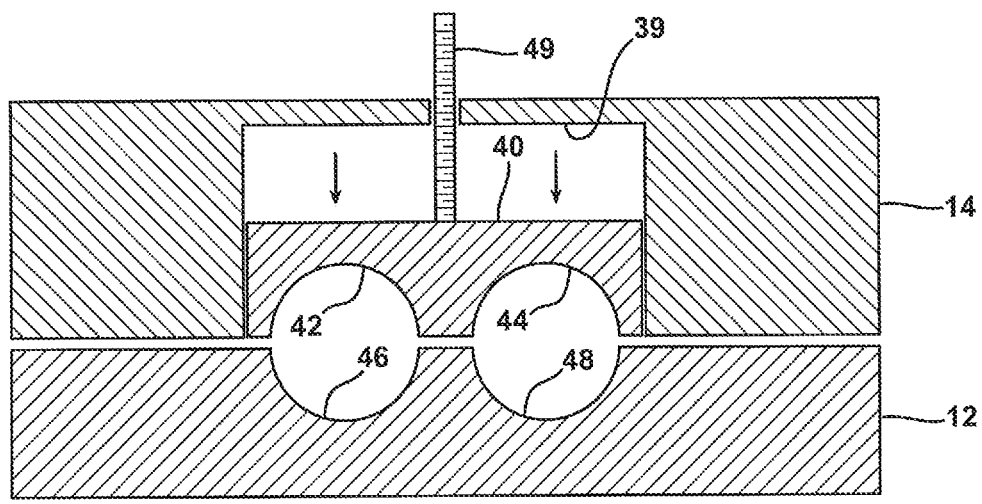
FIG. 8 is a representative partial cross-section view taken along line 8-8 of FIG. 2 showing the divider 40 in the divider engaged position.

Shell 12 may define first channel 67 extending from the first concave section 46 to the top of the shell. Shell 12 may also define second channel 69 extending from the second concave section 48 to the top of the shell. (FIGS. 5-7.) The base 14 and shell 12 may cooperate in the base/shell engaged position to define first throat 66 and second throat 68. (FIG. 1.) For example, first channel 63 of the base and first channel 67 of the shell may oppose each other and cooperate to define first throat 66; and second channel 65 of the base and second channel 69 of the shell may oppose each other and cooperate to define second throat 68. The first throat 66 may surround and engage first nozzle block 54; the second throat 68 may surround and engage second nozzle block 56. (FIG. 10.)

Other Structure

Machine 10 may comprise spindle 38 adapted to support roll of bags 104. Guide roller 62 may be provided to assist in guiding the series of bags 102 from the roll location on the spindle to between the base 14 and shell 12.

A controller 140 (FIG. 32) and/or one or more of the various drive mechanisms discussed herein may be housed in cabinet 64. (FIG. 1.) The controller 140 may receive and send the various status, activation, and control signals described herein along various input/output connections and signal transmission lines between the controller 140 and the various sensors and controlled devices described herein.

The controller 140 may comprise one or more of:
(1) a programmable logic controller ("PLC"),
(2) a central processing unit ("CPU"), for example, comprising a microprocessor, to control the functions and operations of the controller,
(3) a read only memory ("ROM"), for example, to store data and program code,
(4) a random access memory ("RAM"), for example, to provide a work area and a storage area,
(5) a printed circuit assembly containing a micro controller unit (MCU), which stores pre-programmed operating codes,
(6) a personal computer (PC),
(7) various input/output (I/O) interfaces for receiving and sending signals to interface with, direct, or control the operation of any of such drive mechanisms (e.g., motors, actuators, pistons, solenoids, and the like) by any of local control (e.g., via an operator interface), remote control, and/or pre-programmed control, and
(8) other interface, storage, display, and peripheral devices as are known in the art. The controller 140 may also store and execute software control program code for carrying out the various control and monitoring functions described herein.

An interface 154 may provide for human or other interaction or communication with the controller. Interface 154 may comprise one or more of display panels (e.g., liquid crystal displays), monitors, keypads, keyboards, and computer input/output access ports, for example, to provide for loading or modifying software that runs on the CPU of a controller.

Second Embodiment

Figure 29:
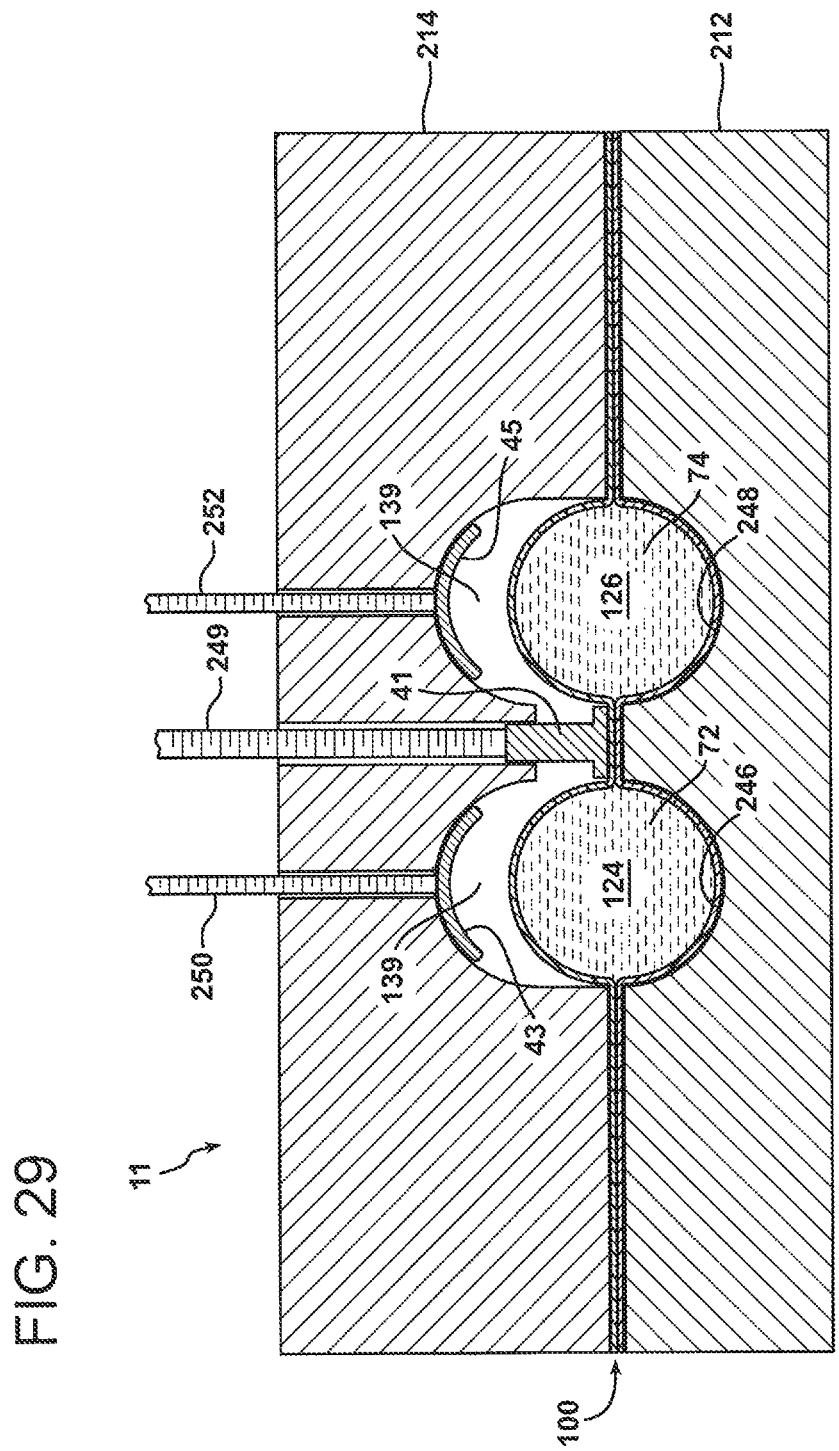
FIG. 29 is a representative partial cross-section view similar to FIG. 27, but of an alternative embodiment showing bag 100 installed in machine 11 with the base and shell in the base/shell engaged position and the divider in the divider engaged position.
Figure 30:
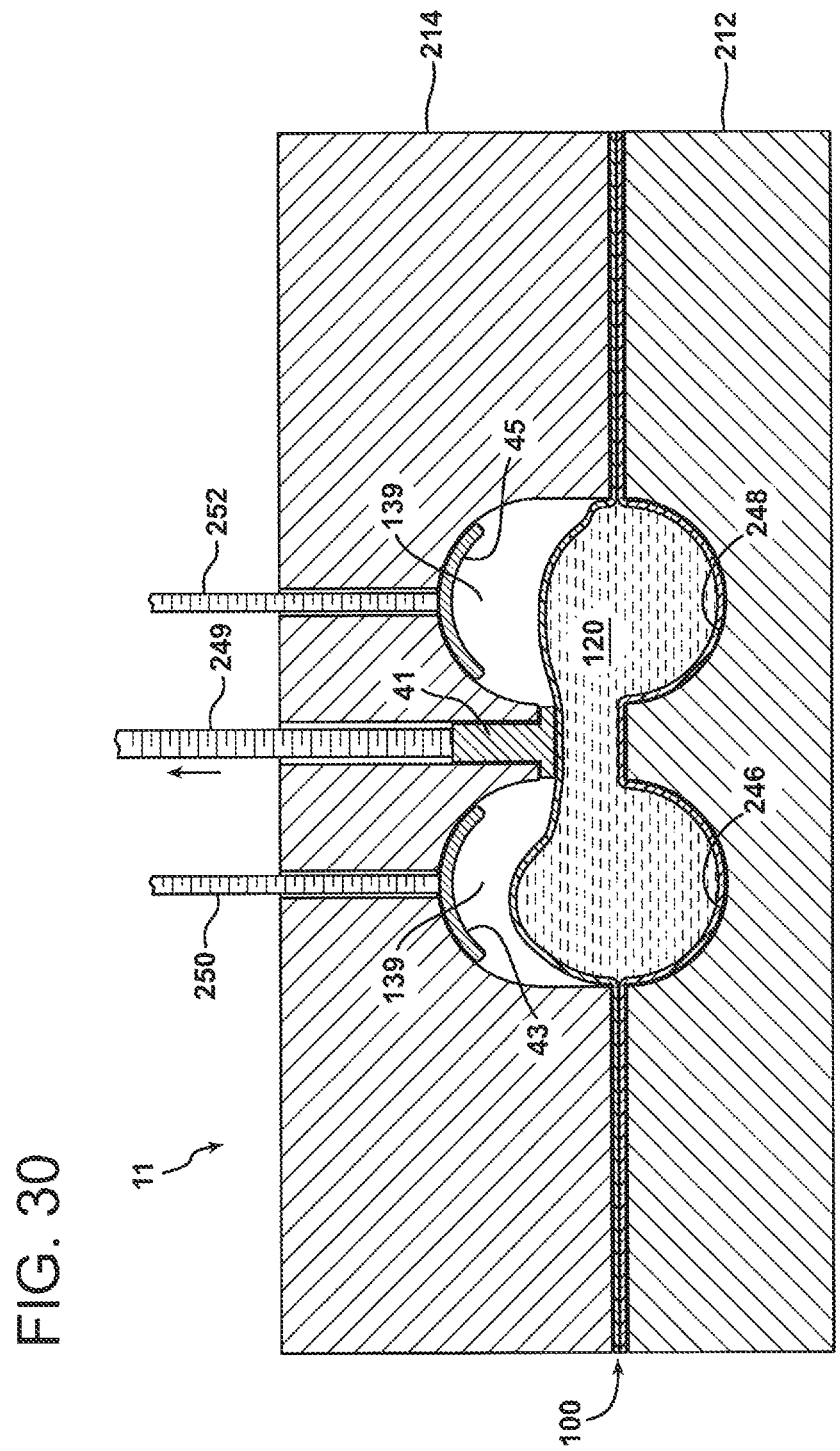
FIG. 30 is a representative partial cross-section view similar to FIG. 29, but showing the machine with the base and shell in the base/shell engaged position and the divider in the divider disengaged position.
Figure 31:
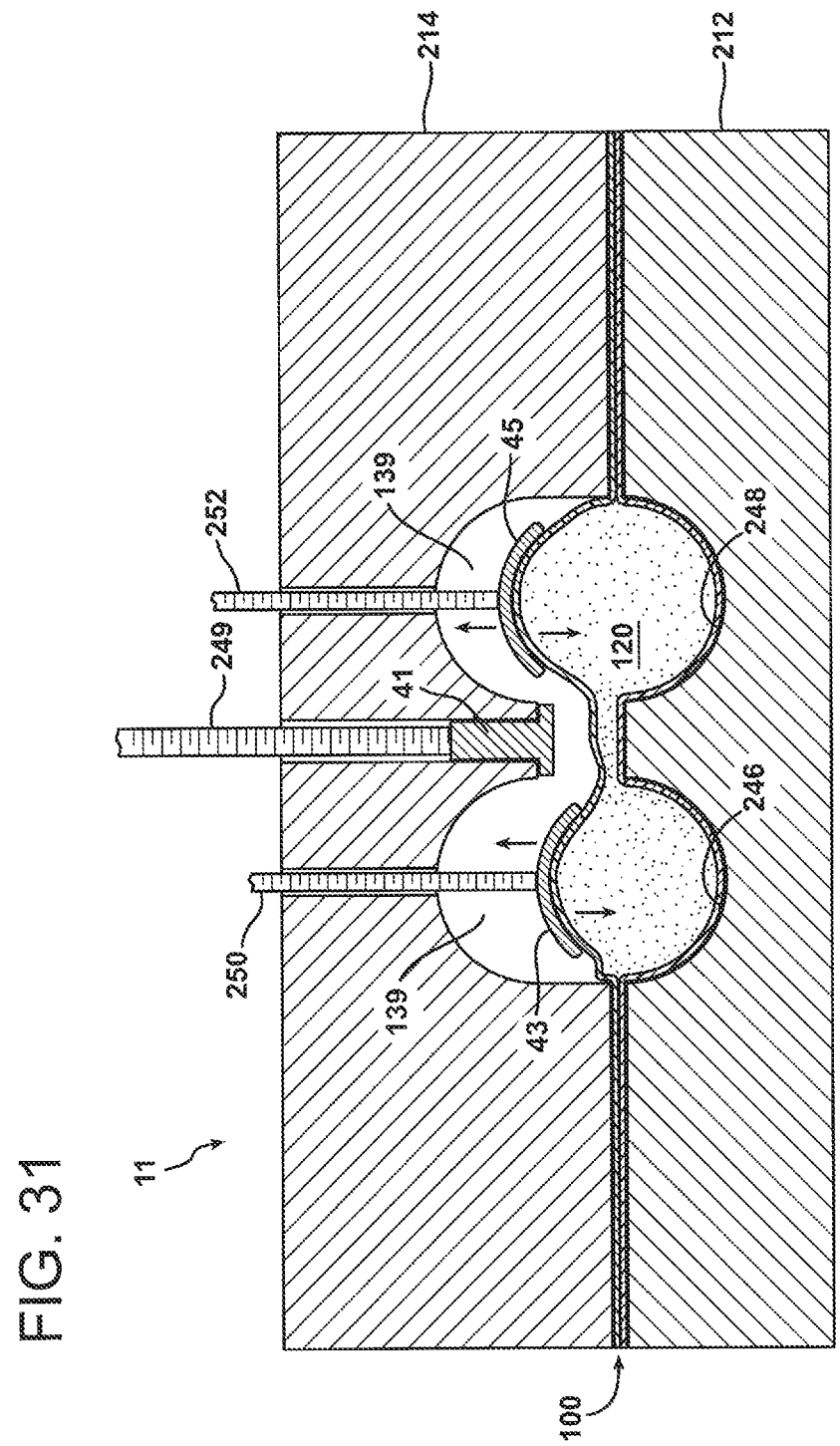
FIG. 31 is a representative partial cross-section view similar to FIG. 30, but showing the machine with the base and shell in the base/shell engaged position, the divider in the divider disengaged position, and the mixers 43, 45 engaging the bag to provide mixing energy.

FIGS. 29-31 illustrate machine 11, which is a second embodiment of the presently disclosed subject matter varying from machine 10 in ways discussed herein. Machine 11 comprises base 214 and shell 212. Base 214 defines cavity 139. Base 214 and shell 212 are movable relative to each other as described herein with respect to the first embodiment.

Base 214 may moveably support divider 41 within cavity 139. (FIGS. 29-31.) The divider 41 is movable relative to the base and shell between a divider engaged position (FIG. 29) and a divider disengaged position (FIGS. 30-31). Divider 41 may be moved by drive mechanism 144 associated with the divider, for example, by one or more of a motor, actuator, piston, and solenoid. For example, divider 41 may comprise rod 249 slidably received by base 214. Rod 249 may be selectively driven forward and backward within base cavity 139 by any of the drive mechanisms 144. The drive mechanism 144 may be directed by controller 140. (FIG. 32.) Shell 212 may define first concave section 246 and second concave section 248.

Base 214 may movably support first mixer 43 and second mixer 45 within cavity 139. The mixers may comprise rods 250 and 252 slidably received by base 214. The first and second mixers 43, 45 are movable between a mixer disengaged position (FIGS. 29-30) and a mixer engaged position (FIG. 31). The first and second mixers 43, 45, and/or rods 250, 252 may be selectively driven forward and backward within base cavity 139 by drive mechanism 148 associated with the mixers, for example, one or more of a motor, actuator, piston, and solenoid, which may be directed by controller 140.

Additional Embodiments

Although, machines 10 and 11 have been described with respect to first and second foam precursors such that these embodiments utilize, for example, first and second foam precursor supply tanks, first and second foam precursor supply lines, first and second nozzles, first and second concave sections of the base and shell, and the like, additional embodiments of the machine may comprise structure to process one or more additional foam precursors, such as a third foam precursor. These additional embodiments are useful where, for example, it is desirable to maintain three distinct compounds or mixtures separate from each other until near or at the time for creation of a foam. For example, a third foam precursor may comprise one or more of any of hydroxyl-containing materials (e.g., polyols), catalysts, or isocyanates that may react with, degrade in the presence of, or have a decreased shelf life if mixed or combined with, the first and second foam precursors described above.

For example, a third foam precursor supply tank may provide a third foam precursor to combine with one of the first or second foam precursors in the corresponding supply line to the injector assembly. Also by way of example, the third foam precursor may combine with one of the first or second foam precursors in the corresponding first or second nozzles. Also, a third foam precursor may be provided by a third supply line into a third nozzle distinct from the first and second nozzles described above. The third nozzle may correspond with third concave sections of the base and shell, which in combination with a second divider, may compliment each other to form a third compartment within the bag to maintain the third foam precursor isolated from the first and second compartments of the bag until mixing to form the foam is desired. In such embodiment, it may be useful to incorporate a third one-way valve in the bag.

Although the bag has been described as comprising first and second one-way valves, in some embodiments of the machine the bag may be provided without one-way valves but with the top edge in an open configuration so that the first and second nozzles do not have to align for insertion into the valves of the bag. In such an arrangement, the top open edge may be sealed closed after injection of the foam precursors into the bag, for example, by incorporating a sealing device such as described in U.S. Pat. No. 6,550,229, previously incorporated by reference. For example, the heat seal device may comprise a pair of opposing counter-rotating rollers and an electrically conducting heating element that contacts one sheet as the front and rear sheets pass between the rollers to press the heated sheets together to form a longitudinal heat seal across the top of the bag to "close" the bag. Such heat sealing capability may be provided in conjunction, for example, with rollers 30, 32 described herein. Further, such sealing devices can be used even where bags incorporate the one-way valves in order to seal the valves "permanently" closed after the foam precursors have been injected. The heat seal device may be located downline from the injector, for example, downline from the base and shell, for example, to effect the transverse heat seal to close the top edge of the bag after the precursors have been mixed together and expanded into the remainder portion of the bag.

Although the bags may be provided as a pre-formed series of bags 102, a portion or all of the bags may be formed by the machine itself from a roll of sheet material, for example, by incorporating capability to make any of heat seals, perforations, folds, and/or cuts, for example, by transverse sealing/severing devices, all as disclosed for example, by any of U.S. Pat. Nos. 4,800,708; 4,854,109; 5,027,583; 5,376,219; 6,003,288; 6,550,229; and 6,675,557; each of which is incorporated herein in its entirety by reference.

Operation

Figure 15:
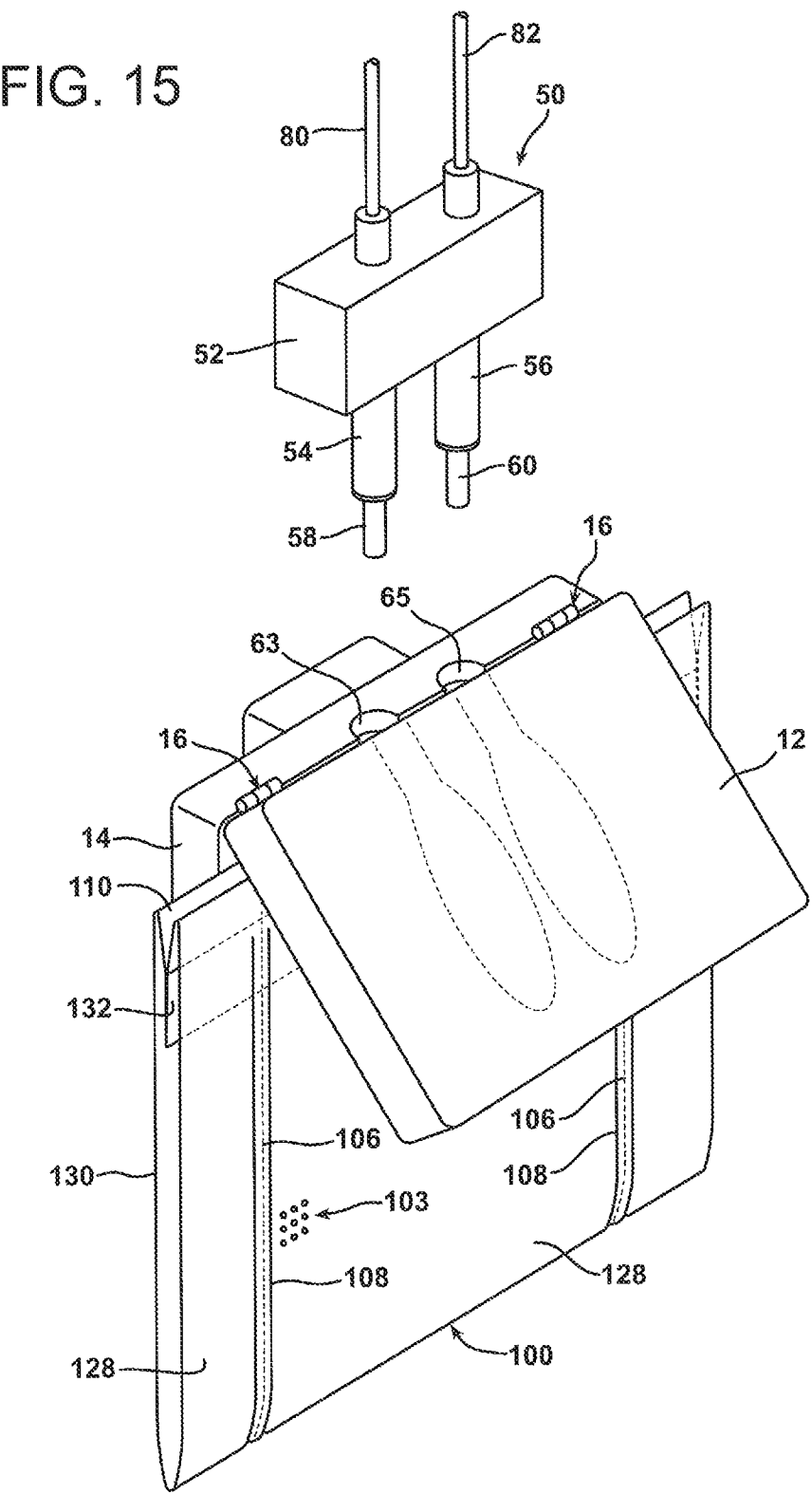
FIG. 15 is a representative view of the base, shell, and injector assembly with the injector assembly in the retracted position and the base and shell in the base/shell disengaged position.

The series of bags 102 may be installed on spindle 38 so that (i) the edge comprising trough 110 is oriented in the top or upward position and (ii) the first and second one-way valves 112, 113 in the fin seal region 132 are oriented at the top of the bag. (FIG. 1.) The base 14 and shell 12 (or base 214, 212) are placed in the disengaged position, in which the base and shell are spaced apart to permit insertion of the bag between the base and shell. (FIGS. 4 and 15.) The series of bags can be installed between upstream opposing front left roller 34 and rear left roller 36 and also between downstream opposing front right roller 30 and rear right roller 32 to set up a bag in the machine.

The bag may be positioned in the machine such that the first and second one-way valves 112, 113 are aligned with and/or beneath throats 66 and 68 formed when the base and shell are placed in the base/shell engaged position. To assist in this alignment, the bag may be provided with an indicator such as an printed "eye spot" or mark (e.g., bar code) that is detectable by a sensor (not illustrated), which can send a corresponding signal to the controller. The controller may index the bags by directing one or more rollers to stop or forward the series of bags until receiving a confirmation signal that the sensor has detected the indicator showing that the bag is properly aligned. The sensor may comprise, for example, one or more of an optical sensing device, such as a photo-eye, an electric-eye, or a photo-detector. Such sensors and their operation are known to those of skill in the art; see for example, U.S. Pat. No. 6,675,557 (column 10), previously incorporated herein. The opposing pairs of rollers may counter-rotate to pull the series of bags from the spindle and between the base and shell.

Figure 16:
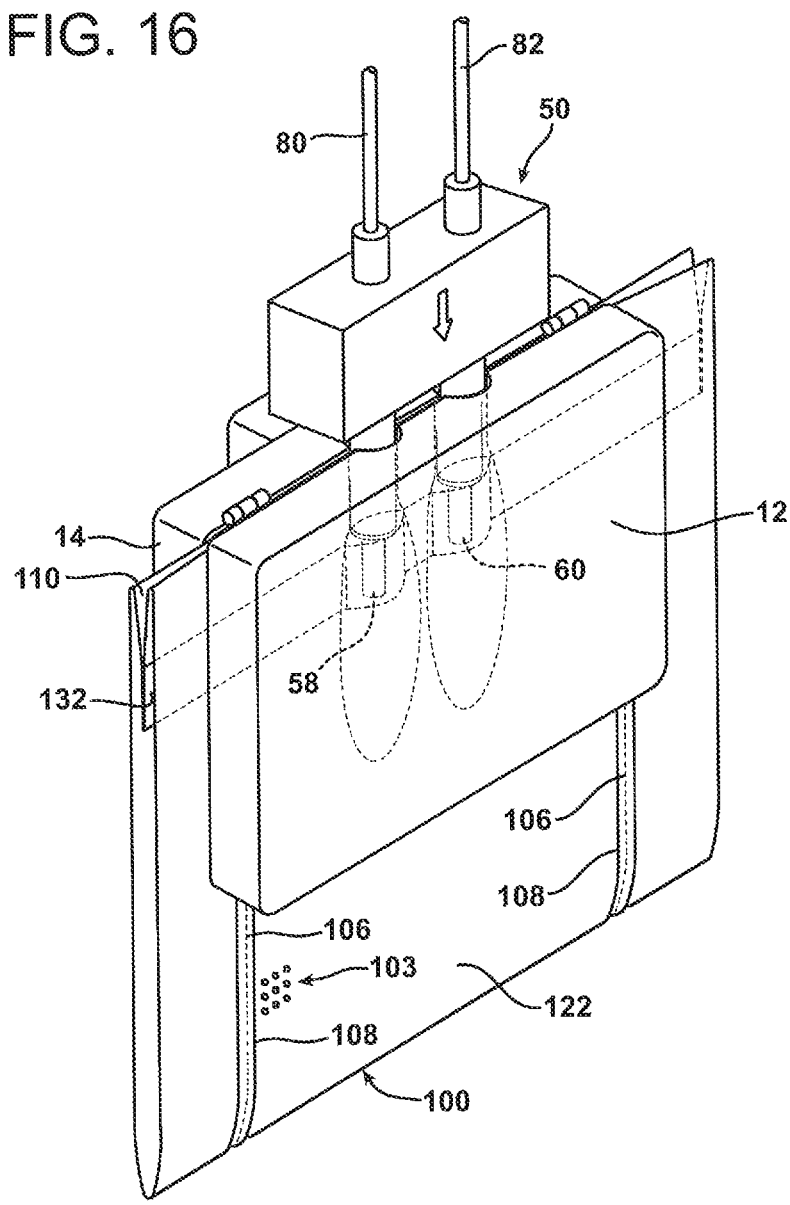
FIG. 16 is a representative view similar to FIG. 15, but with the base and shell in the base/shell engaged position and the injector assembly in the engaged position.
Figure 24:
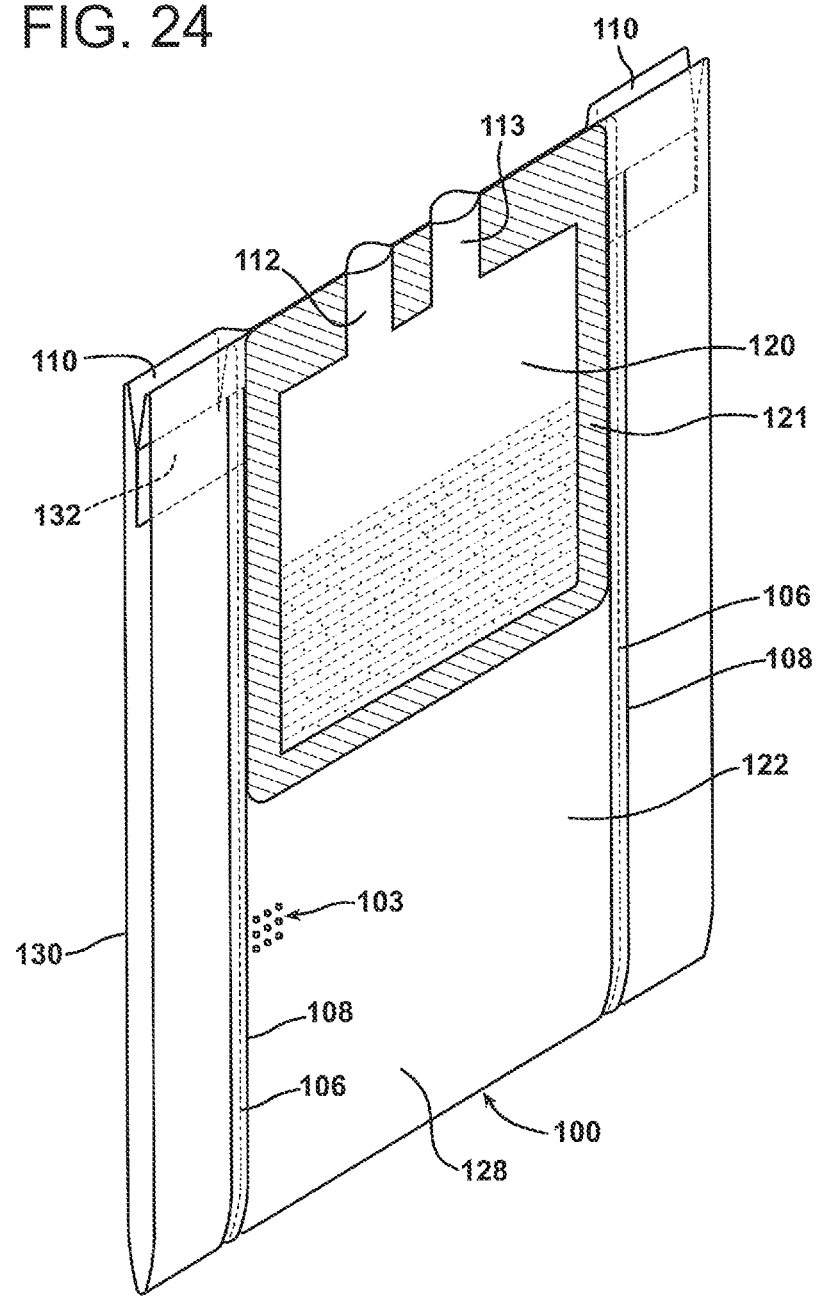
FIG. 24 is the representative view of the effect on the bag held between the base and shell of the machine when in the base/shell engaged position and the divider disengaged position, where the machine is not shown, showing first and second foam precursors mixed together.

The base 14 and shell 12 (or base 214, 212) may be moved relative each other to be placed in the base/shell engaged position in which the shell and base press together to hold the bag 100 between the base and shell to divide the bag 100 into a mixing chamber 120 and a remainder portion 122 such that the mixing chamber 120 is isolated from the remainder portion 122 of the bag. (FIGS. 16 and 24.) Compressed region 121 of bag 100 illustrates and represents the region of bag 100 that is pressed together by the base 14 and shell 12 so that the mixing chamber 120 is isolated from the remainder portion 122 of the bag. In this context, "isolated" means that the mixing chamber and the remainder portion of the bag are not in liquid communication with each other, such that foam liquid precursor that may be injected or placed into the mixing chamber does not transfer or leak into the remainder portion of the bag. The base and shell may be moved relative each other into the base/shell engaged position by spring force provided, for example, at one or more of hinges 16 biased in the base/shell engaged position.

In the base/shell engaged position holding the bag, in a first embodiment divider 40 may be moved relative to the base 14 and shell 12 to the divider engaged position (FIGS. 26-27) and in a second embodiment divider 41 may be moved relative to the base 214 and shell 212 to the divider engaged position (FIG. 29). In the divider engaged position, the divider engages the bag to partition the mixing chamber 120 of the bag into first and second compartments 124, 126 that are isolated from each other while the divider is in the engaged position. Compressed region 123 of bag 100 illustrates and represents the region of bag 100 that is pressed together by the divider 40 as well as base 14 and shell 12, so that the first and second compartments of the bag are isolated from each other and the remainder portion 122 of the bag. In this context, "isolated" means that the first and second compartments of the bag are not in liquid communication with each other, such that foam liquid precursor that may be injected or placed into either of the first and second compartments does not transfer or leak into the other compartment of the bag. In the divider engaged position, the first one-way valve 112 corresponding to first compartment 124 of the bag is also isolated from the second one-way valve 113 corresponding to second compartment 126 of the bag.

Injector assembly 50 may be moved or positioned so that (i) the first nozzle block 54 is held between or engaged by first throat 66, which is formed by opposing first channel 63 of base 14 and first channel 67 of shell 12 when the base and shell are moved to the base/shell engaged position and similarly, (ii) the first nozzle block 56 is held between or engaged by second throat 68, which is formed by opposing second channel 65 of base 14 and second channel 69 of shell 12 when the base and shell are moved to the base/shell engaged position. (FIG. 10.) In this injector engaged position the first nozzle 58 pushes and extends into the first one-way valve 112 of bag 100 (FIG. 14) and the second nozzle 60 extends into the second one-way valve 113 of bag 100. (FIG. 16.) A small burst of pressurized air may be injected from an air supply source (not illustrated) to the injector 50 and into the first and second one-way valves to assist in opening the valves before the first and second nozzles are extended into the valves.

Figure 17:
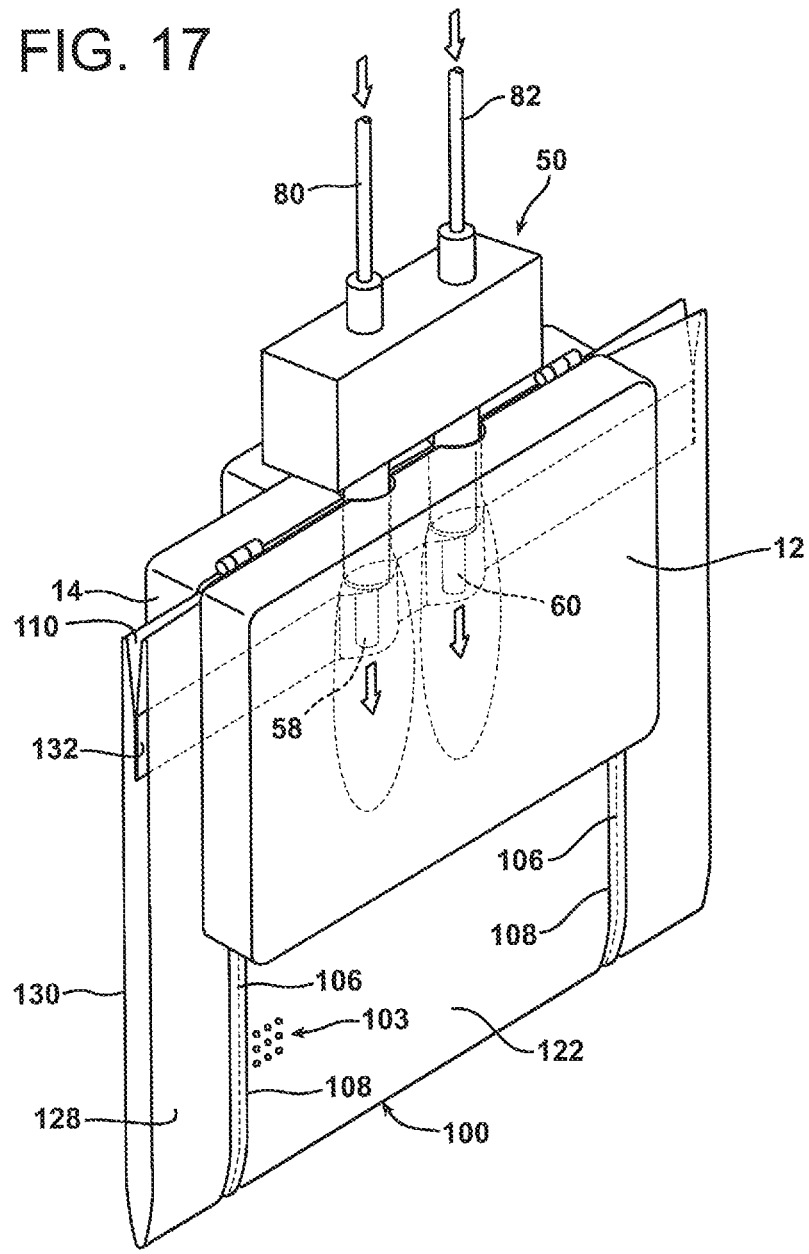
FIG. 17 is a representative view similar to FIG. 16, but representing the injection of foam precursor.
Figure 23:
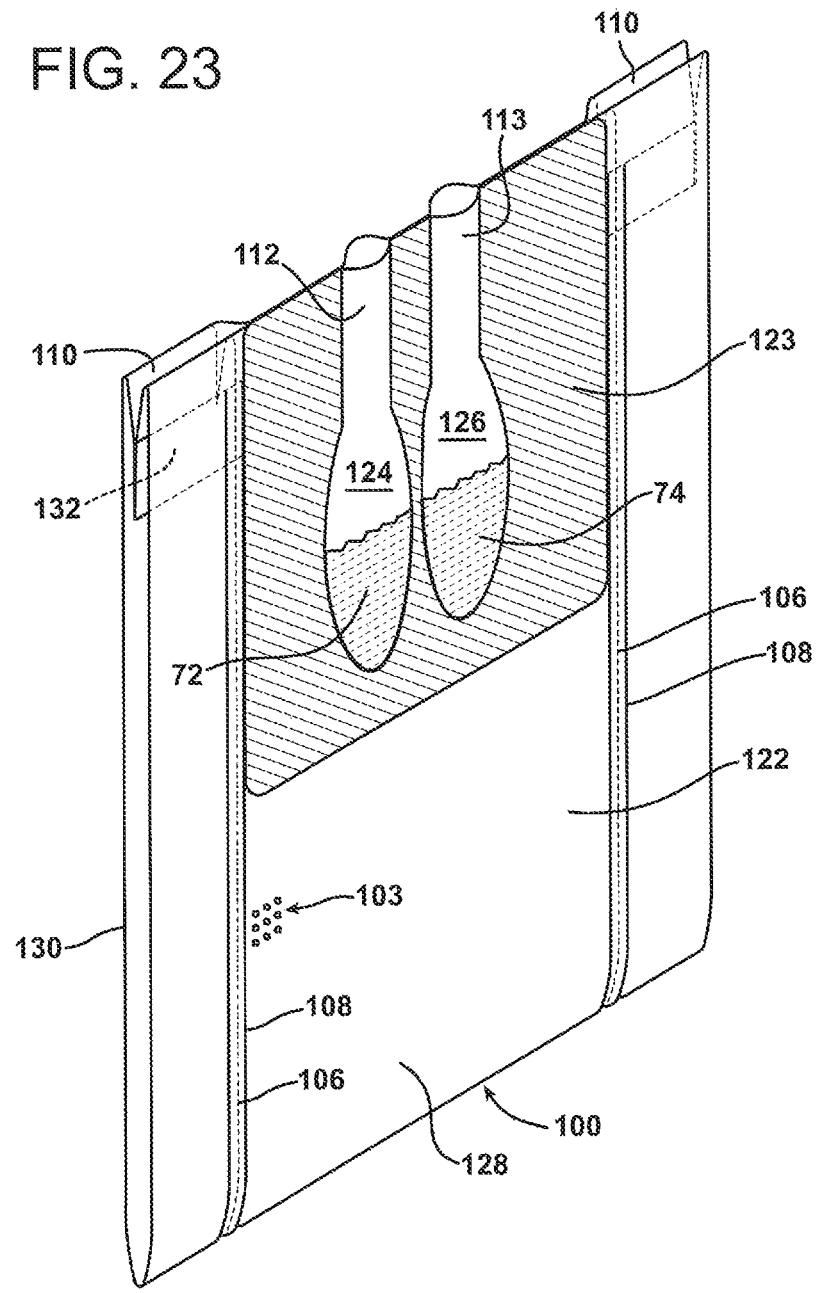
FIG. 23 is the representative view of the effect on the bag as in FIG. 22 but showing foam precursor in the first and second compartments of the bag.

Motor 96 may be directed to move first piston 92 to pump a supply of first foam precursor 72 from the reservoir within piston 92 through first three-way shuttle valve 88 and into first foam supply hose 80. The desired selected amount of first foam precursor 72 sent into the supply hose 80, and subsequently into the first compartment of the bag, may be determined by the amount of travel of the piston 92. (FIG. 21.) The first foam precursor 72 flows through supply hose 80 into injector 50, through the lumen 59 of nozzle 58 and thereby through first one-way valve 112 into first compartment 124 of the bag. (FIGS. 17, 23, and 27.) The motor 96 may then drive the piston 92 in the opposite direction by a selected distance to draw a selected amount of first foam precursor from first foam precursor supply tank 20 through the first three-way shuttle valve 88 and into the piston reservoir.

Similarly, motor 96 may be directed to move second piston 94 to pump a supply of second foam precursor 74 from the reservoir within piston 94 through second three-way shuttle valve 89 and into second foam supply hose 82. The desired selected amount of second foam precursor 74 sent into the supply hose 82, and subsequently into the second compartment of the bag, may be determined by the amount of travel of the piston 94. (FIG. 21.) The second foam precursor 74 flows through supply hose 82 into injector 50, through the lumen 61 of nozzle 60 and thereby through second one-way valve 113 into second compartment 126 of the bag. (FIGS. 17, 23 and 27.) The motor 96 may then drive the piston 94 in the opposite direction by a selected distance to draw a selected amount of second foam precursor from second foam precursor supply tank 22 through the second three-way shuttle valve 89 and into the piston reservoir. A small burst of pressurized air may be injected from an air supply source (not illustrated) to the injector 50 and into the first and second nozzles to clear the remaining first and second foam precursors from the nozzles into the first and second compartments to assist in clearing the nozzles.

The precursors may be supplied to the bag at ambient temperature, in which case the machine may be devoid of structure having a primary purpose of heating one or more of the precursors to above ambient temperature. Alternatively, one or more of the foam precursors may be heated to a desired temperature above ambient temperature, for example, before or during supply to and/or from the injector. Such heating may be accomplished, for example, by using a heating device such as heating electrical resistance "tape" wrapped around one or more of the hoses, by heating one or more portions of the injector through which the precursors pass, and/or by heating the supply tanks of the precursors.

Figure 18:
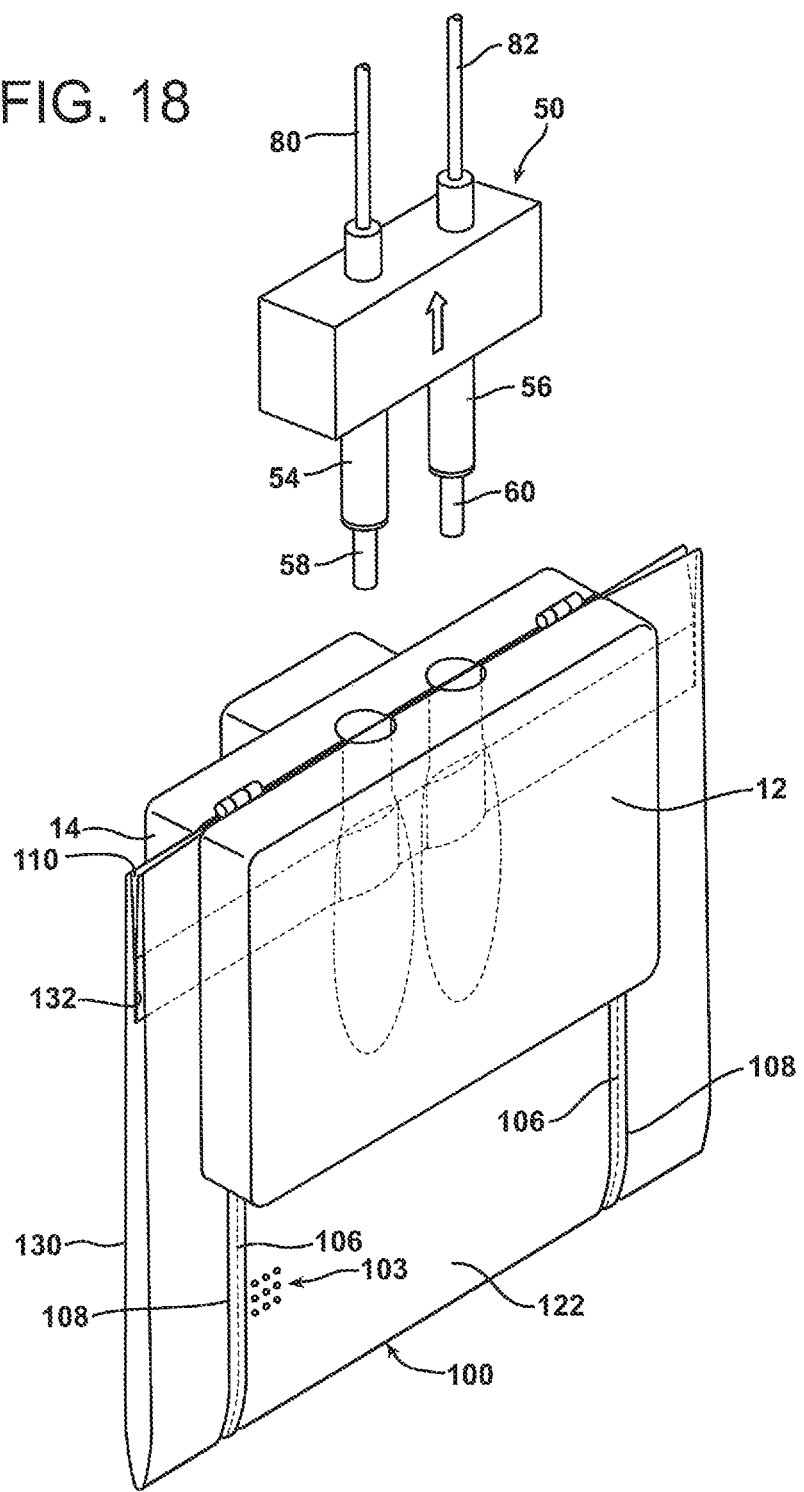
FIG. 18 is a representative view similar to FIG. 17, but with the injector assembly in the retracted position after injecting the foam precursors into the first and second compartments of the mixing chamber of the bag.
Figure 19:
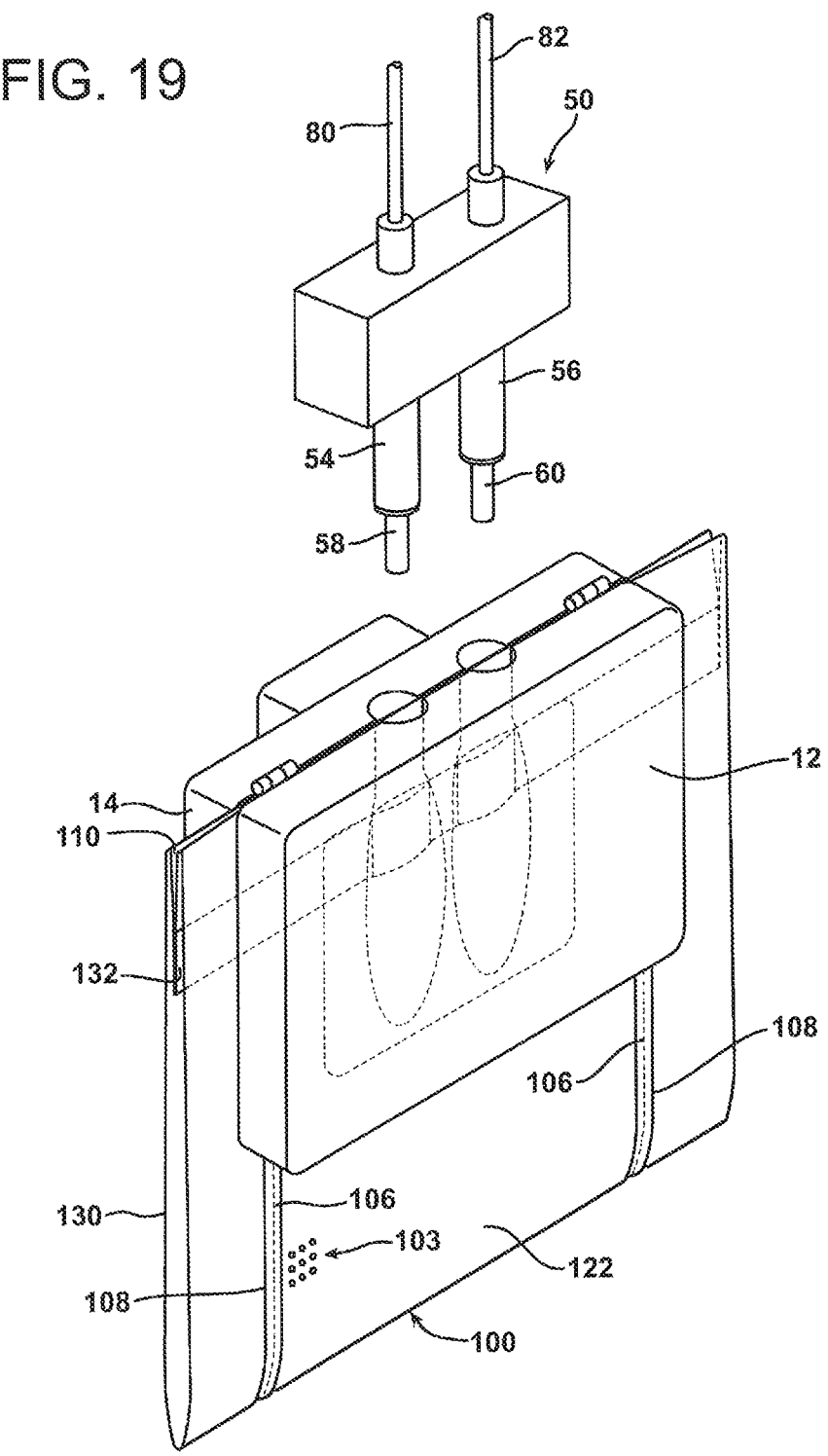
FIG. 19 is a representative view similar to FIG. 18, but having a representation of the divider in the disengaged position so that the first and second foam precursors may react in the mixing chamber of the bag.

After injection of the foam precursors, injector assembly 50 may be moved or positioned in the retracted position so that the first and second nozzles 58, 60 are withdrawn from the first and second one-way valves 112, 113, respectively. (FIG. 18.) The one-way valves are then unencumbered by the nozzles so that the valves may preclude reverse flow of foam precursor from the first or second compartments of the bag. In this manner, there is minimal chance that the first and second foam precursors would encounter each other in the lumens 59, 61 of nozzles 58, 60, respectively, a situation which if occurred could initiate a foaming reaction within the nozzle lumen that might clog the nozzle. Accordingly, the frequency of nozzle clogging and/or the need for solvent cleaning of the nozzles is reduced in comparison to the prior art dispensers discussed in the Background section above.

In a first embodiment, the divider 40 may then be moved to the divider disengaged position, in which the divider 40 does not isolate the first and second compartments of the bag from each other. (FIG. 28.) Similarly, in a second embodiment, the divider 41 may then be moved to the divider disengaged position, in which the divider 41 does not isolate the first and second compartments of the bag from each other. (FIGS. 30-31.) Consequently, the first and second foam precursors are free to interact and begin the foaming reaction within the mixing chamber 120 of the bag. (FIGS. 24, 28, 30.)

In a first embodiment, the mixing of the first and second foam precursors within the mixing chamber of the bag may be facilitated by reciprocating movement of the divider to repeatedly engage the mixing chamber of the bag, for example, as the foam reaction begins, in order to provide mixing energy to the first and second precursors within the mixing chamber of the bag to further the mixing of the first and second precursors thereby enhancing the foaming reaction.

In a second embodiment, the mixing of the first and second foam precursors within the mixing chamber of the bag may be facilitated by reciprocating movement of the mixers 43, 45 to repeatedly engage the mixing chamber of the bag, for example, as the foam reaction begins, in order to provide mixing energy to the first and second precursors within the mixing chamber of the bag to further the mixing of the first and second precursors thereby enhancing the foaming reaction.

The first and second mixers 43, 45 are movable from a mixer disengaged position (FIGS. 29-30) to a mixer engaged position (FIG. 31). The first and second mixers 43, 45, and/or rods 250, 252 may be selectively driven forward and backward within base cavity 139 by drive mechanism 148, which may comprise one or more of a motor, actuator, piston, and solenoid, which may be directed by controller 140.

In both embodiments, as the foam reaction progresses, the foam expands within the mixing chamber of the bag. In one embodiment, the foam expands to the point of pushing the base and shell to the base/shell disengaged position, for example, by pushing against a spring force that is biased to normally position the base and shell in the base/shell engaged position. The gasses generated by or resulting from the foaming reaction may control or may also facilitate the expansion of the mixing chamber to push the base and shell to the base/shell disengaged position. In another embodiment, the base and shell may be placed into the base/shell disengaged position by drive mechanisms discussed herein directed for example by the controller, rather than relying solely upon, or partially upon, the foam or reaction gas by-products to place the base and shell in the base/shell disengaged position.

Figure 20:
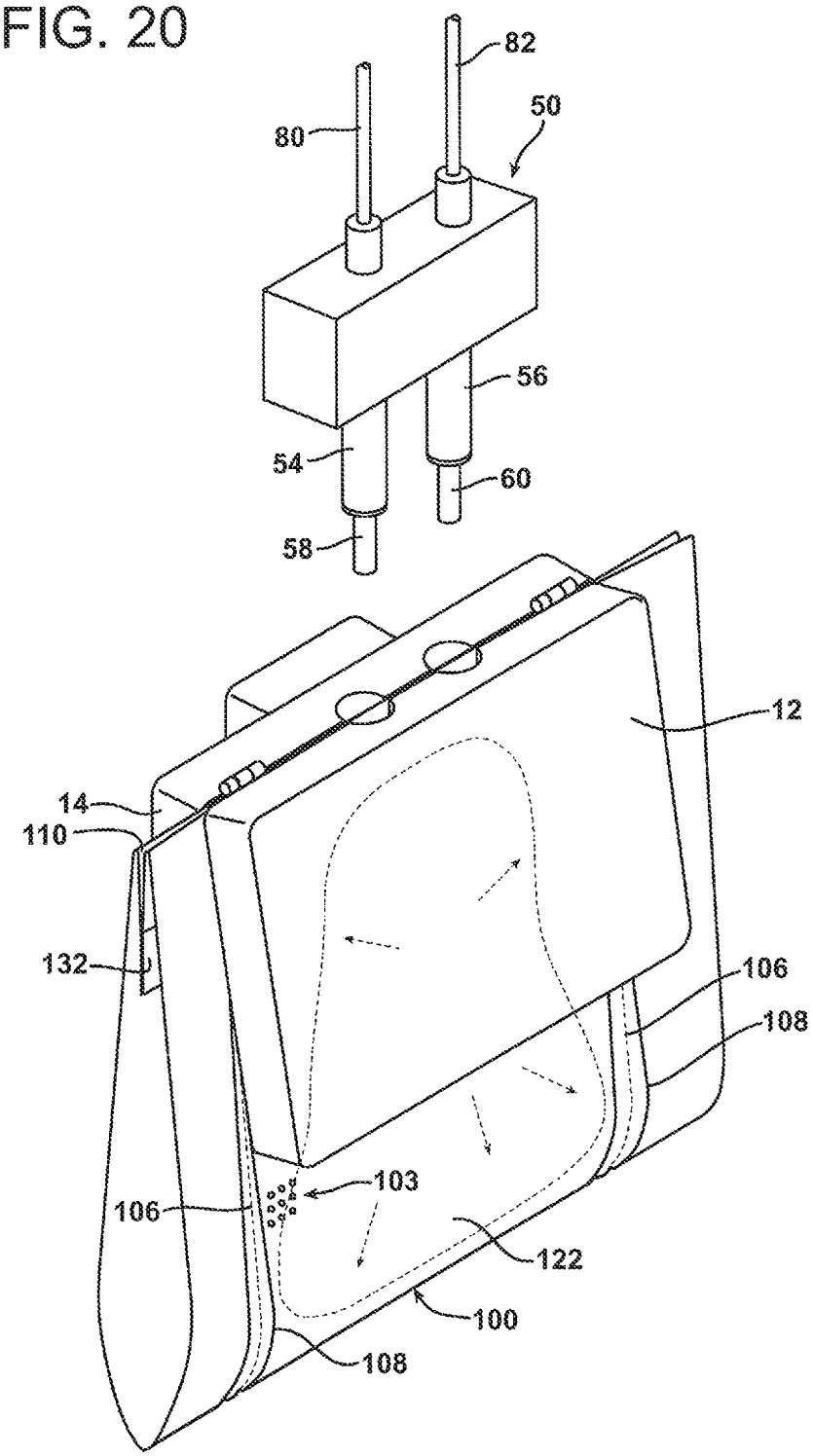
FIG. 20 is a representative view similar and subsequent to FIG. 19, but showing the base and shell in the base/shell disengaged position and representing the foam expanding into the remainder portion of the bag.
Figure 25:
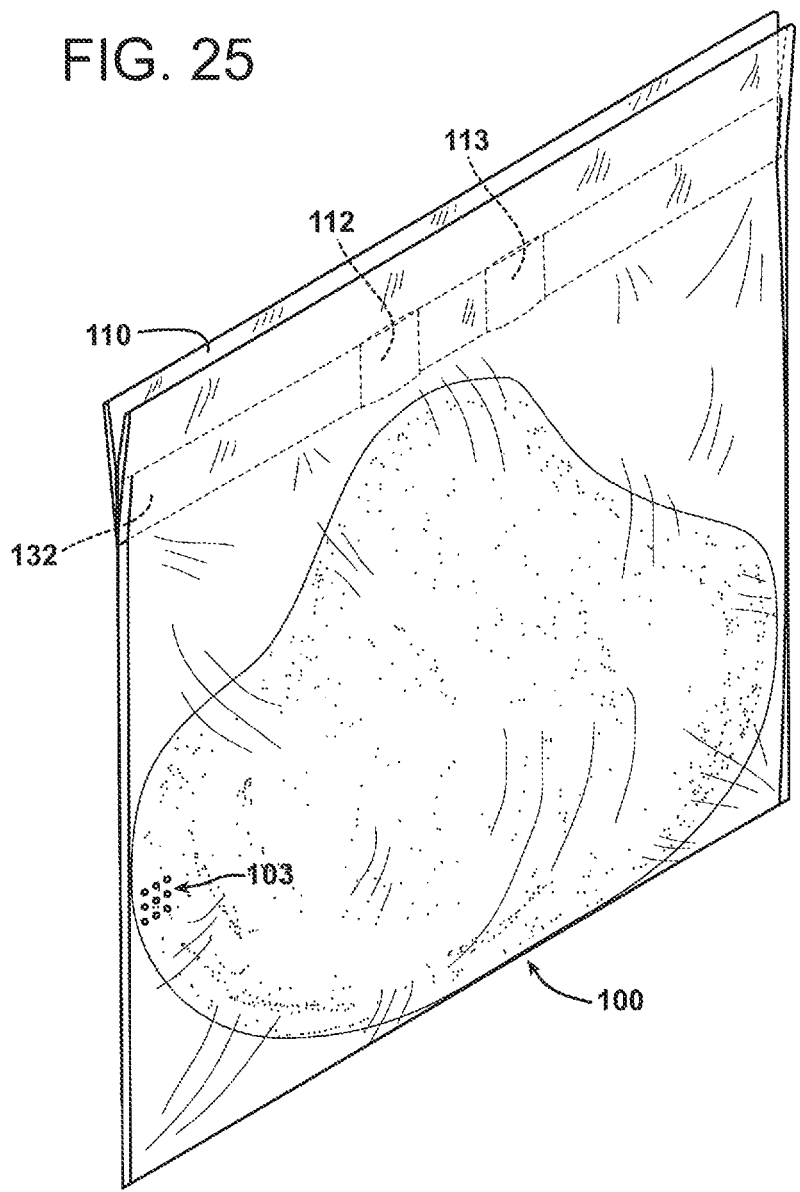
FIG. 25 is a representative view of the effect on the bag where the base and shell are in the base/shell disengaged position and divider is in the disengaged position, where the machine is not shown, showing the reacted foam expanded in the bag.
Figure 26:
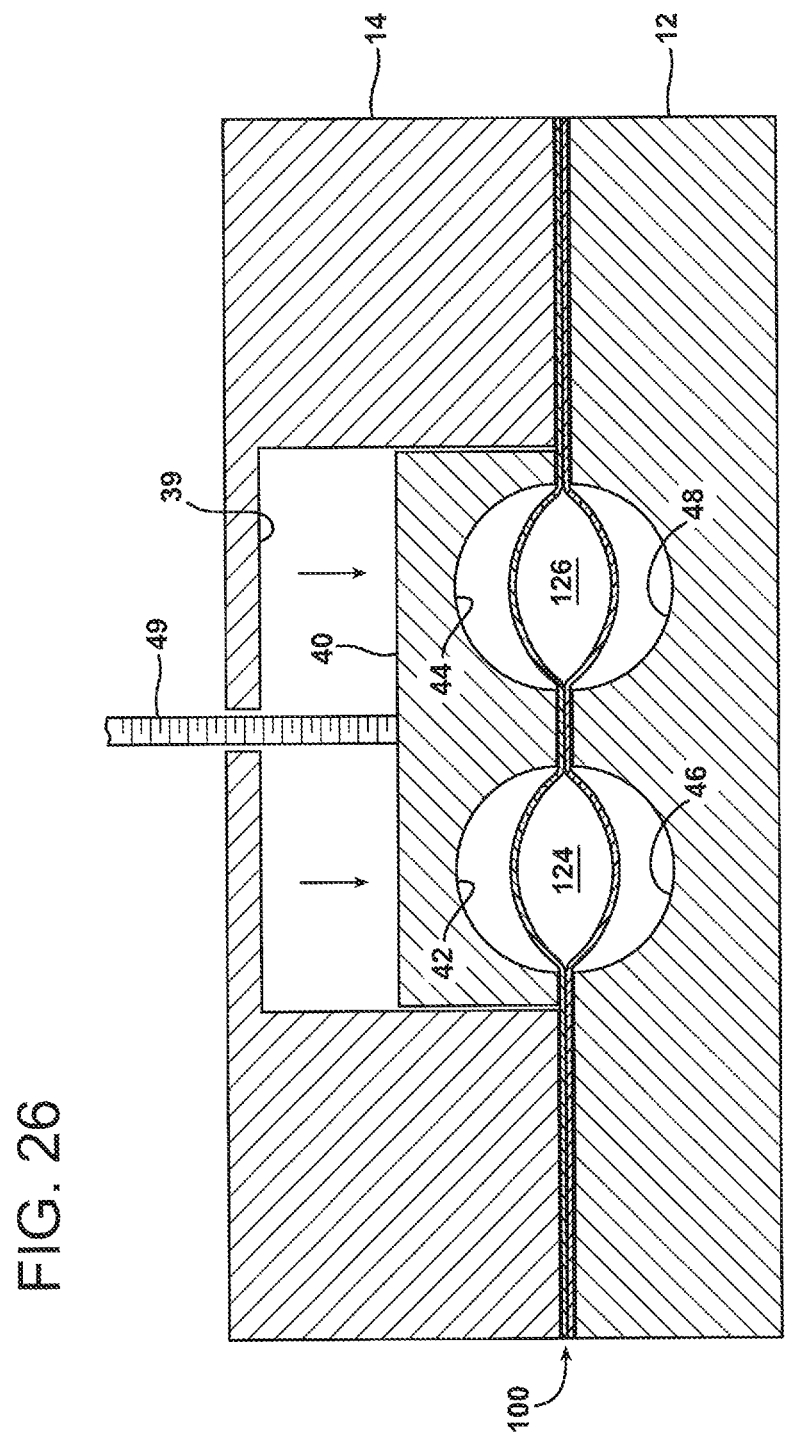
FIG. 26 is a representative partial cross-section view similar to FIG. 8, but showing bag 100 installed in the machine with the base and shell in the base/shell engaged position and the divider in the divider engaged position.

When the base and shell are in the base/shell disengaged position, remaining first and second foam precursors as well as the reacting or expanding foam and reaction by-products may flow into the remainder portion 122 of the bag to complete the reaction. (FIGS. 20 and 25.) The foaming generated excess gasses may flow from the interior of bag 100 through vent 103 to the exterior of the bag. The vent may be sized and positioned on the bag to minimize contact with expanding foam and thereby reduce the likelihood of foam flow through the vent.

The opposing front left roller 34 and rear left roller 36 and/or the downstream opposing front right roller 30 and rear right roller 32 may cooperate to engage the bag and provide a traction for transmitting a propelling force to the bag. By providing rotational power to drive one or more of the rollers, for example by driving rear left roller 36 or rear right roller 32 or both, then the bag 100 containing the reacted foam may be propelled forward, for example in an indexed manner, to place a subsequent bag from the series of bags in position for filling after the foam has been formed in the previous bag. The bag containing the foam may be detached from the subsequent bag, for example, by tearing the bag along the line of weakening 106.

One or more of the various drive mechanisms described herein may be directed by controller 140. (FIG. 32.) The controller may be programmed to direct the operation of machines 10 or 11, for example, by directing any of the drive mechanisms in a desired coordinated and sequenced manner to effect the operation as discussed herein. For example, the controller may direct the placement of base 14 and shell 12 in the base/shell engaged position and/or the base/shell disengaged position by signaling drive mechanism 142 associated with the base and/or shell. The controller may also direct the movement of divider 40 between the divider engaged position and the divider disengaged position by signaling the drive mechanism 144 associated with the divider. Further, if the divider is to be reciprocated to provide mixing energy to the mixing chamber of the bag, then the controller 140 can direct the reciprocating movement of divider 40 by signaling the drive mechanism 144. If the mixing energy is provided by one or more mixers, for example, mixers 43, 45, then the controller 140 may direct the movement of the mixers by signaling the drive mechanism 148 associated with the mixers.

The controller 140 may direct the positioning of the injector assembly 50 in the injector engaged position or the injector retracted position by signaling the drive mechanism 146 associated with the injector assembly, for example, lift 51. The controller 140 may also direct the movement of the pistons 92, 94 by signaling the drive mechanism 152 associated with the foam precursor supply system 90, for example, motor 96. Further, the controller 140 may also direct the movement of one or more of the rollers 30, 32, 34, 36 by signaling the drive mechanisms 150 associated with the rollers.

Third Embodiment

Figure 33:
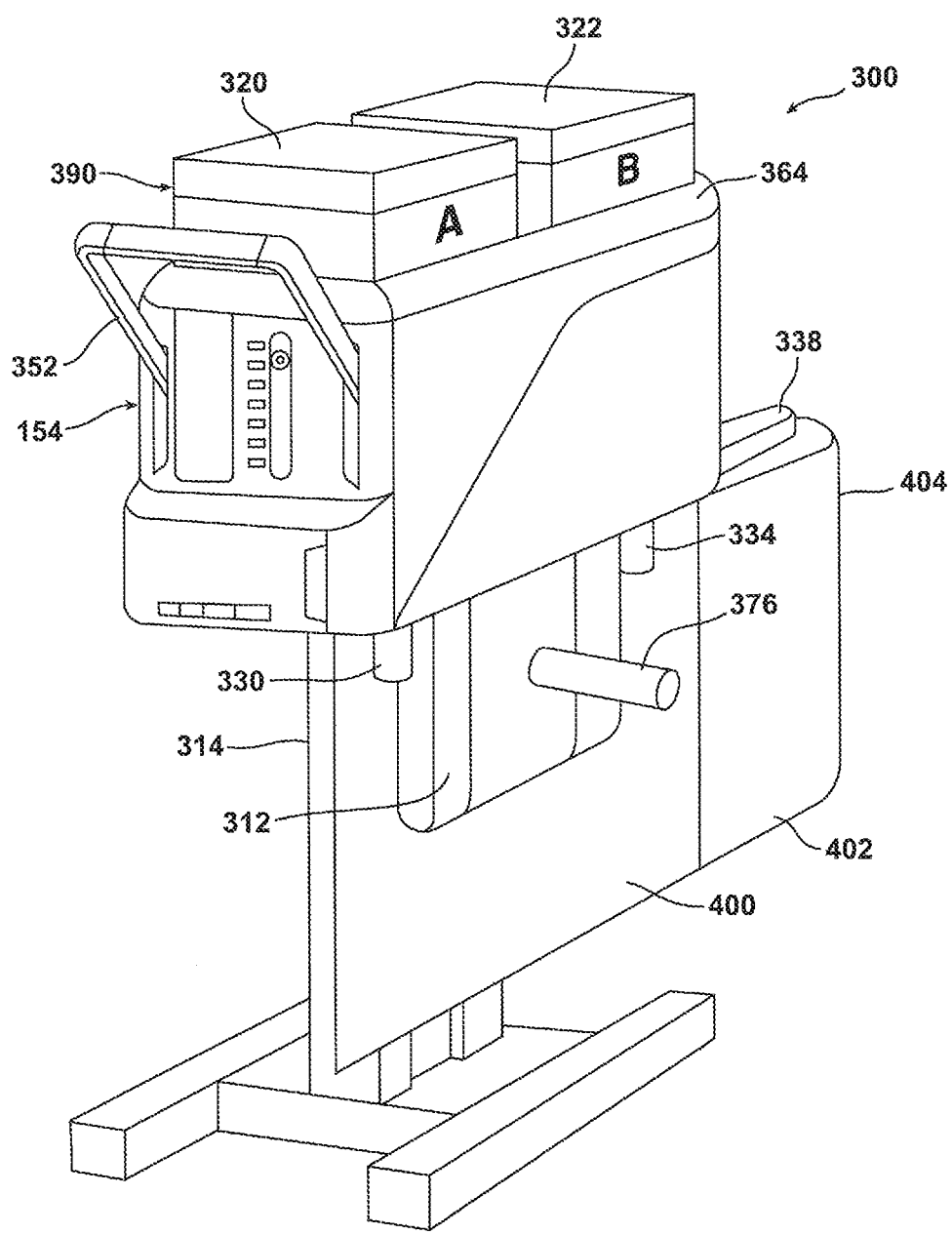
FIG. 33 is a representative perspective view of an embodiment machine 300 having a roll 404 of series of bags 402 installed and the shell 312 in the base/shell engaged position.
Figure 34:
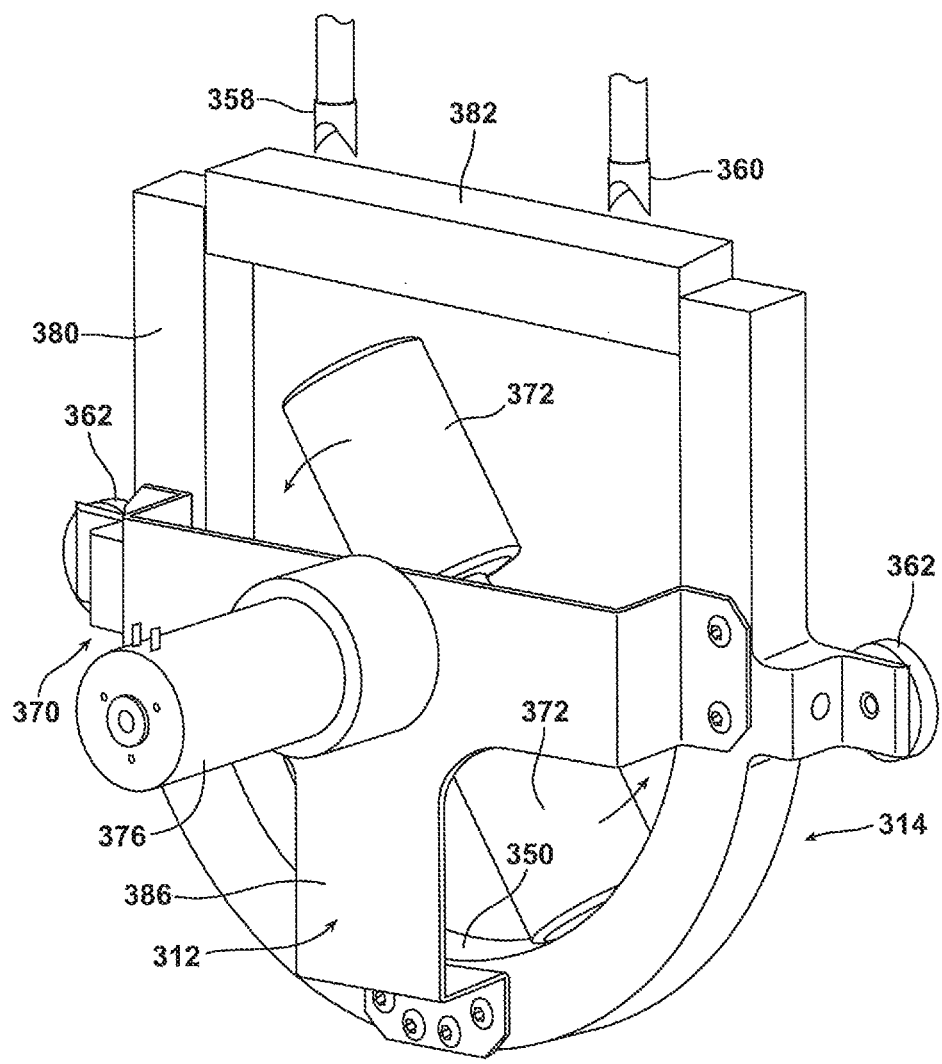
FIG. 34 is a representative partial perspective view of the shell 312, base 314, mixer 370, and nozzles 358, 360 of machine 300.

Machine 300 represents a third embodiment of the machine of the presently disclosed subject matter for producing foam within a bag, for example, bag 400. (FIG. 33.) The description of bag 400 is similar to that of bag 100 described herein, and therefore that description is not repeated here. Machine 300 comprises foam precursor supply system 390. (FIG. 33.) The supply system may be supported by base 314. The supply system comprises first foam precursor supply tank 320 and second foam precursor supply tank 322, which are containers suitable for holding a reservoir of first and second foam precursors 72, 74, respectively. (FIG. 33.) Supply tanks 320, 322 may comprise a bag-in-box configuration, as described herein. The supply system comprises supply hoses (not visible) connecting each of the supply tanks to its respective first nozzle 358 and second nozzle 360 (FIG. 34). Selected or desired amounts of the first and second foam precursors may be transferred through the hoses to the first and second nozzles by use of pistons or pumps (e.g., in-line bellows pump) such as described herein with respect to other embodiments. The pistons or pumps of supply system 390 may be driven by manual energy, for example, utilizing hand lever 352, or may be motor driven for example as described herein with respect to other embodiments. The first and second nozzles 358, 360 may be mounted to or supported by base 314. For example, the first and second nozzles may be fixedly mounted to the base such that in operation they are stationary relative to base 314 (FIG. 34), in which case the nozzles are not adapted for movable retraction and insertion as described herein. Alternatively, the first and second injectors may be movably mounted to the base, as described herein with respect to other embodiments.

Figure 35:
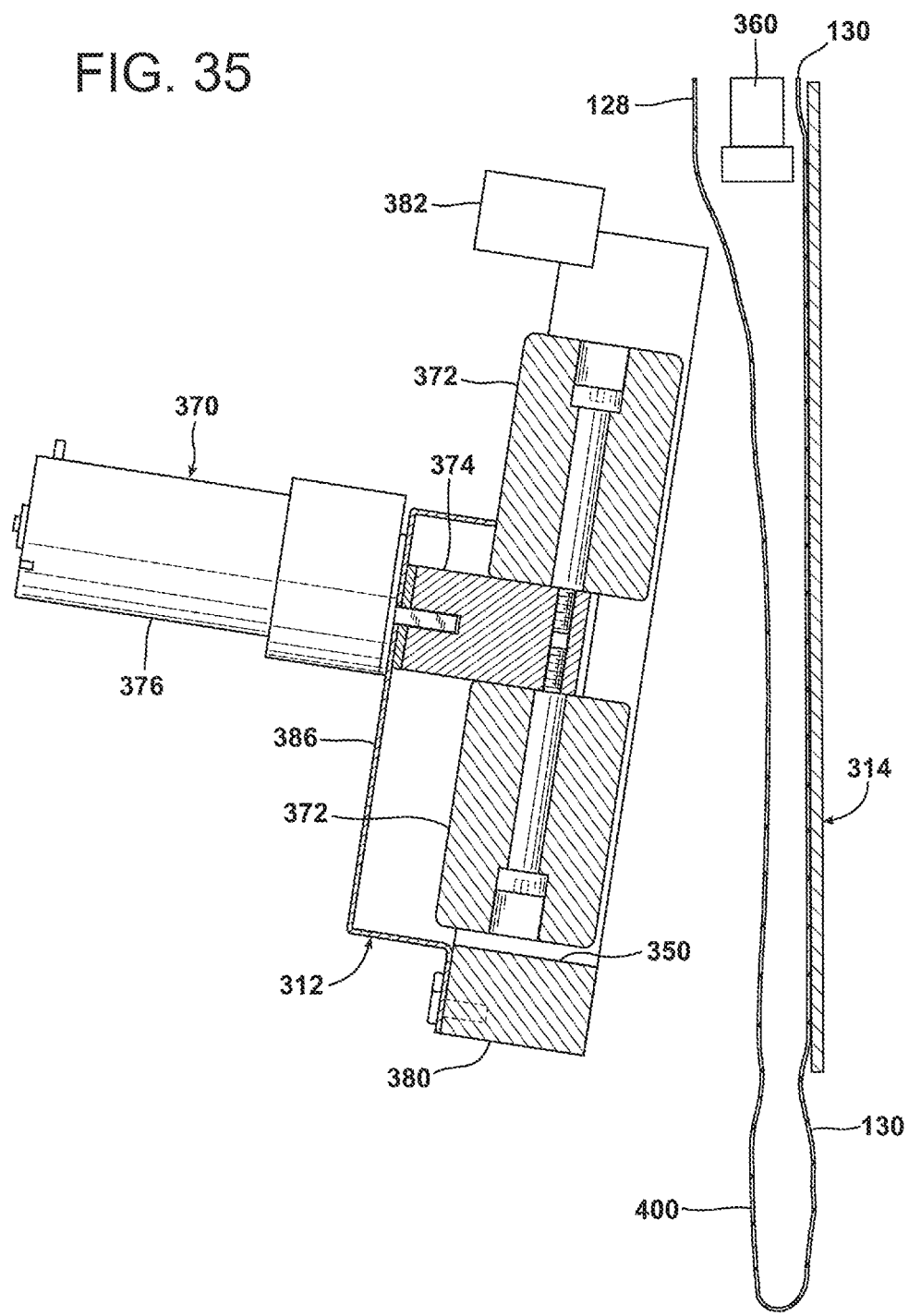
FIG. 35 is a partial representative side cutaway view of machine 300 in the base/shell disengaged position and in the top jaw disengaged position before injection of foam precursors.
Figure 37:
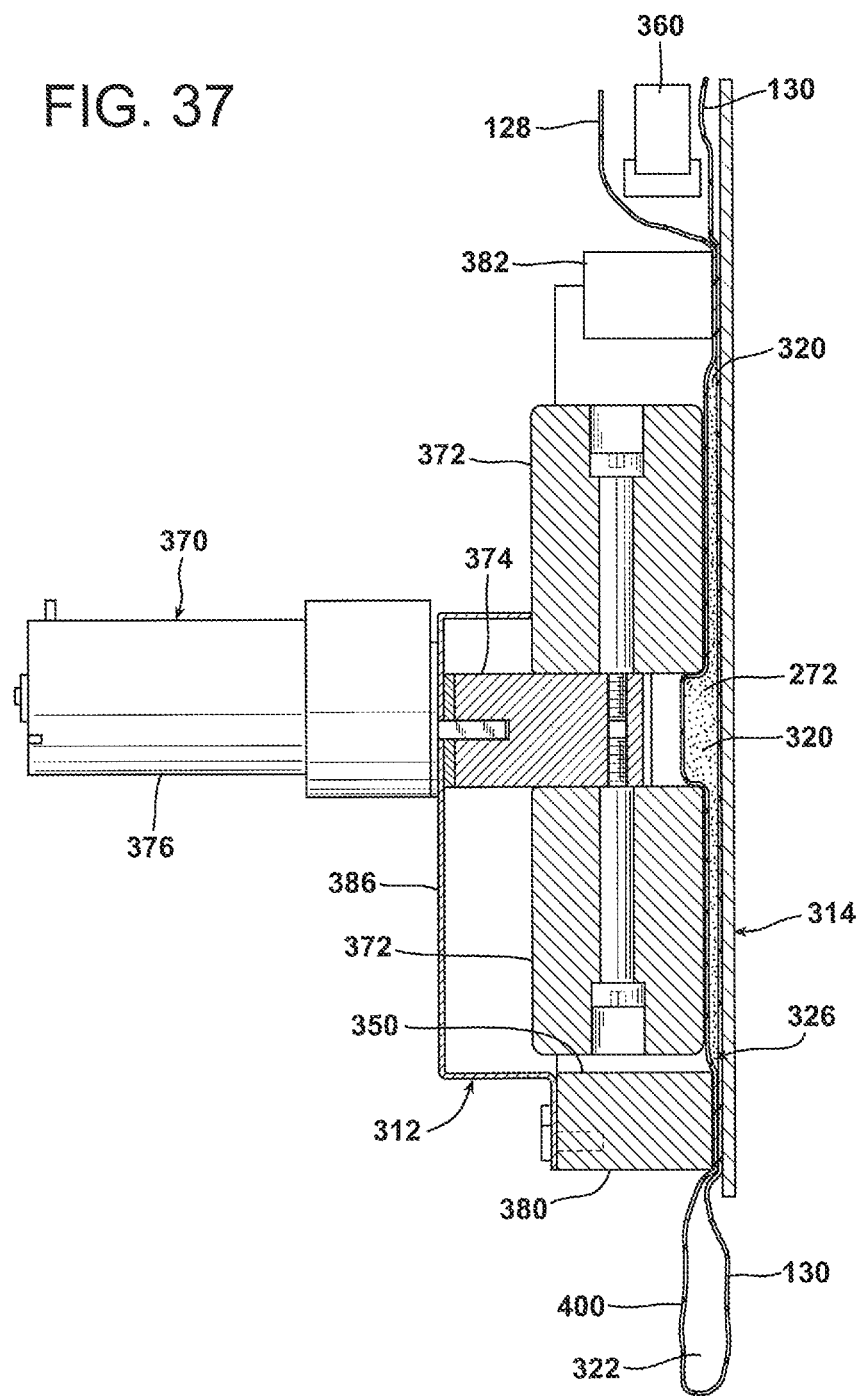
FIG. 37 is a partial representative side cutaway view of machine 300 in the base/shell engaged position and in the top jaw engaged position.
Figure 38:
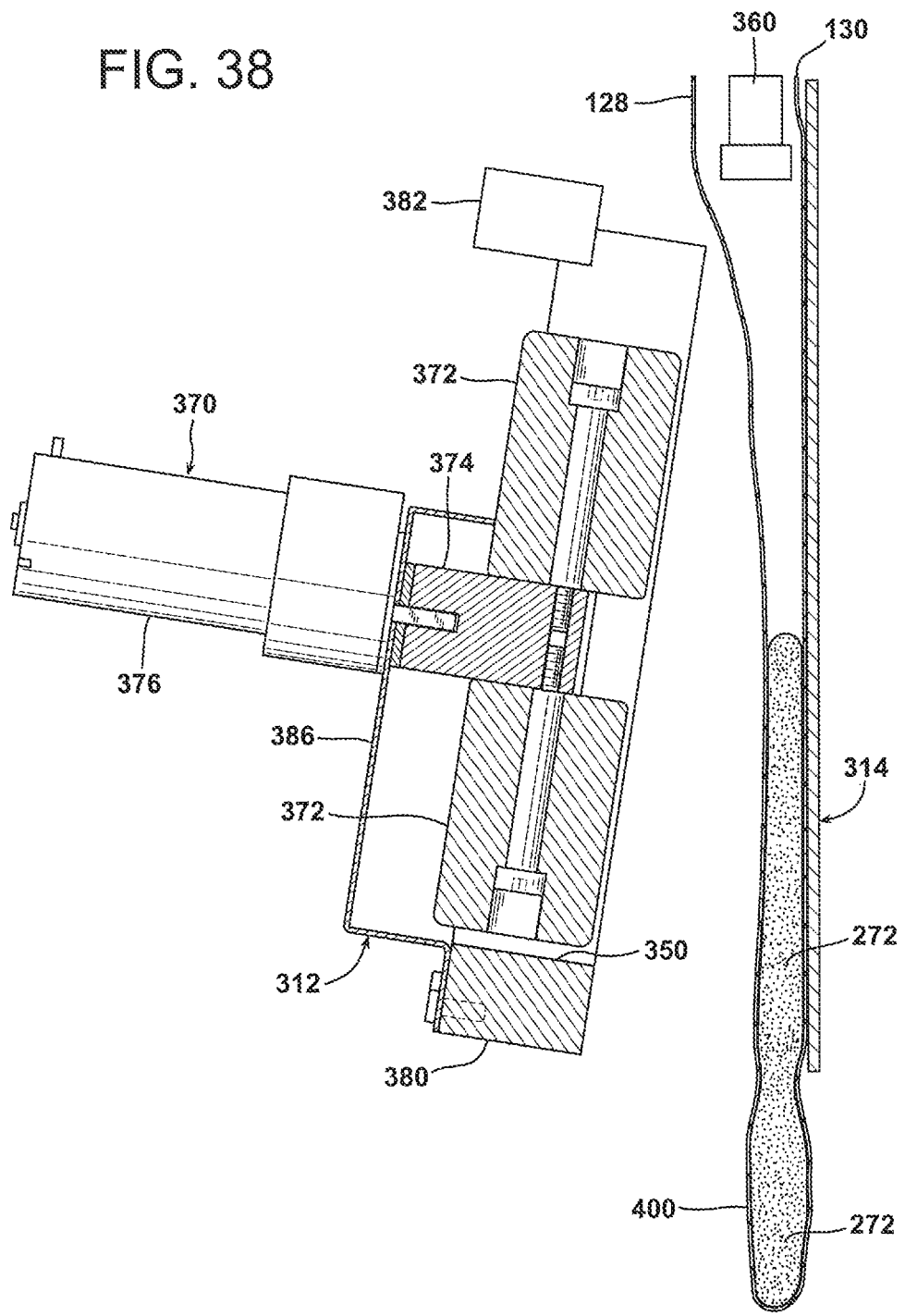
FIG. 38 is a partial representative side cutaway view of machine 300 in the base/shell engaged position and in the top jaw disengaged position after the injected foam precursors have been mixed.
Figure 39:
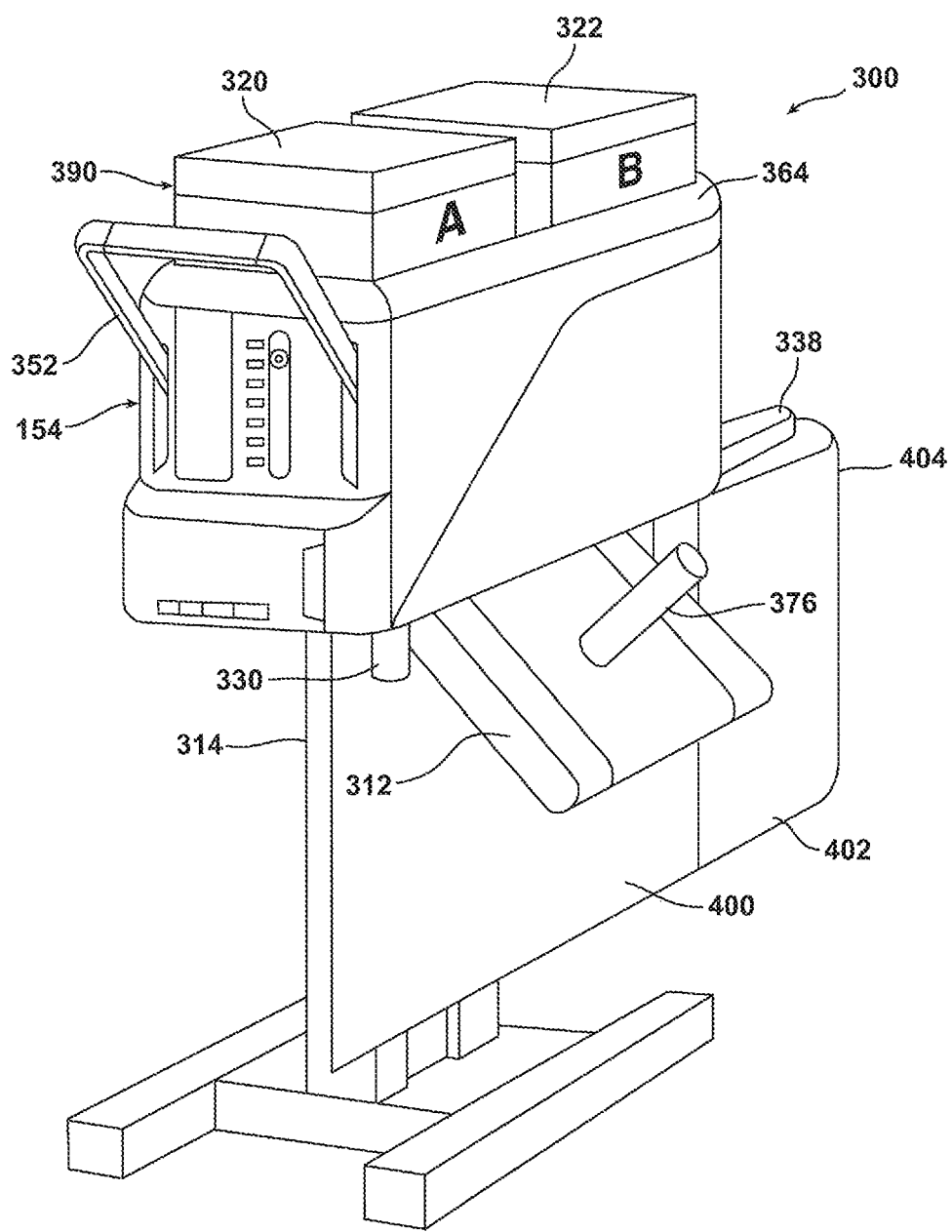
FIG. 39 is a representative perspective view of an embodiment machine 300 having a roll 404 of series of bags 402 installed and the shell 312 in the base/shell disengaged position.

Machine 300 comprises base 314 and shell 312 movable relative to each other between the base/shell engaged position (e.g., FIGS. 33 and 36-37) and the base/shell disengaged position (e.g., FIGS. 35 and 38-39). The base and shell are moveable relative each other, for example, by pivoting about a hinge as previously described herein. The base and shell may be movable relative to each other, for example, powered by drive mechanism 142, such as any of a motor, actuator, piston, and solenoid, which may be directed by controller 140. (FIG. 32.) Shell 312 may comprise one or more magnets 362, for example attached to shell frame 386 or bottom jaw 380, to facilitate the pressing together of the shell and base in the base/shell engaged position. (FIG. 34.)

Base 314 may support front right roller 330 and front left roller 334 rotatably mounted to base 314 (FIGS. 33, 39) with corresponding opposing rollers (not visible) adapted to move bags 400 within machine 300 from roll 404. One or more of the rollers may be selectively driven by a drive mechanism 150, such as a motor, directed by controller 140. (FIG. 32.)

Shell 312 may comprise bottom jaw 380 and top jaw 382. In the base/shell engaged position, bottom jaw 380 of shell 312 is adapted to press together with the base to hold the bag between the base and bottom jaw 380 to divide the bag into the mixing chamber 320 and the remainder portion 322. The bottom jaw 380 may have a concave curved bottom region 350. (FIG. 34.) Bottom jaw 380 may have the letter "U" shape configuration as illustrated for example in FIG. 34.

Top jaw 382 is movable relative to bottom jaw 380 to cooperate with the bottom jaw and be adapted to move to a top jaw engaged position (FIG. 34, 36-37) cooperating with the bottom jaw 380 to form a peripheral enclosure about the mixing chamber 320 when shell 312 and base 314 are in the base/shell engaged position. (FIG. 34.) Top jaw 382 may be capable of extending across the open top of the U-shape configuration of the bottom jaw to form the peripheral enclosure of the mixing chamber, as illustrated. A drive mechanism (not illustrated) may be used to move the top jaw; such drive mechanism may be mounted on frame 386, may comprise one or more of a motor, actuator, piston, and solenoid, and may be directed by controller 140. The top and bottom jaws may have a surface comprising a material to facilitate the isolation of the mixing chamber from the remainder portion when the base and shell are in the base/shell engaged position, for example, one or more relatively resilient materials selected from elastomers, foams, and plastics.

Figure 36:
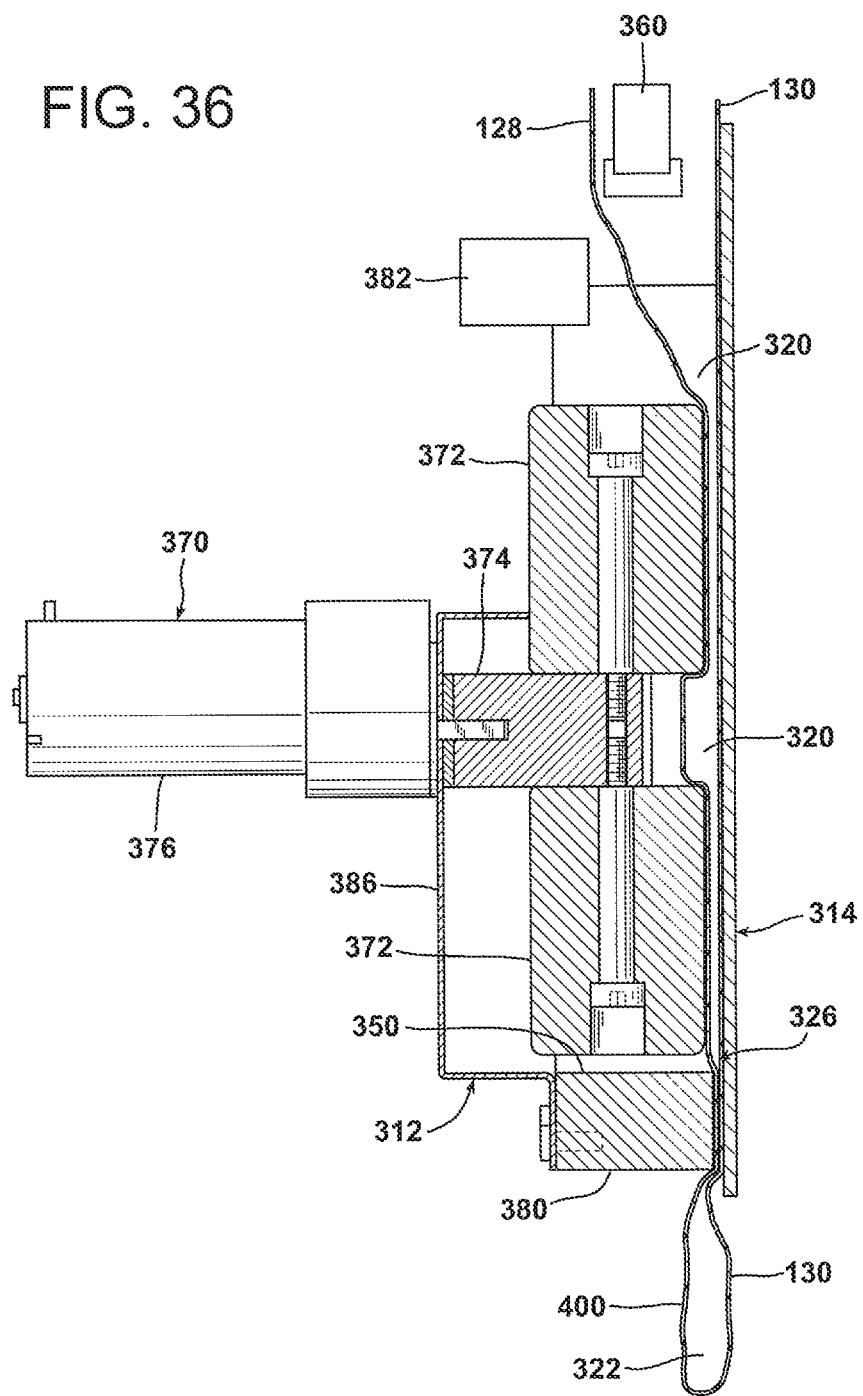
FIG. 36 is a partial representative side cutaway view of machine 300 in the base/shell engaged position and in the top jaw disengaged position.

Mixer 370 may be mounted to shell 312, for example mounted to or supported by shell frame 386. The mixer 370 is adapted to rotatively engage the mixing chamber 320 of the bag. Mixer 370 may comprise, for example, one or more mixing rollers 372 adapted to engage the mixing chamber 320. The one or more mixing rollers may comprise relatively resilient materials, such as one or more materials selected from elastomers, foam, and plastics. The one or more mixing rollers 372 may be rotatively attached to drive shaft 374 which is driven by mixing motor 376. Motor 376 may be directed by controller 140. The mixer 370 is adapted to circulate the one or more mixing rollers 372 in a plane generally parallel with the surface of the mixing chamber of the bag. (FIGS. 36-37.) The term "generally" is used to modify the term "parallel" so that the term parallel is not interpreted in a rigid mathematical sense, but rather to indicate the general orientation of the circulating rollers relative the uneven bag surface of the mixing chamber as the one or more rollers roll along the surface of the bag.

The mixing chamber 320 has bottom region 326 in which the un-reacted and reacting liquid precursors may tend to collect because of gravity effects. Where the bottom jaw 380 has a concave curved bottom region 350, then in the base/shell engaged position the bottom region 326 of the mixing chamber 320 is correspondingly concave curved. The mixer may be adapted to circulate the one or more mixing rollers along a path having a portion corresponding to the concave curved bottom region of the mixing chamber. The mixer can then provide mixing energy to liquid precursors that collect in the concave curved bottom region of the mixing chamber.

Machine 300 may comprise spindle 338 adapted to support roll of bags 404. (FIGS. 33, 39.) A controller 140 (FIG. 32) and/or one or more of the various drive mechanisms discussed herein may be housed in cabinet 364. (FIGS. 33, 39.) The controller 140 may receive and send the various status, activation, and control signals described herein along various input/output connections and signal transmission lines between the controller 140 and the various sensors and controlled devices described herein. Interface 154 as previously described may provide for human or other interaction or communication with the controller.

In operation of the third embodiment, the series of bags 402 may be installed on spindle 338 so that an open edge or trough of the bag 400 is oriented in the top or upward position. The base 314 and shell 312 are placed in the disengaged position, in which the base and shell are spaced apart to permit insertion of the bag between the base and shell. (FIG. 35.) The opposing pairs of rollers may counter-rotate to pull the series of bags from the spindle and between the base and shell. The bag 400 is positioned so that the bag 400 is beneath the first and second nozzles. Additionally, the first and second nozzles 358, 360 may extend within the open top edge of bag 400 between the front and rear sheets 128, 130 of bag 400. (FIG. 35.)

The base 314 and shell 312 may be moved relative each other to be placed in the base/shell engaged position in which the shell and base press together to hold the bag 400 between the base and shell to divide the bag 400 into a mixing chamber 320 and a remainder portion 322 such that the mixing chamber 320 is isolated from the remainder portion 322 of the bag. The mixing chamber is beneath the first and second nozzles. (FIGS. 36-37.) As previously described above, in this context, "isolated" means that the mixing chamber and the remainder portion of the bag are not in liquid communication with each other, such that foam liquid precursor that may be injected or placed into the mixing chamber does not transfer or leak into the remainder portion of the bag. As illustrated in FIG. 36, mixing chamber 320 is isolated from remainder portion 322 of the bag—even though the top of the bag may be open—because gravity precludes the injected amount of liquid foam precursor from spilling out or over the open top of the engaged U-shaped bottom jaw into the remainder portion of the bag.

The base and shell may be moved relative each other into the base/shell engaged position by spring force provided, for example, at one or more of hinges 16 biased in the base/shell engaged position, and/or by the drive mechanism 142 as described herein.

The supply system is actuated to inject first and second foam precursors though nozzles 258 and 260 into the mixing chamber 320 of the bag. Because the first and second nozzles may be spaced apart from each other, there is minimal chance that the first and second foam precursors would encounter each other within the nozzles 258, 260 to initiate a foaming reaction within either nozzle that might clog the nozzle. Accordingly, the frequency of nozzle clogging and/or the need for solvent cleaning of the nozzles is reduced in comparison to the prior art dispensers discussed in the Background section above.

After injecting the liquid foam precursors into the mixing chamber, the top jaw 382 is moved relative to the bottom jaw 380 and base 314 from a top jaw disengaged position (FIGS. 35-36) to a top jaw engaged position (FIG. 37) in which the top jaw 382 and base 314 press together to hold the top portion of bag 400 between the top jaw and base to close the top of the mixing chamber 320, for example, so that shell 312 forms a peripheral enclosure about the mixing chamber, also by way of example, having top jaw 382 extend across the open top of the bottom jaw 380. The top jaw 382 may engage the bag beneath the first and second nozzles, such that the first and second nozzles may remain stationary relative the base, and may not have to be retracted or moved relative the base in order to move the top jaw to the engaged position. That is, the first and second nozzles may be fixedly mounted to the base 314. In such arrangement, bag 400 may not require any one-way valves of the type described herein, but may have an open top edge, as illustrated in FIGS. 35-38.

Upon injection of the first and second foam precursors into the mixing chamber 320, the first and second foam precursors are free to interact and begin the foaming reaction within the mixing chamber 320 of the bag. (FIG. 37.) The mixing of the first and second foam precursors 272 within the mixing chamber of the bag may be facilitated by the operation of mixer 370. Mixer 370 is movable between a mixer disengaged position (FIGS. 35, 38) and a mixer engaged position (FIGS. 36-37). The mixer engaged and disengaged positions may correspond with the base/shell engaged and disengaged positions, respectively, as illustrated in FIGS. 35-39. In the mixer engaged position, the mixer engages the mixing chamber of the bag. When activated in the engaged position, the mixer provides mixing energy to the first and second precursors 272 within the mixing chamber of the bag to further the mixing of the first and second precursors thereby enhancing the foaming reaction. For example, upon activation of mixing motor 376, drive shaft 374 causes the mixing rollers 372 to rotate about drive shaft 374. In such operation, the one or more mixing rollers 372 circulate in a plane generally parallel to the surface of the mixing chamber 320 of the bag. As the mixing rollers engage the mixing chamber, they roll along the surface of the mixing chamber 320 of bag 400 to provide mixing energy to the precursors within the mixing chamber. The mixer may circulate the one or more mixing rollers along a path having a portion corresponding to the concave curved bottom region 350 of the bottom jaw 380 of shell 312. As such, the outer boundary of the rotational mixing path (e.g., circular rotational path) of the one or more mixing rollers 372 as they circulate about the drive shaft 374 may define a mixing path adjacent bottom region of the mixing chamber. In this configuration, the mixing rollers can engage the mixing chamber where the reacting foam precursors 272 may collect in the bottom region 326 of the mixing chamber 320.

As the foam reaction progresses, the foam expands within the mixing chamber of the bag. The base and shell may be placed into the base/shell disengaged position (e.g., by drive mechanisms discussed herein directed for example by the controller) so that the remaining first and second foam precursors as well as the reacting or expanding foam and reaction by-products (collectively, 272) may flow or fall into the remainder portion 322 of the bag to complete the reaction. (FIG. 38.)

The opposing front left roller 334 and rear left roller and/or the downstream opposing front right roller 330 and rear right roller may cooperate to engage the bag and provide a traction for transmitting a propelling force to the bag. By providing rotational power to drive one or more of the rollers, for example by driving rear left roller or rear right roller or both, then the bag 400 containing the reacted foam may be propelled forward, for example in an indexed manner, to place a subsequent bag from the series of bags in position for filling after the foam has been formed in the previous bag. The bag containing the foam may be detached from the subsequent bag, for example, by tearing the bag along the line of weakening.

As previously mentioned, bag 400 may be provided without one-way valves but with the top edge in an open configuration so that the first and second nozzles do not have to align for insertion into the valves of the bag. In any event, the top of the bag may be sealed closed after injection of the foam precursors into the bag, for example, by incorporating a sealing device such as described in U.S. Pat. No. 6,550,229, previously incorporated by reference. For example, the heat seal device may comprise a pair of opposing counter-rotating rollers and an electrically conducting heating element that contacts one sheet as the front and rear sheets pass between the rollers to press the heated sheets together to form a longitudinal heat seal across the top of the bag to "close" the bag. Such heat sealing capability may be provided in conjunction, for example, with the opposing right rollers described herein. The heat seal device may be located downline from the injector, for example, downline from the base and shell, for example, to effect the transverse heat seal to close the top edge of the bag after the precursors have been mixed together and expanded into the remainder portion of the bag and, for example, as the bag is propelled forward after the foaming reaction has begun.

Additional Embodiments

FIGS. 40 to 50 disclose additional subject matter related to machines useful for producing foam within a bag. FIG. 40 shows bag 500, which comprises seals 508 attaching the front and rear sheets together to define one or more edge boundaries of the interior of the bag, such as left edge seal 512, right edge seal 513, bottom edge seal 510 (which edge could alternatively be created, for example, by folding over the sheet upon itself as described herein), and top edge 509. The top edge 509 may be sealed to retain pouch 514 between the front and rear sheets and extending within the interior region of bag 500.

FIG. 41 illustrates pouch 514 in more detail. A front film is sealed to a rear film in selected areas to create an interior bounded by left edge seal 516, right edge seal 518, bottom edge seal 520, and top edge seal 522. Bottom seal 520 includes a bottom frangible portion 528 along the bottom of pouch 514. The bottom frangible portion 528 has a seal strength that is less than the seal strength of the left, right, and top edge seals 516, 518, and 522 so that the bottom frangible portion 528 will preferentially fail over these edge seals when sufficient pressure is applied to the liquid contents within the interior of pouch 514 to release the contents.

An intermediate seal 526 divides the interior of pouch 514 into bottom portion 530 and top portion 532 such that these portions are initially not in fluid communication. The intermediate seal 526 includes intermediate frangible portion 534 that has a seal strength that is less than the seal strength of the bottom frangible seal portion 528 so that the intermediate frangible seal portion 534 will preferentially fail to place the bottom and top portions 530, 532 of the interior in fluid communication so that the liquid contents of the bottom and top portions may be initially mixed before the bottom frangible seal portion 528 is ruptured.

The bottom portion 530 of the interior of the pouch 514 initially may contain, for example, first foam precursor 72 or the B-side component (e.g., the polyol resin mixture) as described herein, which may be initially isolated from the top portion 532, which may be initially empty.

An inlet fitment 524 is sealed between the front and rear films of pouch 514 along the top edge seal 522 to provide a one-way path for insertion of a foam precursor, such as the second form precursor 74 or A-side component (e.g., the isocyanate component) through the fitment 524 and into the top portion 532 of the interior of pouch 514.

The fitment 524 is shown in more detail in FIG. 42. Fitment 524 includes a liquid flow path connecting outlet 538, though which fluid may enter into top portion 532 of the interior of pouch 514, and inlet 540, though which a nozzle may be inserted to provide liquid foam precursor into the fitment to pass along the fluid flow path therein. Fitment 524 may be configured so that the liquid foam precursor may travel only one-way along the liquid flow path, to preclude the liquid injected into the top portion of the bag from exiting through the fitment. The fitment 524 may include an uneven surface 542 to facilitate the sealing of the fitment 524 to and between the top and bottom films of pouch 514 along the top edge seal 522 of the pouch.

Returning to FIG. 40, the pouch 514 may be retained relative the bag 500 to extend within the interior region of the bag. The top edge 509 may be sealed to retain pouch 514 between the front and rear sheets and to also seal about fitment 524, through which is provided a pathway to the interior of the top portion 532 of the pouch. The bag 500 may also comprise one or more vents 103 (as described herein) to facilitate the flow of by-product gas from the interior of the bag, while minimizing the flow of foam or reacting or expanding foam from the bag 100 through the one or more vents.

Figure 43:
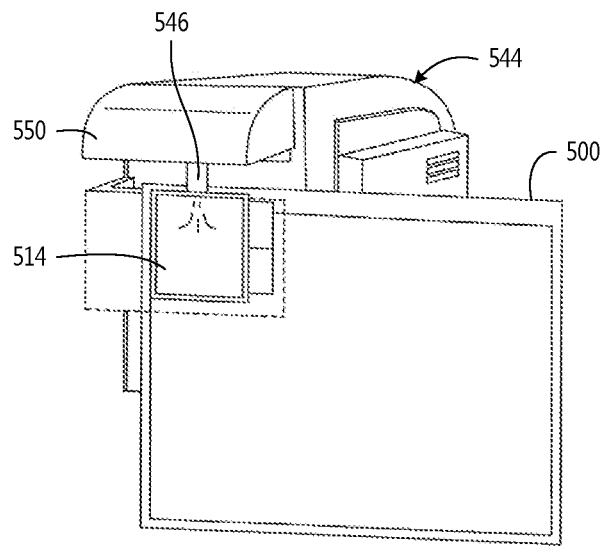
FIG. 43 is a representative perspective view of an embodiment having machine 544 for dispersing liquid into pouch 514 of FIG. 40.

FIG. 43 shows machine 544 configured to receive bag 500 with pouch 514 under the injector assembly 550. The injector assembly 550 includes injector 546, which is moveable (e.g., may be driven up and down) between an injector engaged position (FIG. 43) and an injector retracted position (FIGS. 44-45).

Injector 546 includes nozzle 548, which defines a lumen through which fluid may flow. The injector 546 is adapted to receive a foam precursor (e.g., second foam precursor 74) and deliver it through the lumen of nozzle 548. In the injector engaged position, the nozzle 548 pushes and extends through the inlet fitment 524 of bag 500 (FIG. 43) to deliver the foam precursor into the top portion 532 of pouch 514.

Figure 44:
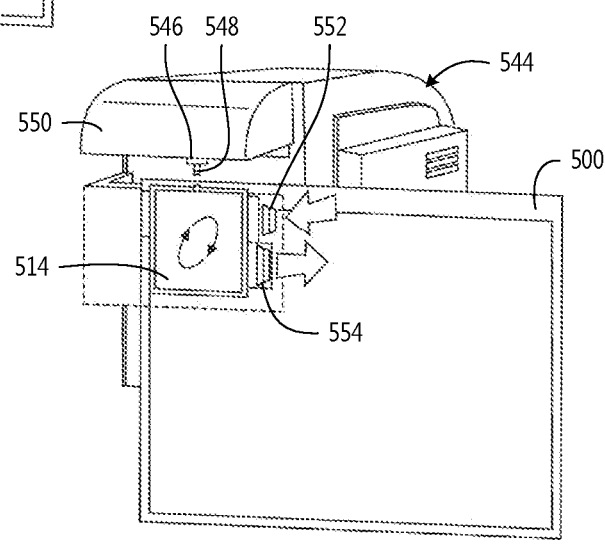
FIG. 44 is a representative perspective view of machine 544 of FIG. 43, showing first and second mixers 552, 554 reciprocating to impart mixing energy and to break the intermediate frangible seal portion 534 in the pouch.
Figure 45:
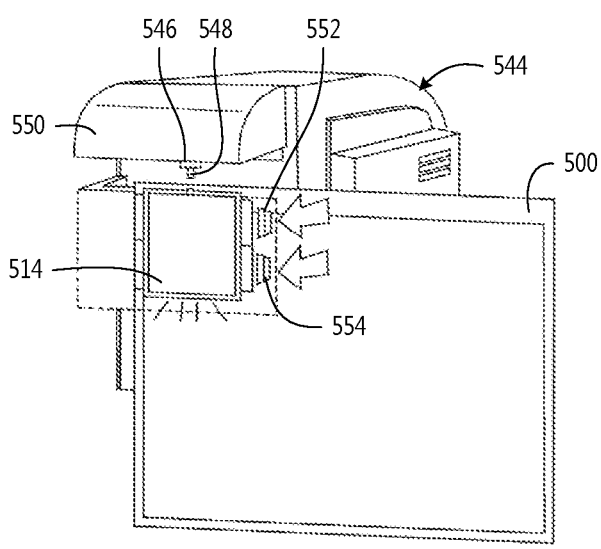
FIG. 45 is a representative perspective view of machine 544 of FIG. 44, showing the first and second mixers pushing in the same direction to burst the bottom frangible seal portion 528 of pouch 514 so the reacting foam precursors enter into mother bag 500.

FIGS. 44-45 illustrate first and second mixers 552, 554 (e.g., reciprocating paddles), which are movable between a mixer disengaged position (FIG. 43) and a mixer engaged position (FIGS. 44-45). The first and second mixers 552, 554 may be selectively and independently driven forward and backward by a drive mechanism (not illustrated) associated with the mixers, for example, one or more of a motor, actuator, piston, and solenoid, for example to either provide reciprocating movement of the mixers to repeatedly engage the pouch 514, for example, as the foam reaction begins, in order to provide mixing energy to the first and second precursors. For example, the first mixer 552 may extend to engage the top portion 532 of pouch 514 containing second foam precursor 74 to apply pressure so that the fluid breaks the frangible portion 534 of intermediate seal 526. As a result, the top portion 532 and bottom portion 530 are in fluid communication so that the second foam precursor 74 may flow and contact the first foam precursor in the bottom portion 530 to begin the foaming reaction. The first and second mixers 552, 554 may then reciprocate as illustrated in FIG. 44 to enhance the mixing and thus the reaction.

As the foam reaction progresses, the foam expands within the pouch 514 along with the gasses generated by or resulting from the foaming reaction. This expansion may burst the bottom frangible portion 528 of the bottom edge seal 520 of pouch 514. This rupture of the bottom frangible seal may be facilitated by both of the first and second mixers 552, 554 pushing at the same time to engage and apply pressure to the pouch, as illustrated in FIG. 45. Once the bottom frangible seal has broken, the reacting or expanding foam and reaction by-products may flow from the pouch 514 into the bag 500 for further expansion to complete the reaction.

Figure 46:
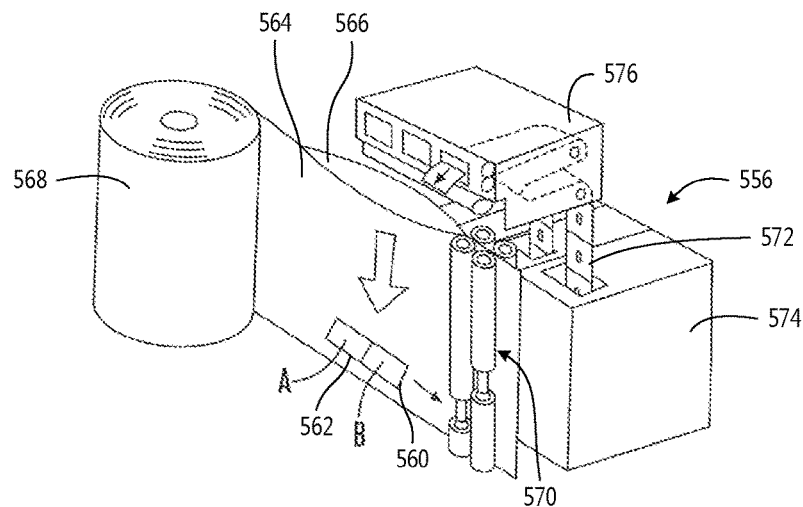
FIG. 46 is a representative perspective view of another embodiment, machine 556, for mixing foam precursor chemicals of packets A and B.

FIG. 46 illustrates machine 556, which automates the insertion of packets 560, 562, each of which contain one the first and second foam precursors (i.e., the "B" polyol and "A" isocyanate chemicals as described herein), into the space between the front and rear sheets 564, 566. The sheets are progressed from roll 568 and sealed together by opposing rollers 570. The front and rear sheets are sealed together form a mother bag containing packet 560 of the first foam precursor and packet 562 of the second foam precursor chemical. The packets are provided from the supply 572 of packet from container 574 by conveyor 576, which is configured to sequentially provide two packets 560, 562, for example by indexing and severing the packets from the supply of packets. The resulting sealed mother bag contains the packets of foam precursor chemicals, which may be burst by applying pressure, for example by squeezing by a portion of the opposing rollers 570, to release the precursor chemicals to initiate the foaming reaction within the mother bag.

Figure 47:
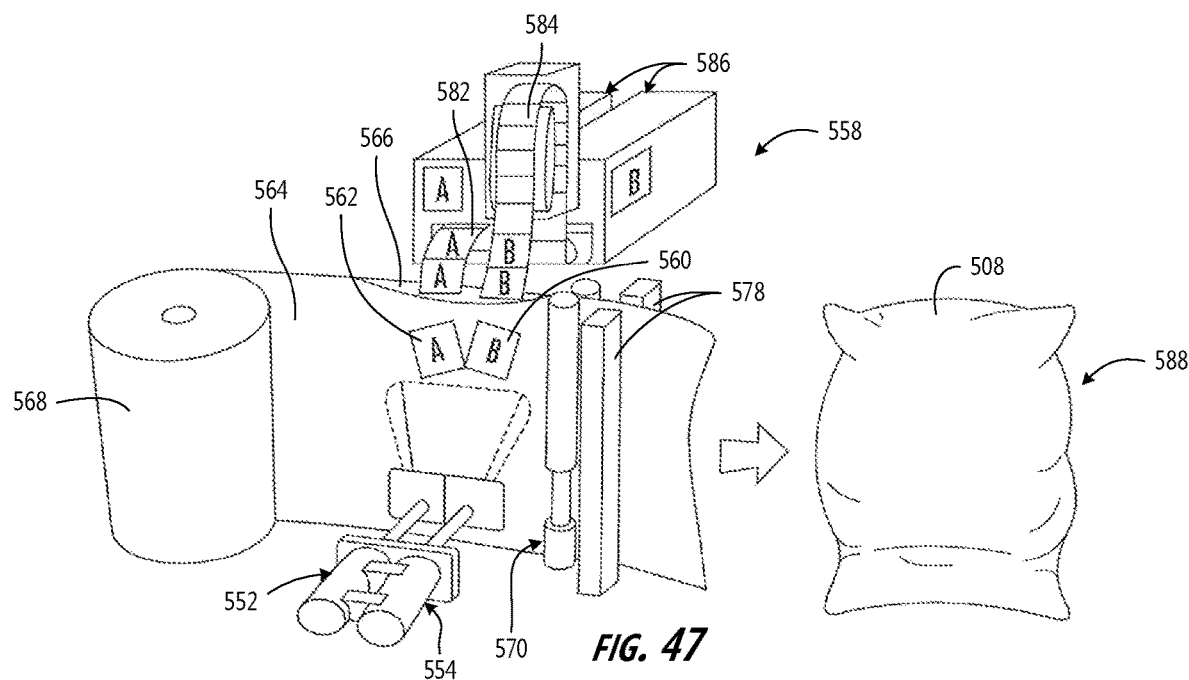
FIG. 47 is a representative perspective view of an embodiment, machine 558 of FIG. 46 showing mixers 552, 554 to burst the foam precursor-containing packets A and B to react to create the expanded foam within the bag 580.

FIG. 47 illustrates machine 558, which automates the insertion of packets 560, 562 into the space between the front and rear sheets 564, 566. The sheets are progressed from roll 568 by opposing rollers 570, which are also adapted to provide the longitudinal seal along the top of the bag, and sealed and severed transversely by opposing seal bars 578 to form the mother bag 580 enclosing the packets. The packets 560, 562 are provided from the supply 584 of first foam precursor packets and supply 582 of second foam precursor packets, respectively, by conveyors 586, which are configured to sequentially provide the packets, for example by indexing and severing the packets from the supply of packets. The packets of foam precursor chemicals may be burst to release the foam precursor chemicals by applying pressure via first and second mixers 552, 554 (e.g., reciprocating paddles) to the packets, similar to the manner described with respect to machine 544. The first and second mixers may also provide mixing energy, as described herein, to facilitate the foaming reaction within the mother bag. The result after bursting the first and second packets within the mother bag is protective packaging cushion 588, containing expanded foam within mother bag 580.

Figure 48:
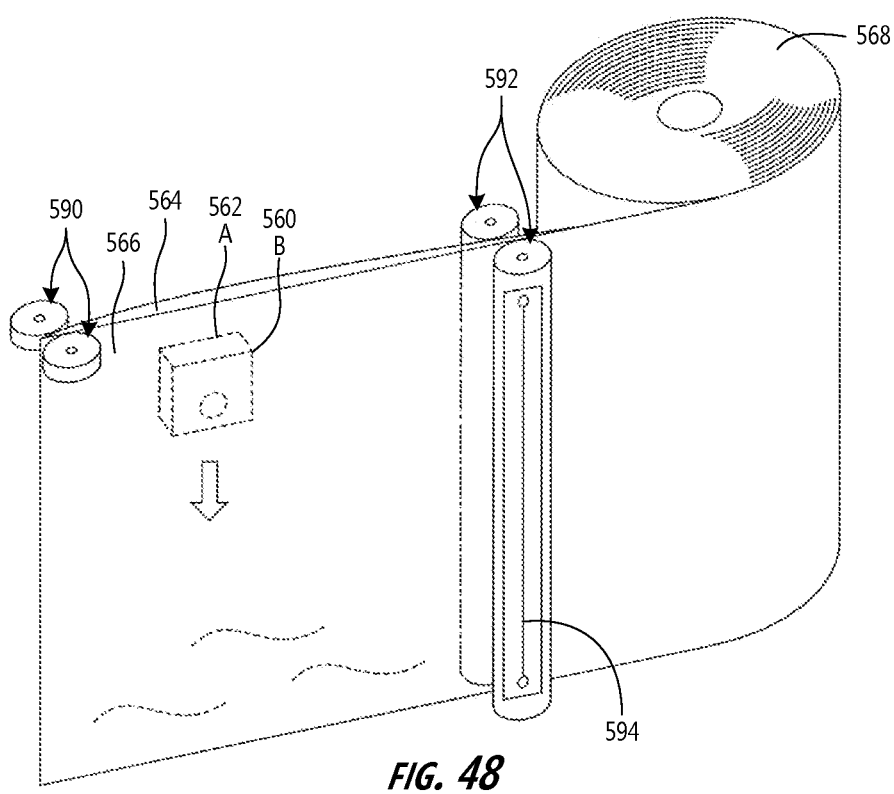
FIG. 48 is a representative perspective view of an embodiment showing foam precursors A and B entering an open mother bag.

FIG. 48 illustrates longitudinal sealer 590 for creating the longitudinal top seal to heat seal together the front and rear sheets 564, 566 to enclose the packets within the mother bag. The front and rear sheets are sealed together form a mother bag containing the packets 560, 562 of the first and second foam precursor chemicals. The opposing rollers 592 may be adapted to provide the transverse seal of the mother bag, utilizing, for example heat seal element 594 (e.g., a nichrome resistance wire).

Figure 49:
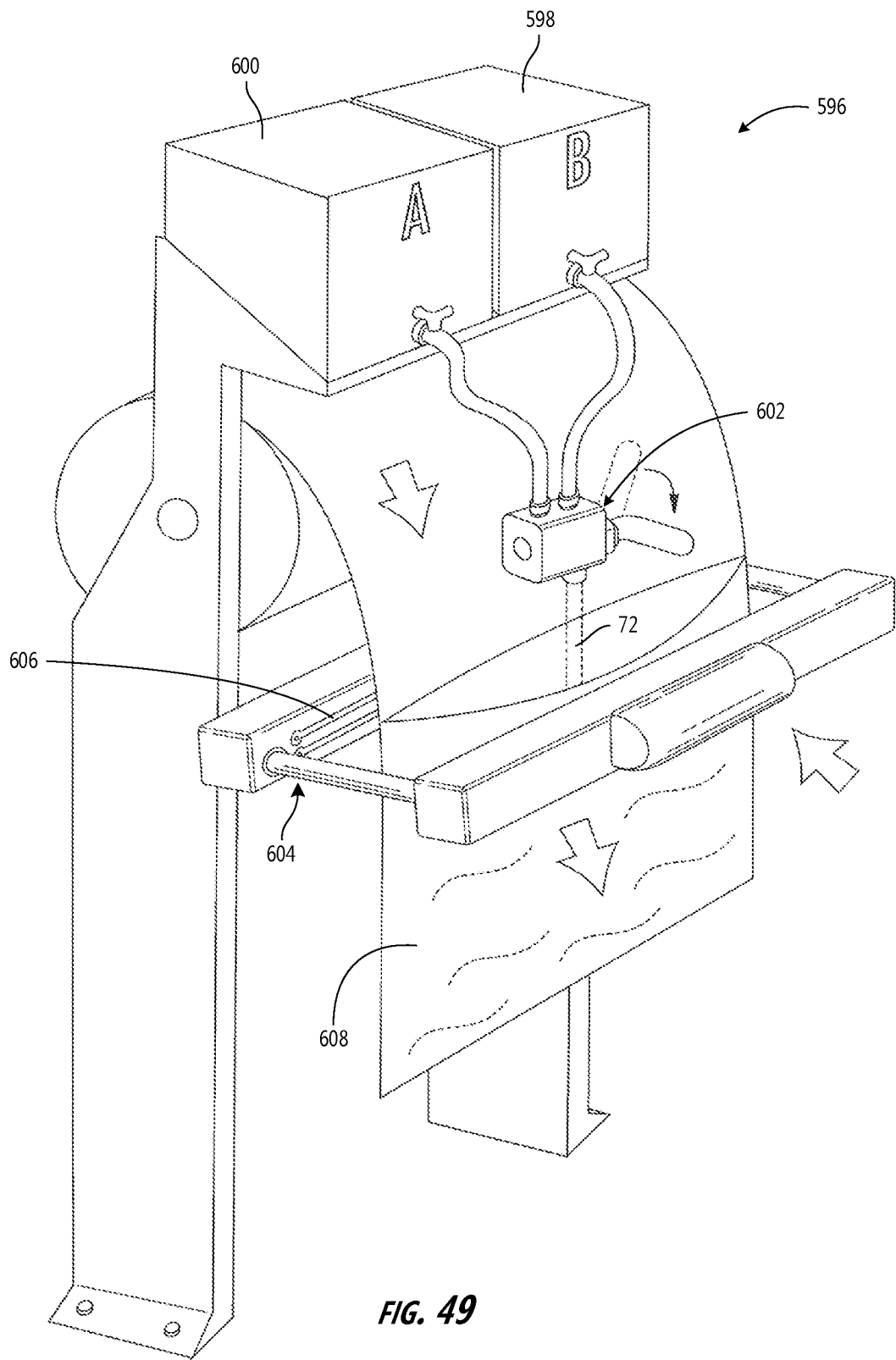
FIG. 49 is a representative perspective view of an embodiment, machine 596, showing foam precursors A and B added to mother bag 608.

FIG. 49 illustrates machine 596 for forming expanded foam-filled bags. In this embodiment, the first and second foam precursor chemicals 72, 74 are provided from supply containers 598, 600 respectively, through block 602, which may be configured to mix the foam precursor streams while dispensing both, or sequentially dispensing the foam precursor streams (as illustrated, dispensing first foam precursor 72) into the bag. After dispensing the foam precursors into the bag 608, the closing top seal of the bag may be formed by compression between the opposing bars 604, one of which includes heat seal element 606 (e.g., nichrome resistance wire) to heat seal closed the bag. The opposing bars 604 and element 606 may also be configured to sever the bag after sealing it closed.

Figure 50:
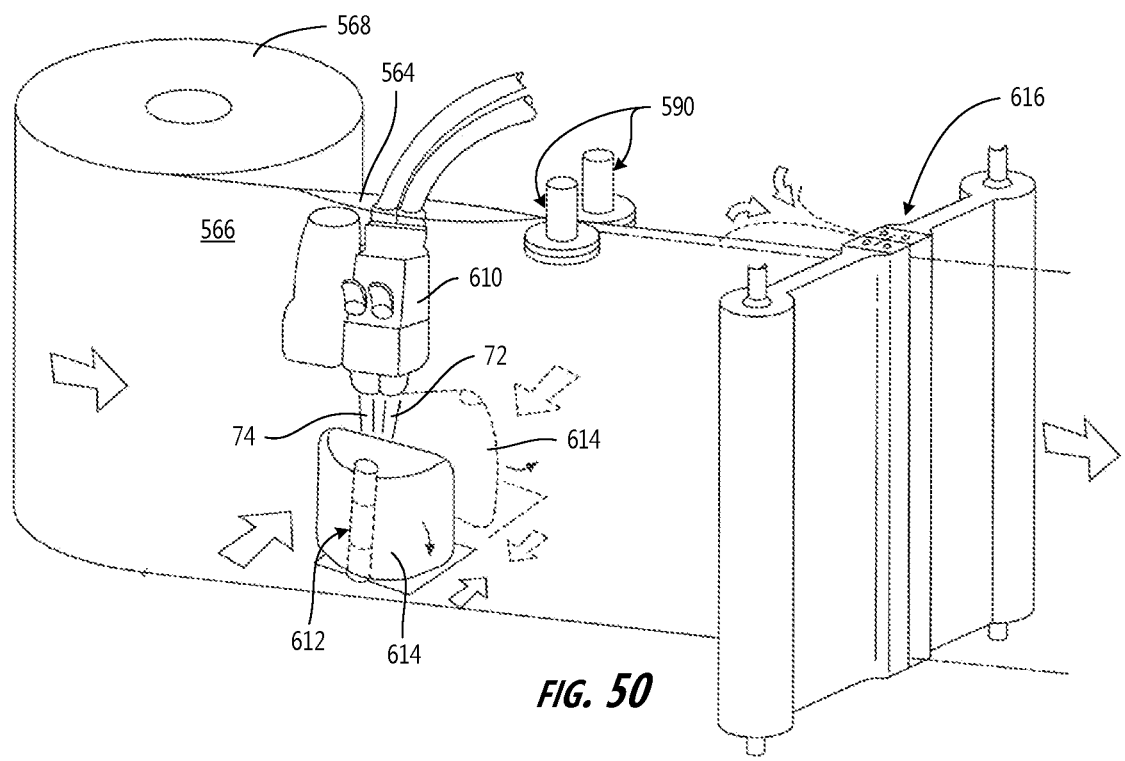
FIG. 50 is a representative perspective view of an embodiment illustrating the dispensing of the first and second foam precursor chemicals 72, 74 into the bag in the region between opposing mixers 612 (e.g., hinged paddles) to provide mixing energy to the mixture.

FIG. 50 illustrates the dispensing of the first and second foam precursor chemicals 72, 74 from a supply for each (not shown) through dispenser block 610, which is positioned in the space between front film 564 and rear film 566. The mixer 612 comprises opposing mixing elements 614 (e.g., reciprocating paddles), which are movable between engaged and disengaged positions and may be selectively and independently driven forward and backward by a drive mechanism (not illustrated) associated with the mixers to provide mixing energy from outside the bag to the first and second precursors within the bag to enhance the mixing and thus the foam reaction. The sheet has been "folded over" to provide the bottom of the bag, and longitudinal sealer 590 provides the top longitudinal seal along the bag top, as described herein. The opposing transverse seal bars 616 may swing to close and create sequential transverse seals to complete the bag enclosing the reacting foam precursors.

Various Embodiments

The following sentences describe various embodiments of the presently disclosed subject matter.

A. A machine useful for mixing first and second foam precursors to produce foam within a bag, the machine comprising:
- a base and a shell moveable relative each other between:
  - (i) a base/shell disengaged position, in which the base and shell are spaced apart to permit insertion of the bag between the base and shell, and
  - (ii) a base/shell engaged position in which the shell and base press together to hold the bag between the base and shell and to divide the bag into (1) a mixing chamber and (2) a remainder portion so that the mixing chamber is isolated from the remainder portion of the bag;
- a divider, wherein in the base/shell engaged position the divider is moveable relative to the base and shell between:
  - (a) a divider engaged position in which the divider engages the bag to partition the mixing chamber of the bag into first and second compartments that are isolated from each other while the divider is in the engaged position; and
  - (b) a divider disengaged position in which the divider does not isolate the first and second compartments from each other;
- a first nozzle adapted to inject the first foam precursor into the first compartment within the bag; and
- a second nozzle adapted to inject the second foam precursor into the second compartment within the bag.

B. The machine described by sentence A wherein the divider is adapted to engage the mixing chamber of the bag to provide mixing energy to the first and second foam precursors within the mixing chamber of the bag when the base and shell are in the base/shell engaged position and the divider is in the disengaged position, thereby facilitating the foam reaction between the first and second foam precursors.

C. The machine described by sentence B wherein the divider is adapted to reciprocatingly engage the mixing chamber of the bag to provide the mixing energy.

D. The machine described by any one of sentences A through C wherein the base defines a cavity in which the divider is moveably received.

E. The machine described by any one of sentences A through D further comprising at least one mixer adapted to engage the mixing chamber of the bag to provide mixing energy to the first and second foam precursors within the mixing chamber of the bag when the base and shell are in the base/shell engaged position and the divider is in the disengaged position, thereby facilitating the foam reaction between the first and second foam precursors.

F. The machine described by sentence E wherein the at least one mixer is adapted to reciprocatingly engage the mixing chamber of the bag to provide the mixing energy.

G. The machine described by any one of sentences E and F wherein the base defines a cavity in which the at least one mixer is moveably received.

H. The machine described by any one of sentences E through G comprising at least two mixers adapted to engage the mixing chamber of the bag to provide mixing energy to the first and second foam precursors within the mixing chamber of the bag when the base and shell are in the base/shell engaged position and the divider is in the disengaged position, thereby facilitating the foam reaction between the first and second foam precursors.

I. The machine described by any one of sentences A through H wherein the divider defines:
- a first concave section adapted to correspond to the first compartment of the partitioned mixing chamber of the bag; and
- a second concave section adapted to correspond to the second compartment of the partitioned mixing chamber of the bag.

J. The machine described by any one of sentences A through I wherein the base defines:
- a first concave section adapted to correspond to the first compartment of the partitioned mixing chamber of the bag; and
- a second concave section adapted to correspond to the second compartment of the partitioned mixing chamber of the bag.

K. The machine described by any one of sentences A through J wherein the shell defines:
- a first concave section adapted to correspond to the first compartment of the partitioned mixing chamber of the bag; and
- a second concave section adapted to correspond to the second compartment of the partitioned mixing chamber of the bag.

L. The machine described by any one of sentences A through K wherein the base defines a roller recess and comprises a roller rotatably mounted at least partially within the base roller recess and adapted to engage the bag.

M. The machine described by any one of sentences A through L wherein the shell defines a roller recess and comprises a roller rotatably mounted at least partially with the shell roller recess and adapted to engage the bag.

N. The machine described by any one of sentences A through K wherein:
- the base defines a roller recess and comprises a roller rotatably mounted at least partially within the base roller recess and adapted to engage the bag;
- the shell defines a roller recess and comprises a roller rotatably mounted at least partially with the shell roller recess and adapted to engage the bag; and
- the roller within the base roller recess and the roller within the shell roller recess oppose each other when the base and shell are in the base/shell engaged position.

O. A method of making a foam-in-bag cushion comprising:
- inserting a bag in the machine described by any one of sentences A through N between the base and shell in the base/shell disengaged position;
- moving the base and shell relative each other to the base/shell engaged position to divide the bag into a mixing chamber and a remainder portion, wherein the mixing chamber is isolated from the remainder portion of the bag;

moving the divider relative to the base and shell to the divider engaged position to engage the bag and partition the mixing chamber of the bag into first and second compartments that are isolated from each other while the divider is in the engaged position;

inserting the first nozzle into the bag to inject a first foam precursor into the first compartment within the bag;

inserting the second nozzle into the bag to inject a second foam precursor into the second compartment within the bag;

withdrawing the first and second nozzles from the bag; and placing the divider into the disengaged position so that the first and second foam precursors may contact each other in the mixing chamber of the bag.

P. The method described by sentence O wherein:

the bag comprises first and second one-way valves;

inserting the first nozzle comprises inserting the first nozzle into the first one-way valve to inject a first foam precursor into the first compartment within the bag;

inserting the second nozzle comprises inserting the second nozzle into the second one-way valve to inject a second foam precursor into the second compartment within the bag; and withdrawing the first and second nozzles from the bag comprises withdrawing the first and second nozzles from the first and second one-way valves.

Q. The method described by any one of sentences O and P wherein subsequent to placing the divider in the disengaged position, the base and shell are placed in the base/shell disengaged position, wherein the expanding foam extends into the remainder portion of the bag.

R. The method described by any one of sentences O through Q wherein mixing energy is applied to the first and second foam precursors in the mixing chamber of the bag before the base/shell are placed in the base/shell disengaged position.

S. The method described by sentence R wherein the mixing energy is applied by reciprocating the divider to repeatedly engage the mixing chamber of the bag.

T. The method described by sentence R wherein the mixing energy is applied by at least two mixers that repeatedly engage the mixing chamber of the bag.

U. A machine useful for mixing first and second foam precursors to produce foam within a bag, the machine comprising:

a base and a shell moveable relative each other between:
(i) a base/shell disengaged position, in which the base and shell are spaced apart to permit insertion of the bag between the base and shell, and
(ii) a base/shell engaged position in which the shell and base press together to hold the bag between the base and shell and to divide the bag into (1) a mixing chamber and (2) a remainder portion so that the mixing chamber is isolated from the remainder portion of the bag;

a first nozzle adapted to inject the first foam precursor into the mixing chamber within the bag;

a second nozzle adapted to inject the second foam precursor into the mixing chamber within the bag; and at least one mixer adapted to engage the mixing chamber of the bag to provide mixing energy to the first and second foam precursors within the mixing chamber of the bag when the base and shell are in the base/shell engaged position, thereby facilitating the foam reaction between the first and second foam precursors.

V. The machine described by sentence U wherein the at least one mixer is adapted to reciprocatingly engage the mixing chamber of the bag to provide the mixing energy.

W. The machine described by any one of sentences U and V wherein the base defines a cavity in which the at least one mixer is moveably received.

X. The machine described by any one of sentences U through W comprising at least two mixers adapted to engage the mixing chamber of the bag to provide mixing energy to the first and second foam precursors within the mixing chamber of the bag when the base and shell are in the base/shell engaged position, thereby facilitating the foam reaction between the first and second foam precursors.

Y. A method of making a foam-in-bag cushion comprising:

inserting a bag in the machine described by any one of sentences U though W between the base and shell in the base/shell disengaged position;

moving the base and shell relative each other to the base/shell engaged position to divide the bag into a mixing chamber and a remainder portion, wherein the mixing chamber is isolated from the remainder portion of the bag;

inserting the first nozzle into the bag to inject a first foam precursor into the mixing chamber within the bag;

inserting the second nozzle into the bag to inject a second foam precursor into the mixing chamber within the bag;

withdrawing the first and second nozzles from the bag; and moving the mixer to repeatedly engage the mixing chamber of the bag to provide mixing energy to the first and second foam precursors within the mixing chamber.

Z. The method described by sentence Y wherein:

the bag comprises first and second one-way valves;

inserting the first nozzle comprises inserting the first nozzle into the first one-way valve to inject a first foam precursor into the mixing chamber within the bag;

inserting the second nozzle comprises inserting the second nozzle into the second one-way valve to inject a second foam precursor into the mixing chamber within the bag; and withdrawing the first and second nozzles from the bag comprises withdrawing the first and second nozzles from the first and second one-way valves.

AA. The method described by any one of sentences Y and Z wherein subsequent to moving the mixer to repeated engage the mixing chamber of the bag, the base and shell are placed in the base/shell disengaged position, wherein the expanding foam extends into the remainder portion of the bag.

BB. The method described by any one of sentences Y through AA wherein mixing energy is applied to the first and second foam precursors in the mixing chamber of the bag before the base/shell are placed in the base/shell disengaged position.

CC. The method described by any one of sentences Y through BB wherein the mixing energy is applied by at least two mixers that repeatedly engage the mixing chamber of the bag.

DD. A machine useful for mixing first and second foam precursors to produce foam within a bag, the machine comprising:

a base and a shell moveable relative each other between:
(i) a base/shell disengaged position, in which the base and shell are spaced apart to permit insertion of the bag between the base and shell, and (ii) a base/shell engaged position in which the shell and base press together to hold the bag between the base and shell and to divide the bag into (1) a mixing chamber and (2) a remainder portion so that the mixing chamber is isolated from the remainder portion of the bag;

a first nozzle adapted to inject the first foam precursor into the mixing chamber within the bag;

a second nozzle adapted to inject the second foam precursor into the mixing chamber within the bag; and at least one of either:

A) a divider, wherein in the base/shell engaged position the divider is moveable relative to the base and shell between:
  (a) a divider engaged position in which the divider engages the bag to partition the mixing chamber of the bag into first and second compartments that are isolated from each other while the divider is in the engaged position, wherein the first nozzle is adapted to inject the first foam precursor into the first compartment within the bag and the second nozzle is adapted to inject the second foam precursor into the second compartment within the bag; and
  (b) a divider disengaged position in which the divider does not isolate the first and second compartments from each other; or B) at least one mixer adapted to engage the mixing chamber of the bag to provide mixing energy to the first and second foam precursors within the mixing chamber of the bag when the base and shell are in the base/shell engaged position, thereby facilitating the foam reaction between the first and second foam precursors.

EE. A machine useful for mixing first and second foam precursors to produce foam within a bag, the machine comprising:

a base and a shell moveable relative each other between:
  (i) a base/shell disengaged position, in which the base and shell are spaced apart to permit insertion of the bag between the base and shell, and
  (ii) a base/shell engaged position in which the shell and base press together to hold the bag between the base and shell and to divide the bag into (1) a mixing chamber and (2) a remainder portion so that the mixing chamber is isolated from the remainder portion of the bag;

a first nozzle adapted to inject the first foam precursor into the mixing chamber within the bag;

a second nozzle adapted to inject the second foam precursor into the mixing chamber within the bag; and a mixer adapted to engage the mixing chamber of the bag to provide mixing energy to the first and second foam precursors within the mixing chamber of the bag when the base and shell are in the base/shell engaged position, thereby facilitating the foam reaction between the first and second foam precursors.

FF. The machine of sentence EE wherein the shell comprises a bottom jaw such that when the base and shell are in the base/shell engaged position, the bottom jaw is adapted to press together with the base to hold the bag between the base and bottom jaw to divide the bag into the mixing chamber and the remainder portion.

GG. The machine of sentence FF wherein the bottom jaw has a concave curved bottom region.

HH. The machine of any one of sentences FF and GG wherein the bottom jaw has a U-shaped configuration.

II. The machine of any one of sentences FF to HH further comprising a top jaw movable relative the bottom jaw and adapted to move to an engaged position cooperating with the bottom jaw to form a peripheral enclosure about the mixing chamber when the base and shell are in base/shell engaged position.

JJ. The machine of sentence II wherein:
  the bottom jaw has a U-shaped configuration; and
  the top jaw is adapted to extend across the open top of the U-shape configuration of the bottom jaw to form the peripheral enclosure.

KK. The machine of any one of sentences EE to JJ wherein the mixer is adapted to reciprocatingly engage the mixing chamber of the bag to provide the mixing energy.

LL. The machine of any one of sentences EE to KK wherein the mixer is adapted to rotatively engage the mixing chamber of the bag to provide the mixing energy.

MM. The machine of any one of sentences EE to LL wherein the mixer is mounted to the shell.

NN. The machine of any one of sentences EE to MM wherein the mixer comprises one or more mixing rollers adapted to engage the mixing chamber of the bag.

OO. The machine of any one of sentences EE to NN wherein the mixer is adapted to circulate the one or more mixing rollers in a plane generally parallel with the surface of the mixing chamber of the bag.

PP. The machine of any one of sentences NN to OO wherein the one or more mixing rollers are adapted to roll along the surface of the bag.

QQ. The machine of any one of sentences EE to PP wherein the mixing chamber has a bottom region and the mixer is adapted to engage the bottom region of the mixing chamber.

RR. The machine of any one of sentences EE to QQ wherein:
  the shell comprises a bottom jaw such that when the base and shell are in the base/shell engaged position, the bottom jaw is adapted to press together with the base to hold the bag between the base and bottom jaw to divide the bag into the mixing chamber and the remainder portion;
  the bottom jaw has a concave curved bottom region so that in the base/shell engaged position the mixing chamber of the bag has a corresponding concave curved bottom region;
  the mixer comprises one or more mixing rollers adapted to engage the mixing chamber of the bag; and
  the mixer is adapted to circulate the one or more mixing rollers along a path having a portion corresponding to the concaved curved bottom region of the mixing chamber, whereby the mixer is adapted to provide mixing energy to liquids that collect in the concave curved bottom region of the mixing chamber.

SS. The machine of any one of sentences EE to RR wherein the first and second nozzles are fixedly mounted to the base.

TT. A method of making a foam-in-bag cushion comprising:
  inserting a bag in the machine of any one of sentences EE to SS between the base and shell in the base/shell disengaged position and beneath the first and second nozzles;
  moving the base and shell relative each other to the base/shell engaged position to divide the bag into a mixing chamber and a remainder portion, wherein the mixing chamber is isolated from the remainder portion of the bag;

injecting a first foam precursor from the first nozzle into the mixing chamber within the bag;
injecting a second foam precursor from the second nozzle into the mixing chamber within the bag; and
activating the mixer to engage the mixing chamber of the bag to provide mixing energy to the first and second foam precursors within the mixing chamber.

UU. The method of sentence TT further comprising subsequently moving the base and shell to the base/shell disengaged position so that at least a portion of the reacting first and second foam precursors move to the remainder portion of the bag.

VV. A method of making a foam-in-bag cushion comprising:
inserting a bag in the machine of claim II between the base and shell in the base/shell disengaged position and beneath the first and second nozzles;
moving the base and shell relative each other to the base/shell engaged position and to hold the bag between the base and bottom jaw to divide the bag into a mixing chamber and a remainder portion, wherein the mixing chamber is isolated from the remainder portion of the bag;
injecting a first foam precursor from the first nozzle into the mixing chamber within the bag;
injecting a second foam precursor from the second nozzle into the mixing chamber within the bag;
subsequently moving the top jaw to an engaged position cooperating with the bottom jaw to form a peripheral enclosure about the mixing chamber; and
activating the mixer to engage the mixing chamber of the bag to provide mixing energy to the first and second foam precursors within the mixing chamber.

WW. The method of sentence VV further comprising subsequently moving the base and shell to the base/shell disengaged position so that at least a portion of the reacting first and second foam precursors move to the remainder portion of the bag.

XX. The machine of any one of sentences EE to SS further comprising:
a first tank adapted to supply the first foam precursor to a first bellows pump, wherein the first bellows pump is adapted to pump the first foam precursor to the first nozzle; and
a second tank adapted to supply the second foam precursor to a second bellows pump, wherein the second bellows pump is adapted to pump the second foam precursor to the second nozzle.

YY. The machine of any one of sentences EE to SS and XX wherein the first and second bellows pumps are adapted for manual operation.

ZZ. The machine of any one of sentences EE to SS and XX to YY wherein the first and second tanks comprise first and second bag-in-box containers, respectively.

The descriptions herein are those of various embodiments of the invention. Various alterations and changes can be made without departing from the spirit and broader aspects of the invention as defined in the claims, which are to be interpreted in accordance with the principles of patent law, including the doctrine of equivalents. Except in the claims and the specific examples, or where otherwise expressly indicated, all numerical quantities in this description indicating amounts of material, reaction conditions, use conditions, and the like, are to be understood as modified by the word "about" in describing the broadest scope of the invention. Any reference to an item in the disclosure or to an element in the claim in the singular using the articles "a," "an," "the," or "said" is not to be construed as limiting the item or element to the singular unless expressly so stated. The definitions and disclosures set forth in the present Application control over any inconsistent definitions and disclosures that may exist in an incorporated reference.

What is claimed is:

1. A machine useful for mixing first and second foam precursors to produce foam within a bag, the machine comprising:
   a base and a shell moveable relative each other between:
   (i) a base/shell disengaged position, in which the base and shell are spaced apart to permit insertion of the bag between the base and shell, and
   (ii) a base/shell engaged position in which the shell and base press together to hold the bag between the base and shell and to divide the bag into (1) a mixing chamber and (2) a remainder portion under the mixing chamber so that the mixing chamber is isolated from the remainder portion of the bag so that the mixing chamber and the remainder portion are not in liquid communication with each other, wherein the bag is a singular, continuous bag that includes the mixing chamber and the remainder portion;
   a first nozzle adapted to inject the first foam precursor into the mixing chamber within the bag;
   a second nozzle adapted to inject the second foam precursor into the mixing chamber within the bag; and
   a mixer adapted to engage the mixing chamber of the bag to provide mixing energy to the first and second foam precursors within the mixing chamber of the bag when the base and shell are in the base/shell engaged position, thereby facilitating the foam reaction between the first and second foam precursors.

2. The machine of claim 1 wherein the shell comprises a bottom jaw such that when the base and shell are in the base/shell engaged position, the bottom jaw is adapted to press together with the base to hold the bag between the base and bottom jaw to divide the bag into the mixing chamber and the remainder portion.

3. The machine of claim 2 wherein the bottom jaw has a concave curved bottom region.

4. The machine of claim 3 wherein the bottom jaw has a U-shaped configuration.

5. The machine of claim 2 further comprising a top jaw movable relative to the bottom jaw and adapted to move to a top jaw engaged position cooperating with the bottom jaw to form a peripheral enclosure about the mixing chamber when the base and shell are in base/shell engaged position.

6. The machine of claim 5 wherein:
   the bottom jaw has a U-shaped configuration; and
   the top jaw is adapted to extend across the open top of the U-shape configuration of the bottom jaw to form the peripheral enclosure.

7. A method of making a foam-in-bag cushion comprising:
   inserting a bag in the machine of claim 5 between the base and shell in the base/shell disengaged position and beneath the first and second nozzles;
   moving the base and shell relative each other to the base/shell engaged position and to hold the bag between the base and bottom jaw to divide the bag into a mixing chamber and a remainder portion, wherein the mixing chamber is isolated from the remainder portion of the bag so that the mixing chamber and the remainder portion are not in liquid communication with each other, wherein the bag is a singular, continuous bag that includes the mixing chamber and the remainder portion;

injecting a first foam precursor from the first nozzle into the mixing chamber within the bag;

injecting a second foam precursor from the second nozzle into the mixing chamber within the bag;

subsequently moving the top jaw to an engaged position cooperating with the bottom jaw to form a peripheral enclosure about the mixing chamber; and activating the mixer to engage the mixing chamber of the bag to provide mixing energy to the first and second foam precursors within the mixing chamber.

8. The method of claim 7 further comprising subsequently moving the base and shell to the base/shell disengaged position so that at least a portion of the reacting first and second foam precursors move to the remainder portion of the bag.

9. The machine of claim 1 wherein the mixer is adapted to reciprocatingly engage the mixing chamber of the bag to provide the mixing energy.

10. The machine of claim 1 wherein the mixer is adapted to rotatively engage the mixing chamber of the bag to provide the mixing energy.

11. The machine of claim 1 wherein the mixer is mounted to the shell.

12. The machine of claim 1 wherein the mixer comprises one or more mixing rollers adapted to engage the mixing chamber of the bag.

13. The machine of claim 12 wherein the mixer is adapted to circulate the one or more mixing rollers in a plane generally parallel with the surface of the mixing chamber of the bag.

14. The machine of claim 12 wherein the one or more mixing rollers are adapted to roll along the surface of the bag.

15. The machine of claim 1 wherein the mixing chamber has a bottom region and the mixer is adapted to engage the bottom region of the mixing chamber.

16. The machine of claim 1 wherein:
the shell comprises a bottom jaw such that when the base and shell are in the base/shell engaged position, the bottom jaw is adapted to press together with the base to hold the bag between the base and bottom jaw to divide the bag into the mixing chamber and the remainder portion;
the bottom jaw has a concave curved bottom region so that in the base/shell engaged position the mixing chamber of the bag has a corresponding concave curved bottom region;
the mixer comprises one or more mixing rollers adapted to engage the mixing chamber of the bag; and
the mixer is adapted to circulate the one or more mixing rollers along a path having a portion corresponding to the concaved curved bottom region of the mixing chamber, whereby the mixer is adapted to provide mixing energy to liquids that collect in the concave curved bottom region of the mixing chamber.

17. The machine of claim 1 wherein the first and second nozzles are fixedly mounted to the base.

18. The machine of claim 1 wherein the first and second foam precursors within the mixing chamber of the bag when the base and shell are in the base/shell engaged position can flow into the remainder portion of the bag when the base and shell move to the base/shell disengaged position.

19. A method of making a foam-in-bag cushion comprising:
inserting a bag in the machine of claim 1 between the base and shell in the base/shell disengaged position and beneath the first and second nozzles;
moving the base and shell relative each other to the base/shell engaged position to divide the bag into a mixing chamber and a remainder portion, wherein the mixing chamber is isolated from the remainder portion of the bag so that the mixing chamber and the remainder portion are not in liquid communication with each other, wherein the bag is a singular, continuous bag that includes the mixing chamber and the remainder portion;
injecting a first foam precursor from the first nozzle into the mixing chamber within the bag;
injecting a second foam precursor from the second nozzle into the mixing chamber within the bag; and
activating the mixer to engage the mixing chamber of the bag to provide mixing energy to the first and second foam precursors within the mixing chamber.

20. The method of claim 19 further comprising subsequently moving the base and shell to the base/shell disengaged position so that at least a portion of the reacting first and second foam precursors move to the remainder portion of the bag.

* * * * *